(12) United States Patent
Krishnamurthy et al.

(10) Patent No.: US 10,885,642 B1
(45) Date of Patent: Jan. 5, 2021

(54) SCALABLE POSITION TRACKING SYSTEM FOR TRACKING POSITION IN LARGE SPACES

(71) Applicant: 7-ELEVEN, INC., Irving, TX (US)

(72) Inventors: Sailesh Bharathwaaj Krishnamurthy, Irving, TX (US); Sarath Vakacharla, Irving, TX (US); Trong Nghia Nguyen, Dallas, TX (US); Shahmeer Ali Mirza, Celina, TX (US); Madan Mohan Chinnam, Irving, TX (US); Caleb Austin Boulio, Lewisville, TX (US); Deepanjan Paul, Plano, TX (US); Fahad Mirza, Arlington, TX (US)

(73) Assignee: 7-Eleven, Inc., Irving, TX (US)

( * ) Notice: Subject to any disclaimer, the term of this patent is extended or adjusted under 35 U.S.C. 154(b) by 0 days.

(21) Appl. No.: 16/663,633

(22) Filed: Oct. 25, 2019

(51) Int. Cl.
| | |
|---|---|
| H04N 5/247 | (2006.01) |
| G06T 7/292 | (2017.01) |
| G06T 7/70 | (2017.01) |
| G06T 7/60 | (2017.01) |
| H04N 5/04 | (2006.01) |
| G01S 17/87 | (2020.01) |
| G01G 19/40 | (2006.01) |

(Continued)

(52) U.S. Cl.
CPC ............. *G06T 7/292* (2017.01); *G01G 19/40* (2013.01); *G01S 17/66* (2013.01); *G01S 17/87* (2013.01); *G06Q 20/32* (2013.01); *G06T 7/60* (2013.01); *G06T 7/70* (2017.01); *H04N 5/04* (2013.01); *H04N 5/247* (2013.01); *G06T 2207/10016* (2013.01); *G06T 2207/30196* (2013.01)

(58) Field of Classification Search
CPC ........... H04N 5/247; G06T 7/292; G06T 7/70; G01G 19/40
See application file for complete search history.

(56) References Cited

U.S. PATENT DOCUMENTS

| | | |
|---|---|---|
| 5,013,896 A | 5/1991 | Ono et al. |
| 6,725,206 B1 | 4/2004 | Coveley |
| 7,672,876 B2 | 3/2010 | Bonner et al. |

(Continued)

FOREIGN PATENT DOCUMENTS

| | | |
|---|---|---|
| CA | 1290453 C | 10/1991 |
| CA | 2201423 C | 10/1998 |

(Continued)

OTHER PUBLICATIONS

Boulio, C. A. et al., "Sensor Array for Scalable Position Tracking System," U.S. Appl. No. 16/663,415, filed Oct. 25, 2019, 113 pages.

(Continued)

*Primary Examiner* — Y Lee
(74) *Attorney, Agent, or Firm* — Baker Botts L.L.P.

(57) ABSTRACT

A scalable tracking system includes a camera subsystem, a weight subsystem, and a central server. The camera subsystem includes cameras that capture video of a space, camera clients that determine local coordinates of people in the captured videos, and a camera server that determines the physical positions of people in the space based on the determined local coordinates. The weight subsystem determines when items were removed from shelves. The central server determines which person in the space removed the items based on the physical positions of the people in the space and the determination of when items were removed.

20 Claims, 39 Drawing Sheets

(51) Int. Cl.
*G06Q 20/32* (2012.01)
*G01S 17/66* (2006.01)

(56) References Cited

U.S. PATENT DOCUMENTS

| | | |
|---|---|---|
| 7,844,509 B2 | 11/2010 | Bodin et al. |
| 7,848,964 B2 | 12/2010 | Bonner et al. |
| 9,886,827 B2 | 2/2018 | Schoner |
| 9,984,354 B1 | 5/2018 | Chinoy et al. |
| 9,996,818 B1 | 6/2018 | Ren et al. |
| 10,055,853 B1 | 8/2018 | Fisher et al. |
| 10,064,502 B1 | 9/2018 | Gyori et al. |
| 10,127,438 B1 | 11/2018 | Fisher et al. |
| 10,133,933 B1 | 11/2018 | Fisher et al. |
| 10,134,004 B1 | 11/2018 | Liberato, Jr. et al. |
| 10,140,483 B1 | 11/2018 | Huebner et al. |
| 10,140,820 B1 | 11/2018 | Zalewski et al. |
| 10,157,452 B1 | 12/2018 | Tighe et al. |
| 10,169,660 B1 | 1/2019 | Ren et al. |
| 10,181,113 B2 | 1/2019 | Rivalto et al. |
| 10,198,710 B1 | 2/2019 | Hahn et al. |
| 10,244,363 B1 | 3/2019 | Niranjayan et al. |
| 10,250,868 B1 | 4/2019 | Arnold et al. |
| 10,262,293 B1 | 4/2019 | Prater et al. |
| 10,268,983 B2 | 4/2019 | Kumar et al. |
| 10,291,862 B1 | 5/2019 | Liberato et al. |
| 10,296,814 B1 | 5/2019 | Kumar et al. |
| 10,303,133 B1 | 5/2019 | Dhalla et al. |
| 10,318,917 B1 | 6/2019 | Goldstein et al. |
| 10,318,919 B2 | 6/2019 | Bermudez Rodriguez et al. |
| 10,321,275 B1 | 6/2019 | Orlov et al. |
| 10,332,066 B1 | 6/2019 | Palaniappan et al. |
| 10,339,411 B1 | 7/2019 | Hua et al. |
| 10,353,982 B1 | 7/2019 | Kumar et al. |
| 10,366,306 B1 | 7/2019 | Raghavan et al. |
| 10,368,057 B1 | 7/2019 | Saran et al. |
| 10,384,869 B1 | 8/2019 | Shiee et al. |
| 10,388,019 B1 | 8/2019 | Hua et al. |
| 10,442,852 B2 | 9/2019 | Thiagarajan et al. |
| 10,438,277 B1 | 10/2019 | Jiang et al. |
| 10,445,694 B2 | 10/2019 | Fisher et al. |
| 10,459,103 B1 | 10/2019 | Shi et al. |
| 10,466,095 B1 | 11/2019 | O'Neill et al. |
| 10,474,991 B2 | 11/2019 | Fisher et al. |
| 10,474,992 B2 | 11/2019 | Fisher et al. |
| 10,475,185 B1 | 11/2019 | Raghavan et al. |
| 2007/0011099 A1 | 1/2007 | Sheehan |
| 2010/0318440 A1 | 12/2010 | Coveley |
| 2019/0138986 A1 | 5/2019 | Puerini et al. |
| 2019/0147709 A1 | 5/2019 | Schoner |
| 2019/0156277 A1 | 5/2019 | Fisher et al. |
| 2019/0156506 A1 | 5/2019 | Fisher et al. |
| 2019/0244386 A1 | 8/2019 | Fisher et al. |
| 2019/0244500 A1 | 8/2019 | Fisher et al. |
| 2019/0251499 A1 | 8/2019 | Kumar et al. |
| 2019/0347611 A1 | 11/2019 | Fisher et al. |

FOREIGN PATENT DOCUMENTS

| | | |
|---|---|---|
| EP | 0348484 A1 | 1/1990 |
| WO | 2019032304 A1 | 2/2019 |

OTHER PUBLICATIONS

Paul D. et al., "Custom Rack for Scalable Position Tracking System," U.S. Appl. No. 16/633,669, filed Oct. 25, 2019, 110 pages.

Krishnamurthy, S. B. et al., "Tracking Positions Using a Scalable Position Tracking System," U.S. Appl. No. 16/633,432, filed Oct. 25, 2019, 122 pages.

Krishnamurthy, S. B. et al., "Topview Object Tracking Using a Sensor Array," U.S. Appl. No. 16/663,710, filed Oct. 25, 2019, 199 pages.

Krishnamurthy, S. B. et al., "Detecting Shelf Interactions Using a Sensor Array," U.S. Appl. No. 16/663,766, filed Oct. 25, 2019, 205 pages.

Vakacharla, S. et al., "Topview Item Tracking Using a Sensor Array," U.S. Appl. No. 16/663,451, filed Oct. 25, 2019, 204 pages.

Mirza, S. A. et al., " Detecting and Identifying Misplaced Items Using a Sensor Array," U.S. Appl. No. 16/663,794, filed Oct. 25, 2019, 200 pages.

Mirza, S. A. et al., "Sensor Mapping to a Global Coordinate System," U.S. Appl. No. 16/663,822, filed Oct. 25, 2019, 204 pages.

Mirza, S. A. et al., "Sensor Mapping to a Global Coordinate System Using a Marker Grid," U.S. Appl. No. 16/663,472, filed Oct. 25, 2019, 206 pages.

Mirza, S. A. et al., "Shelf Position Calibration in a Global Coordinate System Using a Sensor Array," U.S. Appl. No. 16/663,856, filed Oct. 25, 2019, 206 pages.

Magee, M. R. et al., "Customer-Based Video Feed," U.S. Appl. No. 16/664,470, filed Oct. 25, 2019, 103 pages.

Mirza, S. A. et al.,"System and Method for Presenting a Virtual Store Shelf That Emulates a Physical Store Shelf," U.S. Appl. No. 16/664,490, filed Oct. 25, 2019, 103 pages.

Nguyen, T. N. et al.,"Contour-Based Detection of Closely Spaced Objects," U.S. Appl. No. 16/664,160, filed Oct. 25, 2019, 199 pages.

Mirza, S. A. et al.,"Action Detection During Image Tracking," U.S. Appl. No. 16/663,500, filed Oct. 25, 2019, 198 pages.

Mirza, S. A. et al.,"Object Re-Identification During Image Tracking," U.S. Appl. No. 16/664,219, filed Oct. 25, 2019, 201 pages.

Chinnam, M. M. et al.,"Vector-Based Object Re-Identification During Image Tracking," U.S. Appl. No. 16/664,269, filed Oct. 25, 2019, 199 pages.

Mirza, S. A. et al.,"Image-Based Action Detection Using Contour Dilation," U.S. Appl. No. 16/664,332, filed Oct. 25, 2019, 199 pages.

Mirza, S. A. et al.,"Determining Candidate Object Identities During Image Tracking," U.S. Appl. No. 16/664,363, filed Oct. 25, 2019, 201 pages.

Mirza, S. A. et al.,"Object Assignment During Image Tracking," U.S. Appl. No. 16/664,391, filed Oct. 25, 2019, 198 pages.

Krishnamurthy, S. B. et al.,"Auto-Exclusion Zone for Contour-Based Object Detection," U.S. Appl. No. 16/664,426, filed Oct. 25, 2019, 199 pages.

Mirza, S. A. et al.,"Multi-Camera Image Tracking on a Global Plane ," U.S. Appl. No. 16/664,533, filed Oct. 25, 2019, 198 pages.

Mirza, S. A. et al.,"Feedback and Training for a Machine Learning Algorithm Configured to Determine Customer Purchases During a Shopping Session at a Physical Store," U.S. Appl. No. 16/663,564, filed Oct. 25, 2019, 97 pages.

Mirza, S. A. et al.,"Identifying Non-Uniform Weight Objects Using a Sensor Array," U.S. Appl. No. 16/663,901, filed Oct. 25, 2019, 199 pages.

Magee, M. R. et al., "System and Method for Populating a Virtual Shopping Cart Based on Video of a Customer'S Shopping Session at a Physical Store," U.S. Appl. No. 16/663,589, filed Oct. 25, 2019, 103 pages.

Magee, M. R. et al., "Tool for Generating a Virtual Store That Emulates a Physical Store ," U.S. Appl. No. 16/664,529, filed Oct. 25, 2019, 100 pages.

Mirza, S. A. et al.,"Sensor Mapping to a Global Coordinate System Using Homography," U.S. Appl. No. 16/663,948, filed Oct. 25, 2019, 197 pages.

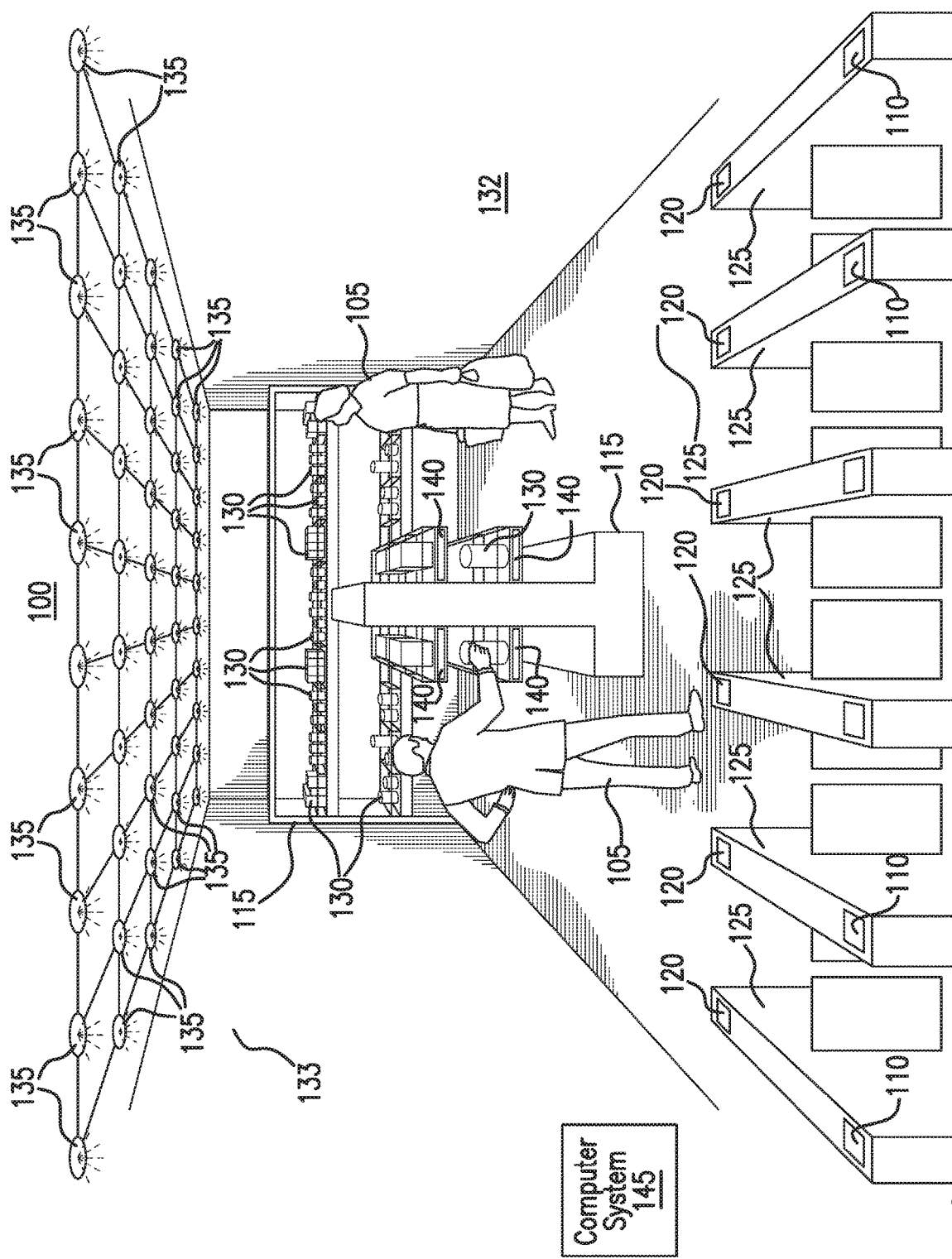

Camera Grid

| 1<br>305A | 2<br>305B | 3<br>305C | 1<br>305D |
|---|---|---|---|
| 2<br>305E | 3<br>305F | 1<br>305G | 2<br>305H |
| 3<br>305I | 1<br>305J | 2<br>305K | 3<br>305L |

SCALABLE POSITION TRACKING SYSTEM FOR TRACKING POSITION IN LARGE SPACES

TECHNICAL FIELD

This disclosure relates generally to a distributed system for tracking physical positions of people and objects.

BACKGROUND

Position tracking systems are used to track the physical positions of people and/or objects.

SUMMARY OF THE DISCLOSURE

Position tracking systems are used to track the physical positions of people and/or objects in a physical space (e.g., a store). These systems typically use a sensor (e.g., a camera) to detect the presence of a person and/or object and a computer to determine the physical position of the person and/or object based on signals from the sensor. In a store setting, other types of sensors can be installed to track the movement of inventory within the store. For example, weight sensors can be installed on racks and shelves to determine when items have been removed from those racks and shelves. By tracking both the positions of persons in a store and when items have been removed from shelves, it is possible for the computer to determine which user in the store removed the item and to charge that user for the item without needing to ring up the item at a register. In other words, the person can walk into the store, take items, and leave the store without stopping for the conventional checkout process.

For larger physical spaces (e.g., convenience stores and grocery stores), additional sensors can be installed throughout the space to track the position of people and/or objects as they move about the space. For example, additional cameras can be added to track positions in the larger space and additional weight sensors can be added to track additional items and shelves. There is a limit, however, to the number of sensors that can be added before the computing capabilities of the computer are reached. As a result, the computing power of the computer limits the coverage area of the tracking system.

One way to scale these systems to handle larger spaces is to add additional computers and to divide the sensors amongst these computers such that each computer processes signals from a subset of the sensors. However, dividing the sensors amongst multiple computers introduces synchronization issues. For example, the sensors may not communicate signals to their respective computers at the same time or simultaneously. As another example, sensors may have different latencies with their respective computers and thus, it may take more time for signals from one sensor to reach a computer than signals from another sensor. As a result, the sensors and computers become desynchronized with each other and it becomes more difficult for the computers to determine, in a cohesive way, the position of persons or objects in the space and when items were removed.

This disclosure contemplates an unconventional, distributed tracking system that can scale to handle larger spaces. The system uses an array of cameras, multiple camera clients, a camera server, weight sensors, a weight server, and a central server to determine which person in the space took an item and should be charged for the item. The camera clients each process frames of videos from a different subset of cameras of the array of cameras. Each camera client determines coordinates for people detected in the frames and then timestamps these coordinates based on when the frames were received by the camera client. The camera clients then communicate the coordinates and timestamps to a camera server that is responsible for coordinating the information from the camera clients. The camera server determines, based on the coordinates and timestamps from the camera clients, the positions of people in the space. The weight server processes signals from the weight sensors to determine when items were removed from shelves in the space. The central server uses the positions of people in the space from the camera server and the determinations from the weight server of when items were removed from shelves to determine which people in the space took which items and should therefore be charged.

Generally, the camera server protects against desynchronization by assigning the coordinates from the multiple camera clients to windows of time based on the timestamps. The camera server then processes the coordinates assigned to a particular time window to determine overall coordinates for people in the space during that time window. The duration of the time window can be set to be larger than the desynchronization that is expected to occur to mitigate the effects of desynchronization. For example, if the cameras and camera clients are expected to desynchronize by a few milliseconds, then the time window can be set to last 100 milliseconds to counteract the desynchronization. In this manner, the number of cameras and camera clients can be increased to scale the system to handle any suitable space.

This disclosure also contemplates an unconventional way of wiring cameras in the array of cameras to the camera clients. The cameras are arranged as a rectangular grid above the space. Each camera in the grid is wired to a particular camera client according to certain rules. For example, no two cameras that are directly adjacent to one another in the same row or column of the grid are wired to the same camera client. As another example, cameras that are arranged along a diagonal in the grid are wired to the same camera client. In this manner, a small area of the grid should include cameras that are wired to each and every camera client in the system. As a result, even if one camera client were to go offline (e.g., maintenance, error, or crash), there would still be enough coverage from the remaining camera clients to track the positions of people in the small area. Thus, this arrangement of the cameras improves the resiliency of the system.

This disclosure further contemplates an unconventional rack and shelf design that integrates weight sensors for tracking when items have been removed from the racks and shelves. Generally, the rack includes a base, a vertical panel, and a shelf. The base forms an enclosed space in which a printed circuit board is positioned, and the base includes a drawer that opens to provide access to the enclosed space and the circuit board. The vertical panel is attached to the base, and the shelf is attached to the vertical panel. Weight sensors are positioned within the shelf. The base, panel, and shelf each define a cavity. The cavity in the shelf and the cavity in the panel are at least partially aligned. Each weight sensor communicates signals to the printed circuit board through a wire that runs from that weight sensor, through the cavity of the shelf, the cavity of the panel, and the cavity of the base, to the circuit board.

Certain embodiments include an unconventional tracking system that includes separate components (e.g., camera clients, camera servers, weight servers, and a central server) that perform different functions to track the positions of people and/or objects in a space. By spreading the functionality of the system amongst these various components, the system is capable of processing signals from more sensors (e.g., cameras and weight sensors). Due to the increase in the number of sensors, the system can track people and/or objects in a larger space. As a result, the system can be scaled to handle larger spaces (e.g., by adding additional camera clients). Certain embodiments of the tracking system are described below.

According to an embodiment, a system includes an array of cameras, a first camera client, a second camera client, a camera server, a plurality of weight sensors, a weight server, and a central server. The array of cameras is positioned above a space. Each camera of the array of cameras captures a video of a portion of the space. The space contains a person. The first camera client receives a first plurality of frames of a first video from a first camera of the array of cameras. Each frame of the first plurality of frames shows the person within the space. For a first frame of the first plurality of frames, the first camera client determines a first bounding area around the person shown in the first frame and generates a first timestamp of when the first frame was received by the first camera client. For a second frame of the first plurality of frames, the first camera client determines a second bounding area around the person shown in the second frame and generates a second timestamp of when the second frame was received by the first camera client. The second camera client is separate from the first camera client. The second camera client receives a second plurality of frames of a second video from a second camera of the array of cameras. Each frame of the second plurality of frames shows the person within the space. For a third frame of the second plurality of frames, the second camera client determines a third bounding area around the person shown in the third frame and generates a third timestamp of when the third frame was received by the second camera client. For a fourth frame of the second plurality of frames, the second camera client determines a fourth bounding area around the person shown in the fourth frame and generates a fourth timestamp of when the fourth frame was received by the second camera client.

The camera server is separate from the first and second camera clients. The camera server determines that the first timestamp falls within a first time window and in response to determining that the first timestamp falls within the first time window, assigns coordinates defining the first bounding area to the first time window. The camera server also determines that the second timestamp falls within the first time window and in response to determining that the second timestamp falls within the first time window, assigns coordinates defining the second bounding area to the first time window. The camera server further determines that the third timestamp falls within the first time window and in response to determining that the third timestamp falls within the first time window, assigns coordinates defining the third bounding area to the first time window. The camera server determines that the fourth timestamp falls within a second time window that follows the first time window and in response to determining that the fourth timestamp falls within the second time window, assigns coordinates defining the fourth bounding area to the second time window.

The camera server also determines that coordinates assigned to the first time window should be processed and in response to determining that coordinates assigned to the first time window should be processed, the camera server calculates, based at least on the coordinates defining the first bounding area and the coordinates defining the second bounding area, a combined coordinate for the person during the first time window for the first video from the first camera and calculates, based at least on the coordinates defining the third bounding area, a combined coordinate for the person during the first time window for the second video from the second camera. The camera server also determines, based at least on the combined coordinate for the person during the first time window for the first video from the first camera and the combined coordinate for the person during the first time window for the second video from the second camera, a position of the person within the space during the first time window.

The plurality of weight sensors are positioned within the space. Each weight sensor of the plurality of weight sensors produces a signal indicative of a weight experienced by that weight sensor. The weight server is separate from the first and second camera clients and the camera server. The weight server determines, based at least on a signal produced by a first weight sensor of the plurality of weight sensors, that an item positioned above the first weight sensor was removed. The central server is separate from the first and second camera clients, the camera server, and the weight server. The central server determines, based at least on the position of the person within the space during the first time window, that the person removed the item. Based at least on the determination that the first person removed the item, the person is charged for the item when the person exits the space.

According to another embodiment, a system includes an array of cameras, a first camera client, a second camera client, a camera server, a plurality of weight sensors, a weight server, and a central server. The array of cameras is positioned above a space. Each camera of the array of cameras captures a video of a portion of the space. The space contains a person. The first camera client, for each frame of a first video received from a first camera of the array of cameras, determines a bounding area around the person shown in that frame of the first video and generates a timestamp of when that frame of the first video was received by the first camera client. The second camera client, for each frame of a second video received from a second camera of the array of cameras, determines a bounding area around the person shown in that frame of the second video and generates a timestamp of when that frame of the second video was received by the second camera client.

The camera server is separate from the first and second camera clients. The camera server, for each frame of the first video, assigns, based at least on the timestamp of when that frame was received by the first camera client, coordinates defining the bounding area around the person shown in that frame to one of a plurality of time windows. For each frame of the second plurality of frames, the camera server assigns, based at least on the timestamp of when that frame was received by the second camera client, coordinates defining the bounding area around the person shown in that frame to one of the plurality of time windows. For a first time window of the plurality of time windows, the camera server calculates, based at least on the coordinates that (1) define bounding areas around the person shown in the first plurality of frames and (2) are assigned to the first time window, a combined coordinate for the person during the first time window for the first video from the first camera and calculates, based at least on the coordinates that (1) define bounding areas around the person shown in the second plurality of frames and (2) are assigned to the first time window, a combined coordinate for the person during the first time window for the second video from the second camera. The camera server determines, based at least on the combined coordinate for the person during the first time window for the first video from the first camera and the combined coordinate for the person during the first time window for the second video from the second camera, a position of the person within the space during the first time window.

The plurality of weight sensors are positioned within the space. The weight server is separate from the first and second camera clients and the camera server. The weight server determines, based at least on a signal produced by a first weight sensor of the plurality of weight sensors, that an item positioned above the first weight sensor was removed. The central server is separate from the first and second camera clients, the camera server, and the weight server. The central server determines, based at least on the position of the person within the space during the first time window, that the person removed the item.

Certain embodiments of the tracking system perform an unconventional tracking process that allows for some desynchronization amongst the components of the system (e.g., camera clients and camera server). Generally, the system processes information according to time windows. These time windows may be set to be larger than the desynchronization that is expected to exist in the system. Information that is assigned to a time window is processed together. Thus, even if some desynchronization exists amongst that information, it is nevertheless processed together within the same time window. In this manner, the tracking system can handle an increased amount of desynchronization, especially desynchronization that occurs as a result of the system being scaled to include more components so that the system can handle a larger space. As a result, the system can scale to handle larger spaces while maintaining reliability and accuracy. Certain embodiments of the tracking process are described below.

According to an embodiment, a system includes an array of cameras, a first camera client, a second camera client, and a camera server. The array of cameras is positioned above a space. Each camera of the array of cameras captures a video of a portion of the space. The space contains a person. The first camera client receives a first plurality of frames of a first video from a first camera of the array of cameras. Each frame of the first plurality of frames shows the person within the space. For a first frame of the first plurality of frames, the first camera client determines a first bounding area around the person shown in the first frame and generates a first timestamp of when the first frame was received by the first camera client. For a second frame of the first plurality of frames, the first camera client determines a second bounding area around the person shown in the second frame and generates a second timestamp of when the second frame was received by the first camera client. For a third frame of the first plurality of frames, the first camera client determines a third bounding area around the person shown in the third frame and generates a third timestamp of when the third frame was received by the first camera client.

The second camera client receives a second plurality of frames of a second video from a second camera of the array of cameras. Each frame of the second plurality of frames shows the person within the space. For a fourth frame of the second plurality of frames, the second camera client determines a fourth bounding area around the person shown in the fourth frame and generates a fourth timestamp of when the fourth frame was received by the second camera client. For a fifth frame of the second plurality of frames, the second camera client determines a fifth bounding area around the person shown in the fifth frame and generates a fifth timestamp of when the fifth frame was received by the second camera client.

The camera server is separate from the first and second camera clients. The camera server determines that the first timestamp falls within a first time window and in response to determining that the first timestamp falls within the first time window, assigns coordinates defining the first bounding area to the first time window. The camera server also determines that the second timestamp falls within the first time window and in response to determining that the second timestamp falls within the first time window, assigns coordinates defining the second bounding area to the first time window. The camera server further determines that the third timestamp falls within a second time window that follows the first time window and in response to determining that the third timestamp falls within the second time window, assigns coordinates defining the third bounding area to the second time window. The camera server also determines that the fourth timestamp falls within the first time window and in response to determining that the fourth timestamp falls within the first time window, assigns coordinates defining the fourth bounding area to the first time window. The camera server further determines that the fifth timestamp falls within the second time window and in response to determining that the fifth timestamp falls within the second time window, assigns coordinates defining the fifth bounding area to the second time window.

The camera server also determines that coordinates assigned to the first time window should be processed and in response to determining that coordinates assigned to the first time window should be processed, the camera server calculates, based at least on the coordinates defining the first bounding area and the coordinates defining the second bounding area, a combined coordinate for the person during the first time window for the first video from the first camera and calculates, based at least on the coordinates defining the fourth bounding area, a combined coordinate for the person during the first time window for the second video from the second camera. After determining that coordinates assigned to the first time window should be processed, the camera server determines that coordinates assigned to the second time window should be processed and in response to determining that coordinates assigned to the second time window should be processed, the camera servers calculates, based at least on the coordinates defining the third bounding area, a combined coordinate for the person during the second time window for the first video from the first camera and calculates, based at least on the coordinates defining the fifth bounding area, a combined coordinate for the person during the second time window for the second video from the second camera.

According to another embodiment, a system includes an array of cameras, a first camera client, a second camera client, and a camera server. The array of cameras is positioned above a space. Each camera of the array of cameras captures a video of a portion of the space. The space contains a person. The first camera client receives a first plurality of frames of a first video from a first camera of the array of cameras. Each frame of the first plurality of frames shows the person within the space. For each frame of the first plurality of frames, the first camera client determines a bounding area around the person shown in that frame and generates a timestamp of when that frame was received by the first camera client. The second camera client receives a second plurality of frames of a second video from a second camera of the array of cameras. Each frame of the second plurality of frames shows the person within the space. For each frame of the second plurality of frames, the second camera client determines a bounding area around the person shown in that frame and generates a timestamp of when that frame was received by the second camera client.

The camera server is separate from the first and second camera clients. The camera server, for each frame of the first plurality of frames, assigns, based at least on the timestamp of when that frame was received by the first camera client, coordinates defining the bounding area around the person shown in that frame to one of a plurality of time windows and for each frame of the second plurality of frames, assigns, based at least on the timestamp of when that frame was received by the second camera client, coordinates defining the bounding area around the person shown in that frame to one of the plurality of time windows.

The camera server also determines that coordinates assigned to a first time window of the plurality of time windows should be processed and in response to determining that coordinates assigned to the first time window should be processed, calculates, based at least on the coordinates that (1) define bounding areas around the person shown in the first plurality of frames and (2) are assigned to the first time window, a combined coordinate for the person during the first time window for the first video from the first camera and calculates, based at least on the coordinates that (1) define bounding areas around the person shown in the second plurality of frames and (2) are assigned to the first time window, a combined coordinate for the person during the first time window for the second video from the second camera.

Certain embodiments include an unconventional arrangement of cameras and camera clients that improve the resiliency of the camera system. Generally, the cameras are arranged in a rectangular grid that provides coverage for a physical space, and each camera is communicatively coupled to one camera client. No camera is directly adjacent in the same row or column of the grid to another camera that is communicatively coupled to the same camera client. Cameras arranged along a diagonal of the grid are communicatively coupled to the same camera client. In this manner, even if one camera client in the system were to go offline, the grid still provides sufficient coverage for the physical space. As a result, the arrangement of the cameras improves the resiliency of the system. Certain embodiments of the camera arrangement are described below.

According to an embodiment, a system includes a first camera client, a second camera client, a third camera client, and an array of cameras. The second camera client is separate from the first camera client. The third camera client is separate from the first and second camera clients. The array of cameras is positioned above a space. The cameras in the array of cameras are arranged as a rectangular grid comprising a first row, a second row, a third row, a first column, a second column, and a third column. The array includes first, second, third, fourth, fifth, and sixth cameras.

The first camera is positioned in the first row and the first column of the grid. The first camera is communicatively coupled to the first camera client. The first camera communicates a video of a first portion of the space to the first camera client. The second camera is positioned in the first row and the second column of the grid such that the second camera is directly adjacent to the first camera in the grid. The second camera is communicatively coupled to the second camera client. The second camera communicates a video of a second portion of the space to the second camera client. The third camera is positioned in the first row and the third column of the grid such that the third camera is directly adjacent to the second camera in the grid. The third camera is communicatively coupled to the third camera client. The third camera communicates a video of a third portion of the space to the third camera client. The fourth camera is positioned in the second row and the first column of the grid such that the fourth camera is directly adjacent to the first camera in the grid. The fourth camera is communicatively coupled to the second camera client. The fourth camera communicates a video of a fourth portion of the space to the second camera client. The fifth camera is positioned in the second row and the second column of the grid such that the fifth camera is directly adjacent to the fourth camera and the second camera in the grid. The fifth camera is communicatively coupled to the third camera client. The fifth camera communicates a video of a fifth portion of the space to the third camera client. The sixth camera is positioned in the third row and the first column of the grid such that the sixth camera is directly adjacent to the fourth camera in the grid. The sixth camera is communicatively coupled to the third camera client. The sixth camera communicates a video of a sixth portion of the space to the third camera client.

According to another embodiment, a system includes a plurality of camera clients and an array of cameras. The plurality of camera clients includes a number of camera clients. The array of cameras is positioned above a space. Each camera in the array of cameras communicates a video of a portion of the space to only one camera client of the plurality of camera clients. The cameras in the array of cameras are arranged such that each camera client of the plurality of camera clients is communicatively coupled to at least one camera in an N×N portion of the array. N is the number of camera clients in the plurality of camera clients minus one.

Certain embodiments include an unconventional rack for holding items. The rack includes a base and panels for holding shelves and weight sensors. The weight sensors are wired to a circuit board located in a drawer in the base. The wires run from the weight sensors through cavities and spaces defined by the shelves, panels, and base. Certain embodiments of the rack are described below.

According to an embodiment, a system includes a circuit board and a rack. The rack includes a base, a panel, a shelf, a first weight sensor, a second weight sensor, a first wire, and a second wire. The base includes a bottom surface, a first side surface, a second side surface, a third side surface, a top surface, and a drawer. The first side surface is coupled to the bottom surface of the base. The first side surface of the base extends upwards from the bottom surface of the base. The second side surface is coupled to the bottom and first side surfaces of the base. The second side surface of the base extends upwards from the bottom surface of the base. The third side surface is coupled to the bottom and second side surfaces of the base. The third side surface of the base extends upwards from the bottom surface of the base. The top surface is coupled to the first, second, and third side surfaces of the base such that the bottom and top surfaces of the base and the first, second, and third side surfaces of the base define a space. The top surface of the base defines a first opening into the space. The drawer is positioned within the space. The circuit board is positioned within the drawer.

The panel is coupled to the base and extends upwards from the base. The panel defines a second opening that extends along a width of the panel. The shelf is coupled to the panel such that the shelf is positioned vertically higher than the base and such that the shelf extends away from the panel. The shelf includes a bottom surface, a front surface that extends upwards from the bottom surface of the shelf, and a back surface that extends upwards from the bottom surface of the shelf. The back surface of the shelf is coupled to the panel. The back surface of the shelf defines a third opening. A portion of the third opening aligns with a portion of the second opening.

The first weight sensor is coupled to the bottom surface of the shelf and positioned between the front surface of the shelf and the back surface of the shelf. The second weight sensor is coupled to the bottom surface of the shelf and positioned between the front surface of the shelf and the back surface of the shelf. The first wire is coupled to the first weight sensor and the circuit board The first wire extends from the first weight sensor through the second and third openings and downwards into the space through the first opening. The second wire is coupled to the second weight sensor and the circuit board. The second wire extends from the second weight sensor through the second and third openings and downwards into the space through the first opening.

Certain embodiments may include none, some, or all of the above technical advantages discussed above. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIG. 1A-1C illustrates an example store that defines a physical space;

DETAILED DESCRIPTION

Figure 1A:
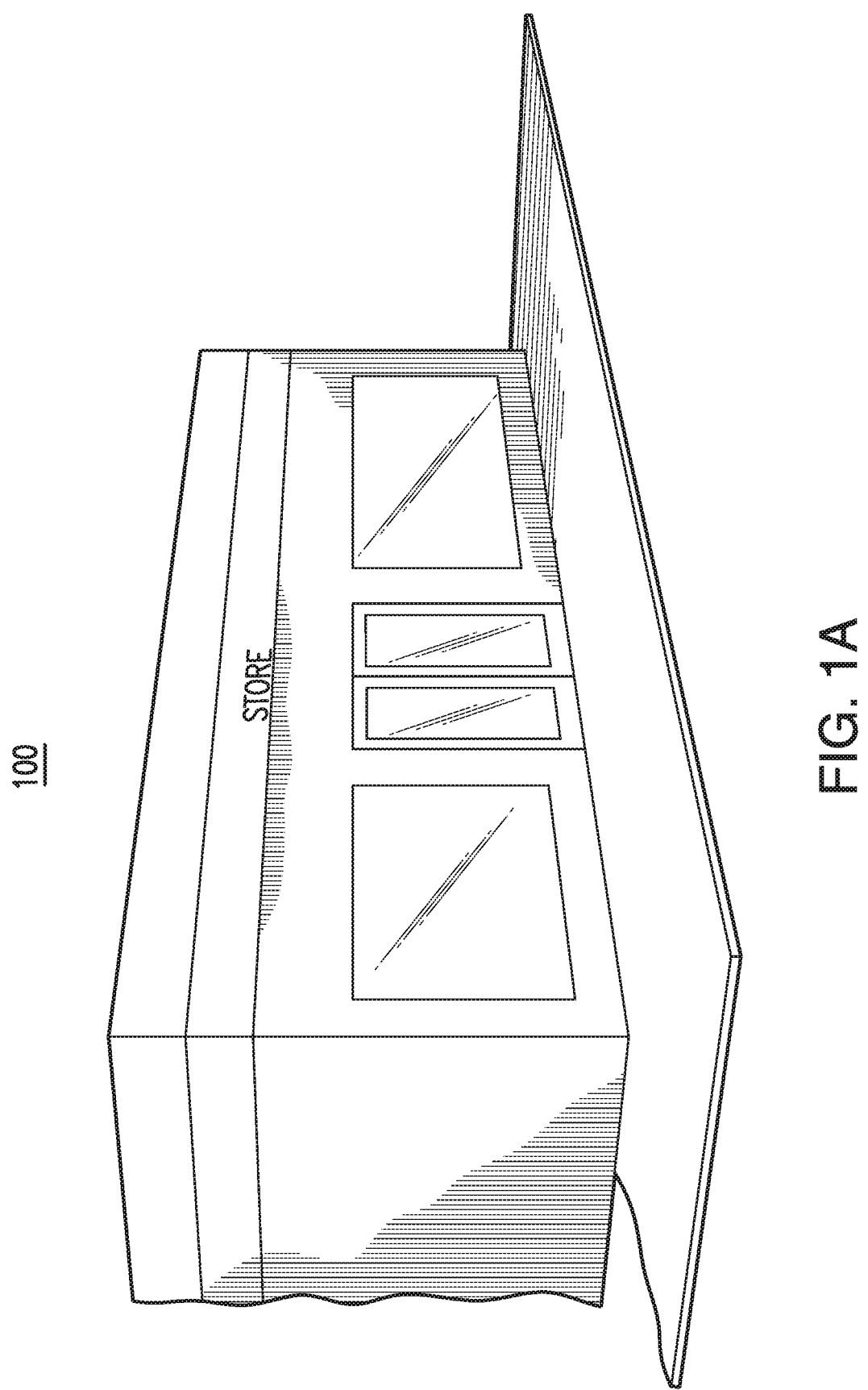

Embodiments of the present disclosure and its advantages are best understood by referring to FIGS. 1A through 7 of the drawings, like numerals being used for like and corresponding parts of the various drawings. Additional information is disclosed in U.S. patent application Ser. No. 16/664,470, "Customer-Based Video Feed" and U.S. patent application Ser. No. 16/663,710, "Topview Object Tracking Using a Sensor Array" which are both hereby incorporated by reference herein as if reproduced in their entirety.

Position tracking systems are used to track the physical positions of people and/or objects in a physical space (e.g., a store). These systems typically use a sensor (e.g., a camera) to detect the presence of a person and/or object and a computer to determine the physical position of the person and/or object based on signals from the sensor. In a store setting, other types of sensors can be installed to track the movement of inventory within the store. For example, weight sensors can be installed on racks and shelves to determine when items have been removed from those racks and shelves. By tracking both the positions of persons in a store and when items have been removed from shelves, it is possible for the computer to determine which user in the store removed the item and to charge that user for the item without needing to ring up the item at a register. In other words, the person can walk into the store, take items, and leave the store without stopping for the conventional checkout process.

For larger physical spaces (e.g., convenience stores and grocery stores), additional sensors can be installed throughout the space to track the position of people and/or objects as they move about the space. For example, additional cameras can be added to track positions in the larger space and additional weight sensors can be added to track additional items and shelves. There is a limit, however, to the number of sensors that can be added before the computing capabilities of the computer are reached. As a result, the computing power of the computer limits the coverage area of the tracking system.

One way to scale these systems to handle larger spaces is to add additional computers and to divide the sensors amongst these computers such that each computer processes signals from a subset of the sensors. However, dividing the sensors amongst multiple computers introduces synchronization issues. For example, the sensors may not communicate signals to their respective computers at the same time or simultaneously. As another example, sensors may have different latencies with their respective computers and thus, it may take more time for signals from one sensor to reach a computer than signals from another sensor. As a result, the sensors and computers become desynchronized with each other and it becomes more difficult for the computers to determine, in a cohesive way, the position of persons or objects in the space and when items were removed.

This disclosure contemplates an unconventional, distributed tracking system that can scale to handle larger spaces. The system uses an array of cameras, multiple camera clients, a camera server, weight sensors, a weight server, and a central server to determine which person in the space took an item and should be charged for the item. The camera clients each process frames of videos from a different subset of cameras of the array of cameras. Each camera client determines coordinates for people detected in the frames and then timestamps these coordinates based on when the frames were received by the camera client. The camera clients then communicate the coordinates and timestamps to a camera server that is responsible for coordinating the information from the camera clients. The camera server determines, based on the coordinates and timestamps from the camera clients, the positions of people in the space. The weight server processes signals from the weight sensors to determine when items were removed from shelves in the space. The central server uses the positions of people in the space from the camera server and the determinations from the weight server of when items were removed from shelves to determine which people in the space took which items and should therefore be charged. The system will be described in more detail using FIGS. 1A-7.

Generally, the camera server protects against desynchronization by assigning the coordinates from the multiple camera clients to windows of time based on the timestamps. The camera server then processes the coordinates assigned to a particular time window to determine overall coordinates for people in the space during that time window. The duration of the time window can be set to be larger than the desynchronization that is expected to occur to mitigate the effects of desynchronization. For example, if the cameras and camera clients are expected to desynchronize by a few milliseconds, then the time window can be set to last 100 milliseconds to counteract the desynchronization. In this manner, the number of cameras and camera clients can be increased to scale the system to handle any suitable space. The cameras, camera clients, and camera server will be described in more detail using FIGS. 1A-3Q.

This disclosure also contemplates an unconventional way of wiring cameras in the array of cameras to the camera clients. The cameras are arranged as a rectangular grid above the space. Each camera in the grid is wired to a particular camera client according to certain rules. For example, no two cameras that are directly adjacent to one another in the same row or column of the grid are wired to the same camera client. As another example, cameras that are arranged along a diagonal in the grid are wired to the same camera client. In this manner, a small area of the grid should include cameras that are wired to each and every camera client in the system. As a result, even if one camera client were to go offline (e.g., maintenance, error, or crash), there would still be enough coverage from the remaining camera clients to track the positions of people in the area. Thus, this arrangement of the cameras improves the resiliency of the system. The camera array will be described in more detail using FIGS. 3A-3E.

This disclosure further contemplates an unconventional rack and shelf design that integrates weight sensors for tracking when items have been removed from the racks and shelves. Generally, the rack includes a base, a vertical panel, and a shelf. The base forms an enclosed space in which a printed circuit board is positioned, and the base includes a drawer that opens to provide access to the enclosed space and the circuit board. The vertical panel is attached to the base, and the shelf is attached to the vertical panel. Weight sensors are positioned within the shelf. The base, panel, and shelf each define a cavity. The cavity in the shelf and the cavity in the panel are at least partially aligned. Each weight sensor communicates signals to the printed circuit board through a wire that runs from that weight sensor, through the cavity of the shelf, the cavity of the panel, and the cavity of the base, to the circuit board. The rack and shelf design will be described in more detail using FIGS. 5A-5K.

The system may also include a light detection and ranging (LiDAR) subsystem that will be described in more detail using FIGS. 4A-4D. The system also includes a central server that ties together the camera subsystem, weight subsystem, and LiDAR subsystem. The central server will be described in more detail using FIGS. 6A-6C.

I. System Overview

FIGS. 1A-1D show the tracking system installed in an example store space. As discussed above, the tracking system may be installed in a store space so that shoppers need not engage in the conventional checkout process. Although the example of a store space is used in this disclosure, this disclosure contemplates that the tracking system may be installed and used in any type of physical space (e.g., a warehouse, a storage center, an amusement park, an airport, an office building, etc.). Generally, the tracking system (or components thereof) is used to track the positions of people and/or objects within these spaces for any suitable purpose. For example, at an airport, the tracking system can track the positions of travelers and employees for security purposes. As another example, at an amusement park, the tracking system can track the positions of park guests to gauge the popularity of attractions. As yet another example, at an office building, the tracking system can track the positions of employees and staff to monitor their productivity levels.

FIG. 1A shows an example store 100. Store 100 is a physical space in which shoppers can purchase items for sale. As seen in FIG. 1A, store 100 is a physical building that includes an entryway through which shoppers can enter and exit store 100. A tracking system may be installed in store 100 so that shoppers need not engage in the conventional checkout process to purchase items from store 100. This disclosure contemplates that store 100 may be any suitable physical space. For example, store 100 may be a convenience store or a grocery store. This disclosure also contemplates that store 100 may not be a physical building, but a physical space or environment in which shoppers may shop. For example, store 100 may be a grab and go pantry at an airport, a kiosk in an office building, an outdoor market at a park, etc.

Figure 1B:
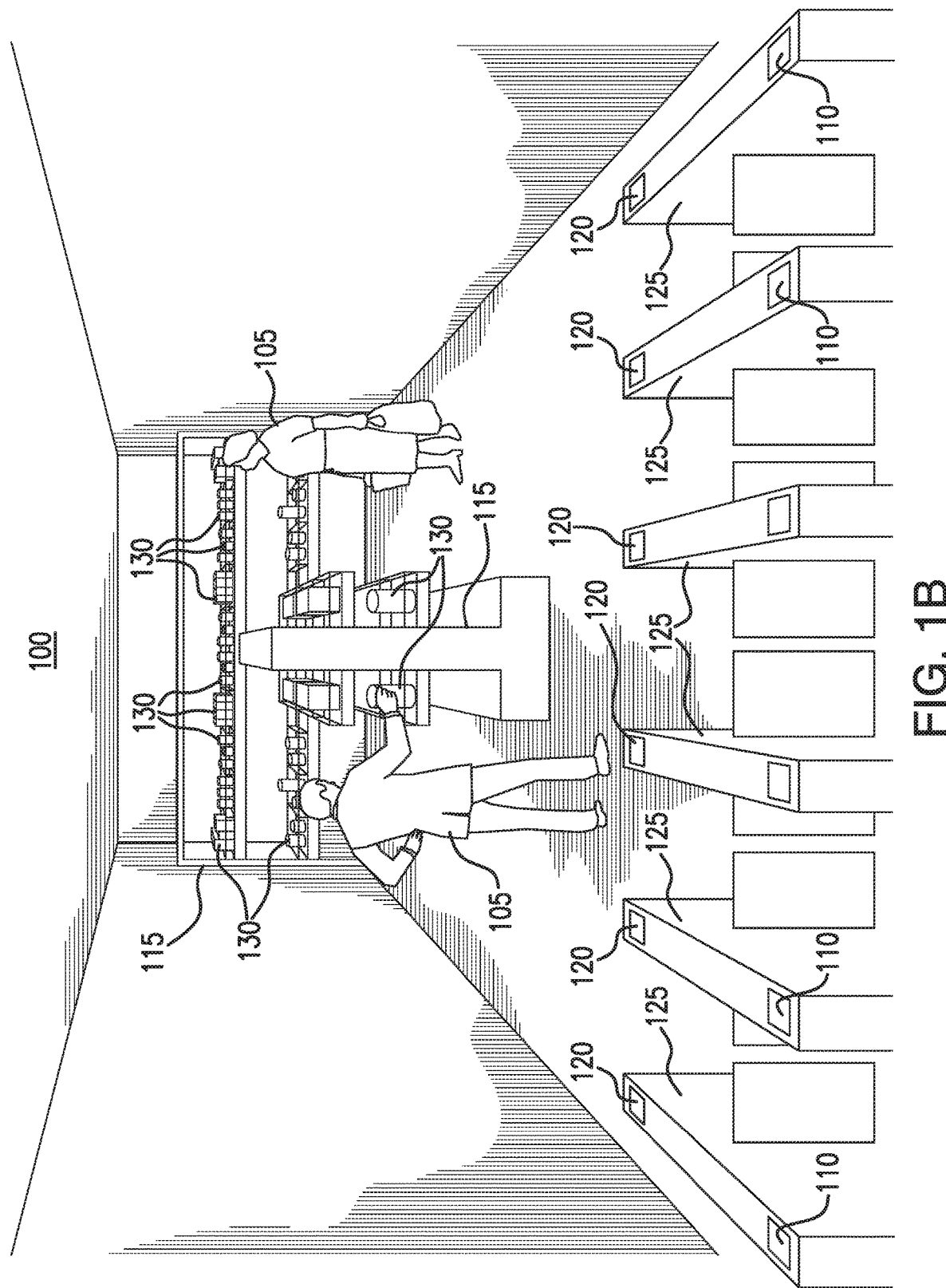

FIG. 1B shows portions of the interior of store 100. As seen in FIG. 1B, store 100 contains shoppers 105, racks 115, and gates 125. Shoppers 105 may have entered store 100 through one of gates 125, which allow entry and exit from store 100. Gates 125 prevent shoppers 105 from entering and/or exiting the store unless gates 125 are opened.

Gates 125 may include scanners 110 and 120. Scanners 110 and 120 may include a QR code scanner, a barcode scanner, or any other suitable type of scanner that can receive an electronic code embedded with information, such as information that uniquely identifies a shopper 105. Shoppers 105 may scan a personal device (e.g., a smartphone) on scanners 110 to enter store 100. When a shopper 105 scans a personal device on scanners 110, the personal device may provide scanners 110 an electronic code that uniquely identifies the shopper 105. When the shopper 105 is identified and/or authenticated, gate 125 that includes scanner 110 opens to allow the shopper 105 into store 100. Each shopper 105 may have registered an account with store 100 to receive an identification code for the personal device.

After entering store 100, shoppers 105 may move around the interior of store 100. As the shoppers 105 move throughout the space, shoppers 105 may shop for items 130 by removing items 130 from racks 115. As seen in FIG. 1B, store 100 includes racks 115 that hold items 130. When shopper 105 wishes to purchase a particular item 130, shopper 105 can remove that item 130 from rack 115. Shoppers 105 can remove multiple items 130 from store 100 to purchase those items 130.

When shopper 105 has completed shopping for items 130, shopper 105 approaches gates 125. In certain embodiments, gates 125 will automatically open so that shopper 105 can leave store 100. In other embodiments, shopper 105 scans a personal device on scanners 120 before gates 125 will open to allow shopper 105 to exit store 100. When shopper 105 scans a personal device on scanner 120, the personal device may provide an electronic code that uniquely identifies shopper 105 to indicate that shopper 105 is leaving store 100. When shopper 105 leaves store 100, an account of shopper 105 is charged for the items 130 that shopper 105 removed from store 100.

FIG. 1C shows the interior of store 100 along with a tracking system 132 that allows shopper 105 to simply leave store 100 with items 130 without engaging in a conventional checkout process. As seen in FIG. 1C, the tracking system 132 includes an array of sensors 135 positioned on the ceiling of store 100. The array of sensors 135 may provide coverage for the interior space of store 100. Sensors 135 are arranged in a grid pattern across the ceiling of store 100, as explained in further detail with respect to FIGS. 3A-3E. Sensors 135 may be used to track the positions of shoppers 105 within the space of store 100. This disclosure contemplates sensors 135 being any suitable sensors (e.g., cameras, light detection and range sensors, millimeter wave sensors, etc.).

The tracking system 132 also includes weight sensors 140 positioned on the racks 115. Weight sensors 140 can detect the weight of items 130 positioned on racks 115. When an item 130 is removed from the rack 115, the weight sensor 140 may detect a decrease in weight. The tracking system 132 may use that information to determine that a particular item 130 was removed from the rack 115.

The tracking system 132 includes a computer system 145. Computer system 145 may include multiple computers that operate together to determine which shopper 105 took which items 130 from racks 115. The components of computer system 145 and their operation will be described in more detail using FIGS. 2 through 7. Generally, computer system 145 uses information from sensors 135 and weight sensors 140 to determine which shopper 105 removed which items 130 from store 100. In this manner, the shopper 105 may be automatically charged for items 130 when the shopper 105 leaves store 100 through gates 125.

Figure 2:
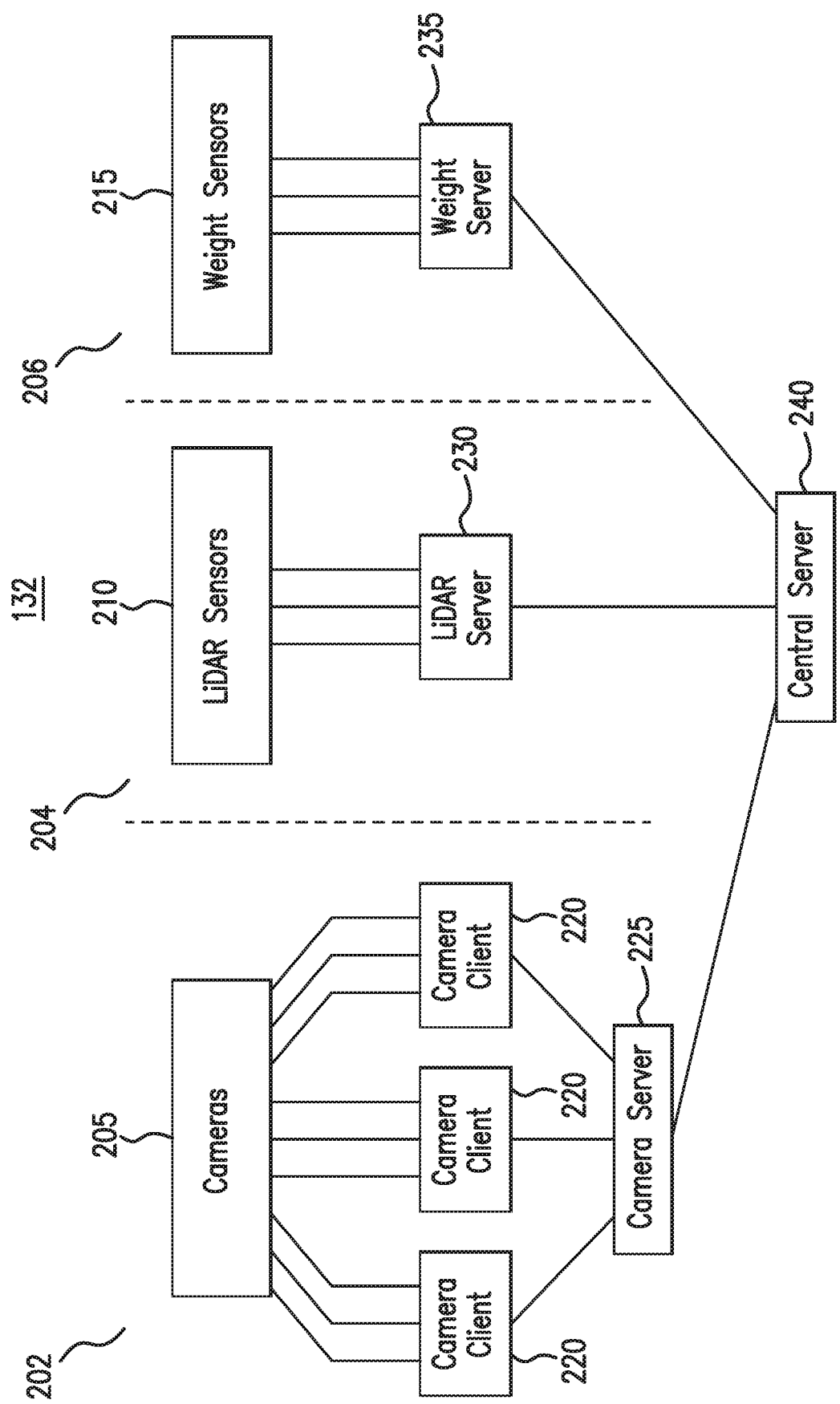
FIG. 2 illustrates a block diagram of an example tracking system for use in the physical store.

FIG. 2 illustrates a block diagram of an example tracking system 132 for use in store 100. As seen in FIG. 2, the tracking system 132 includes a camera subsystem 202, a light detection and range (LiDAR) subsystem 204, and a weight subsystem 206. The tracking system 132 includes various sensors 135, such as cameras 205, light detection and range (LiDAR) sensors 210, and weight sensors 215. These sensors 135 are communicatively coupled to various computers of a computer system 145. For example, the camera subsystem 202 includes cameras 205 that are communicatively coupled to one or more camera clients 220. These camera clients 220 are communicatively coupled to a camera server 225. The LiDAR subsystem 204 includes LiDAR sensors 210 that are communicatively coupled to a LiDAR server 230. The weight subsystem 206 includes weight sensors 215 that are communicatively coupled to a weight server 235. The camera server 225, LiDAR server 230, and weight server 235 are communicatively coupled to a central server 240.

Generally, cameras 205 produce videos of portions of the interior of a space. These videos may include frames or images of shoppers 105 within the space. The camera clients 220 process the frames from the cameras 205 to detect shoppers 105 within the frames and to assign frame coordinates to those shoppers 105. The camera server 225 generally processes frame data from the camera clients 220 to determine the physical position of shoppers 105 within the space. LiDAR sensors 210 generally produce coordinates of shoppers 105 within a space. LiDAR server 230 processes these coordinates to determine the position of shoppers 105 within a space. Weight sensors 215 detect the weight of items 130 on racks 115 within the space. Weight server 235 processes these weights to determine when certain items 130 have been removed from the racks 115.

Central server 240 processes position information for shoppers 105 from camera server 225 and LiDAR server 230 and weight information from weight server 235 to determine which shopper 105 removed which items 130 from the racks 115. These shoppers 105 may then be charged for those items 130 when the shoppers 105 leave the space. The operation of these components will be described in more detail using FIGS. 3A through 6C.

In one embodiment, each of the components of tracking system 132 (e.g. camera clients 220, camera server 225, LiDAR server 230, weight server 235, and central server 240) is a distinct computing device separate from the other components of tracking system 132. For example, each of these components may include its own processor, memory, and physical housing. In this manner, the components of tracking system 132 are distributed to provide additional computing power relative to a tracking system that includes only one computer.

II. Camera Subsystem

Figure 3A:
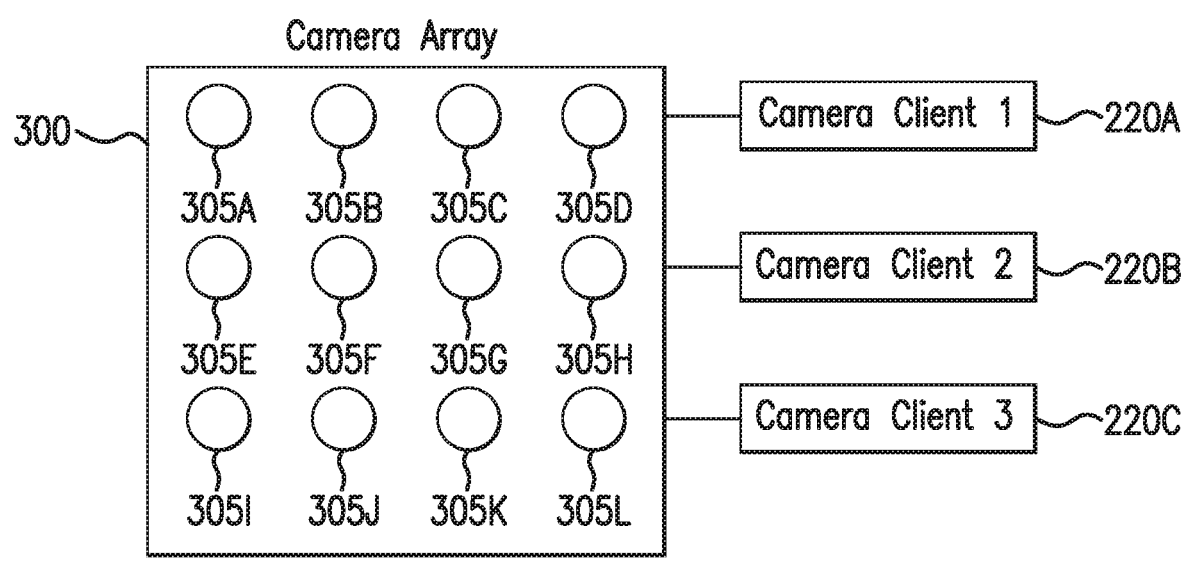
FIGS. 3A-3T illustrate an example camera subsystem and its operation in the tracking system.
Figure 3B:
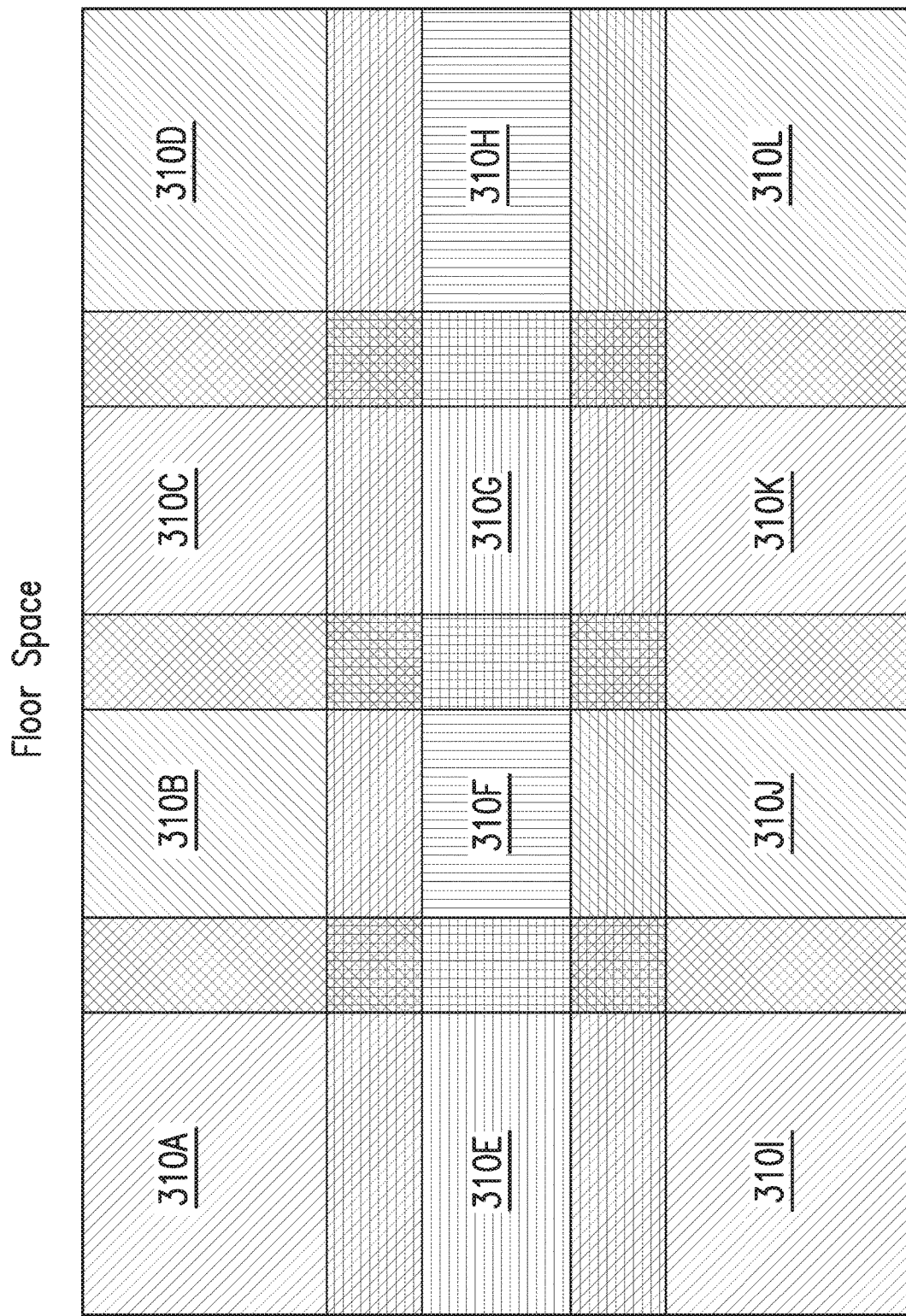
Figure 3D:
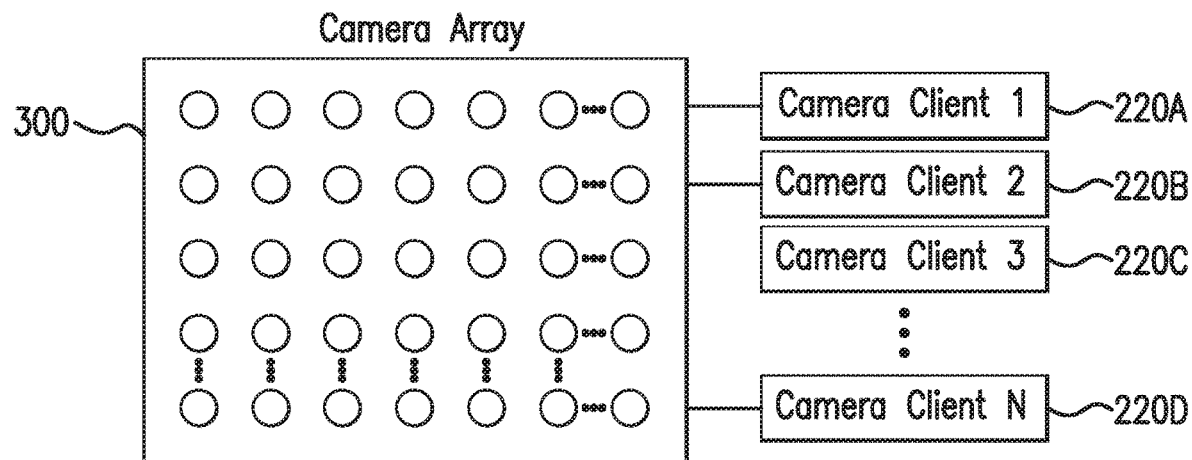
Figure 3E:
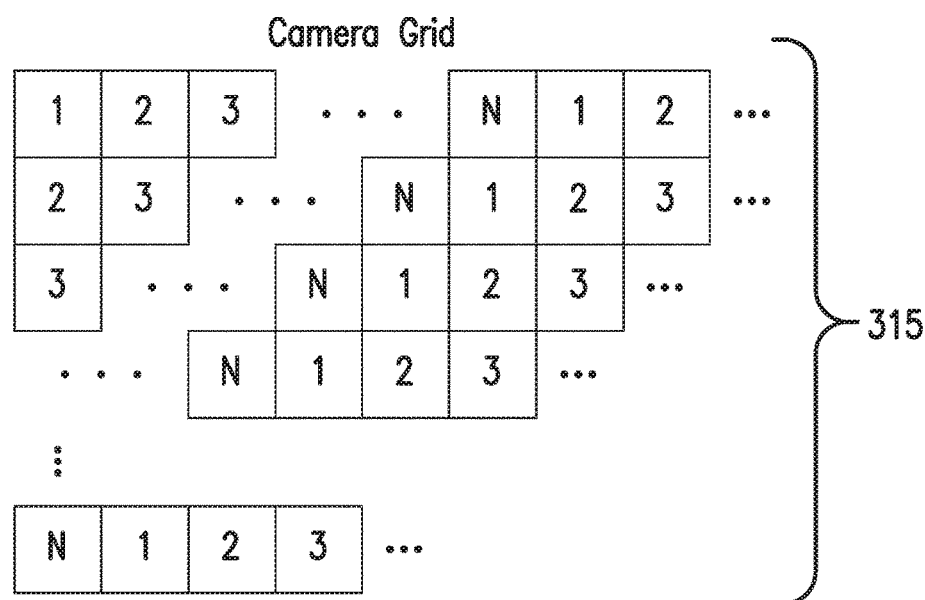
Figure 3F:
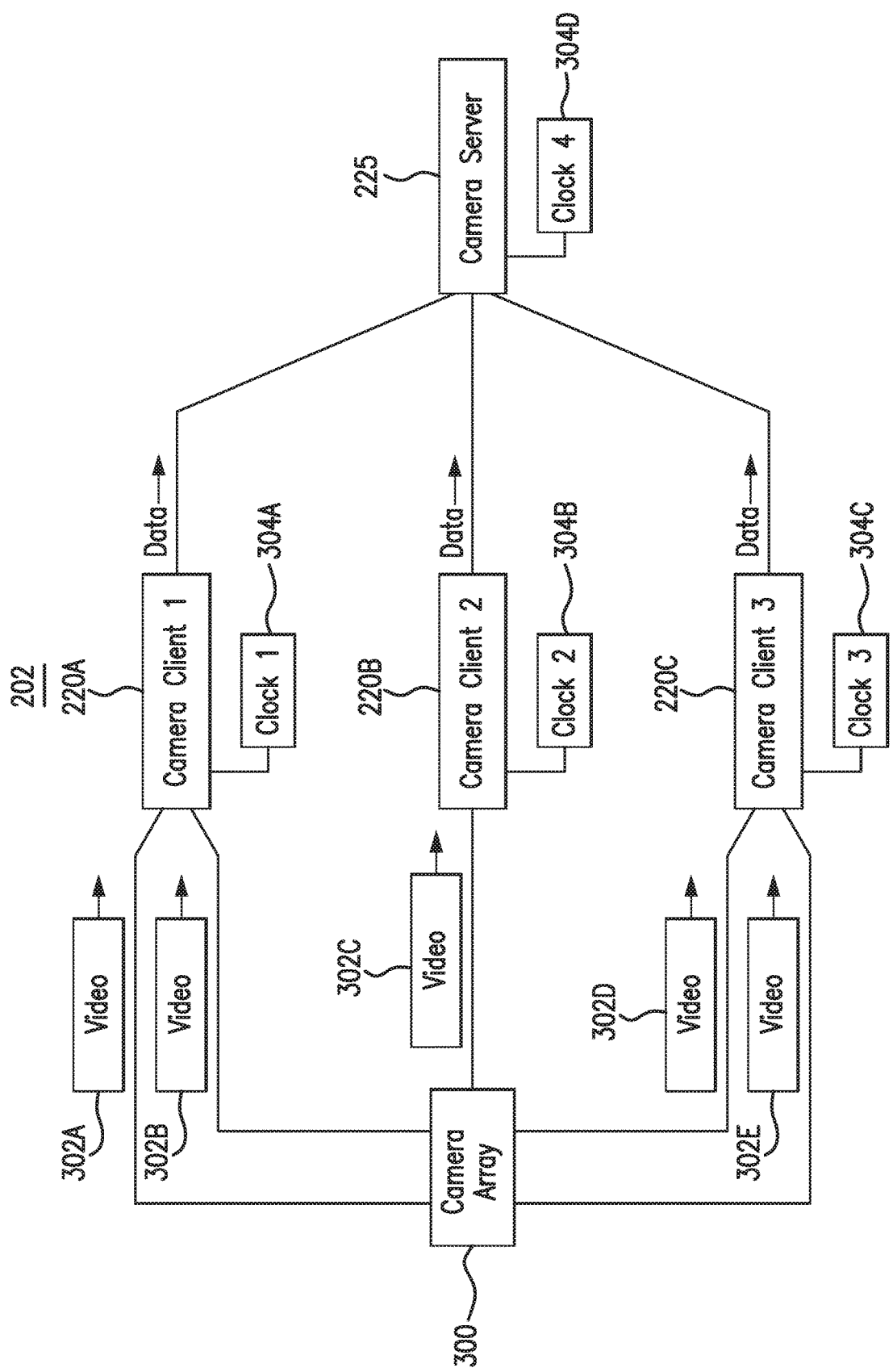
Figure 3G:
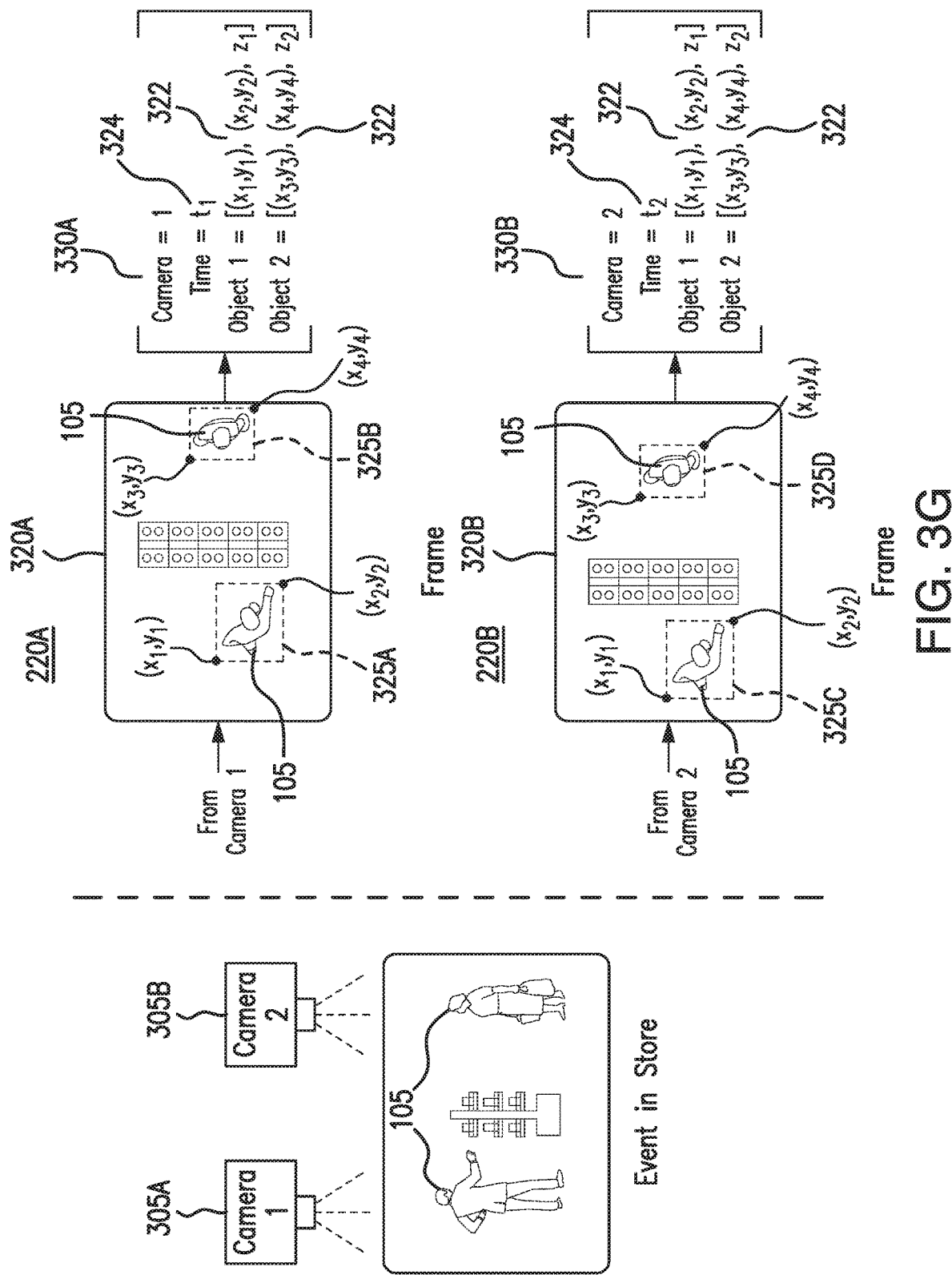
Figure 3H:
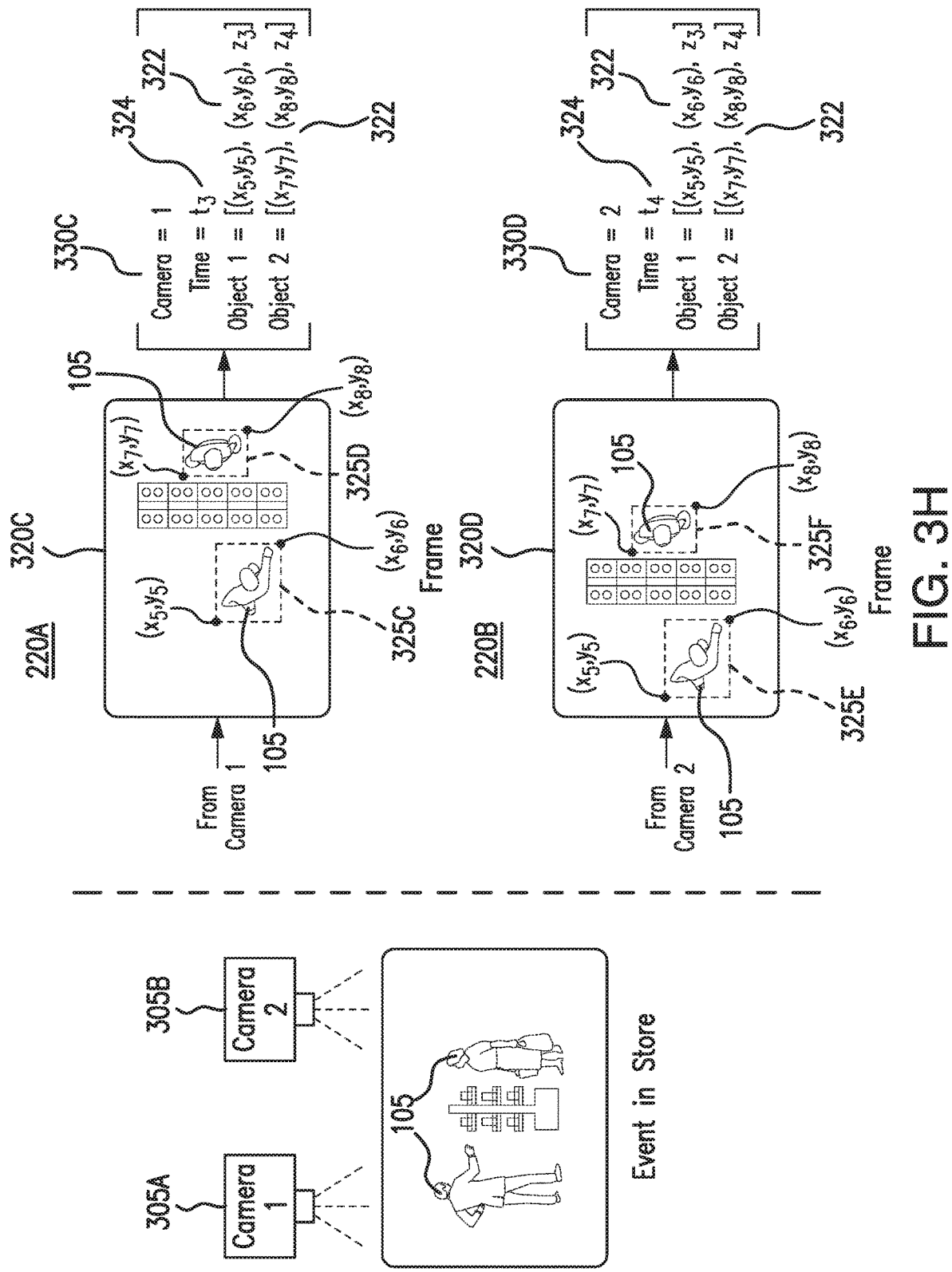
Figure 3I:
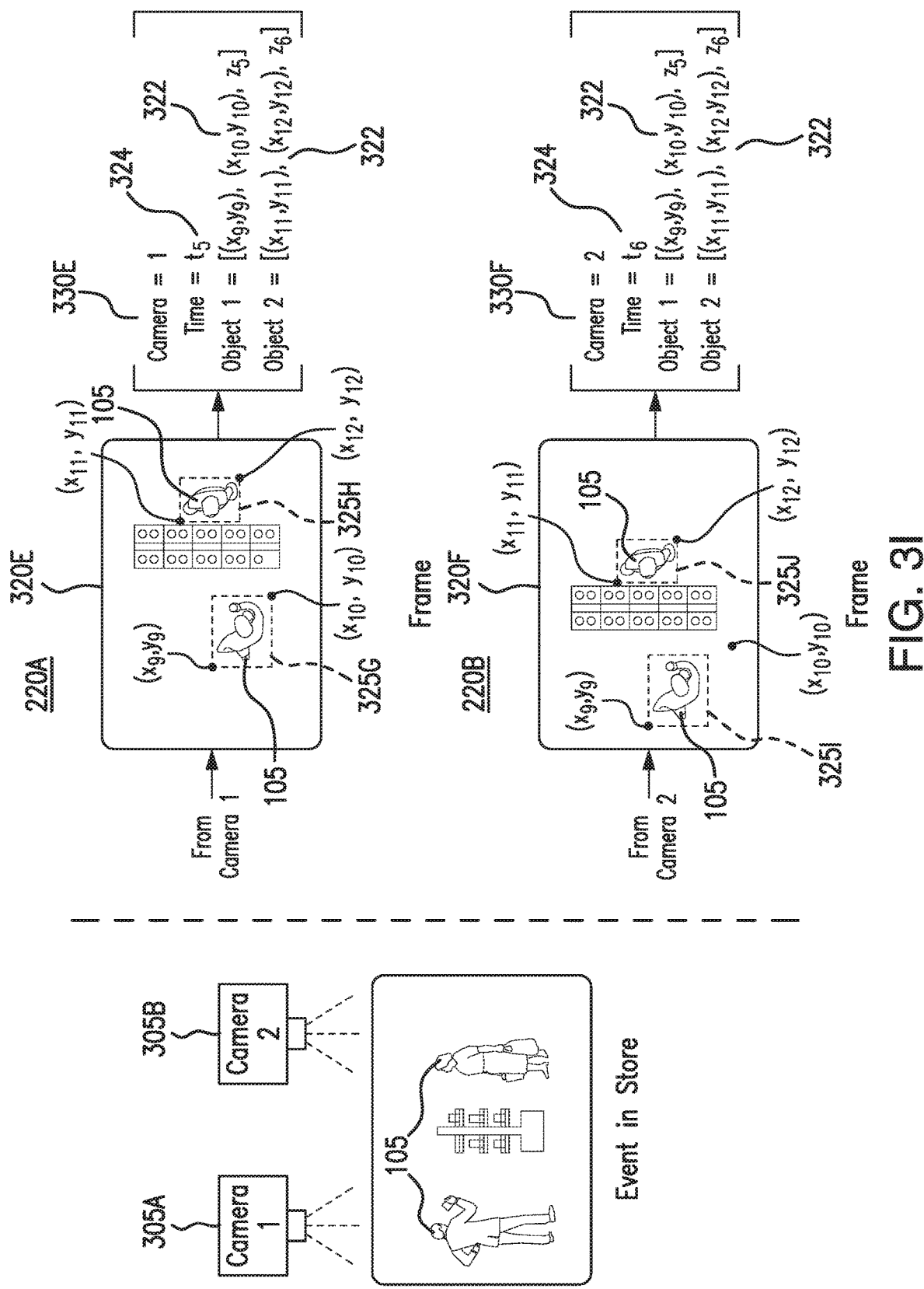
Figure 3J:
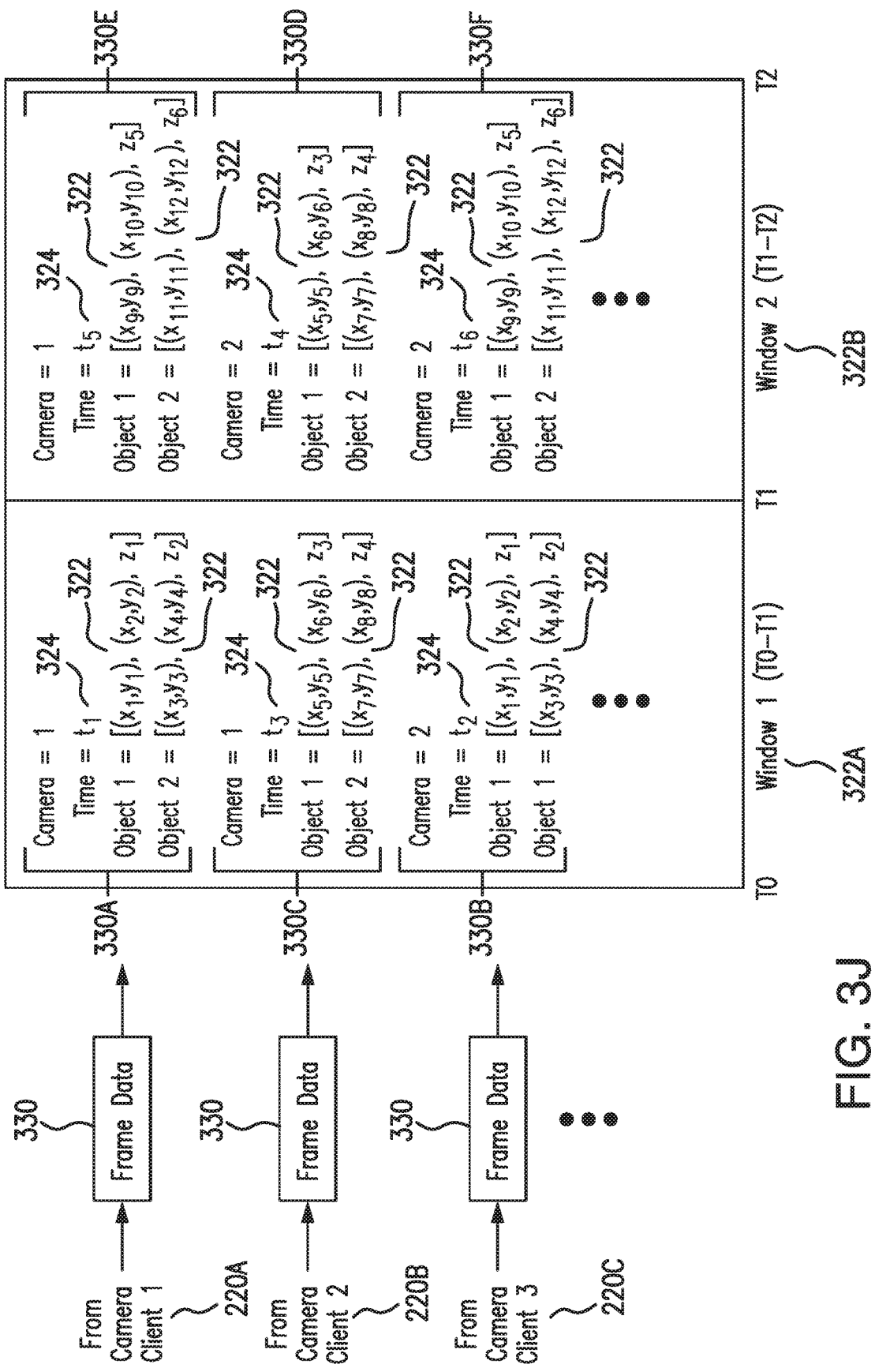
Figure 3K:
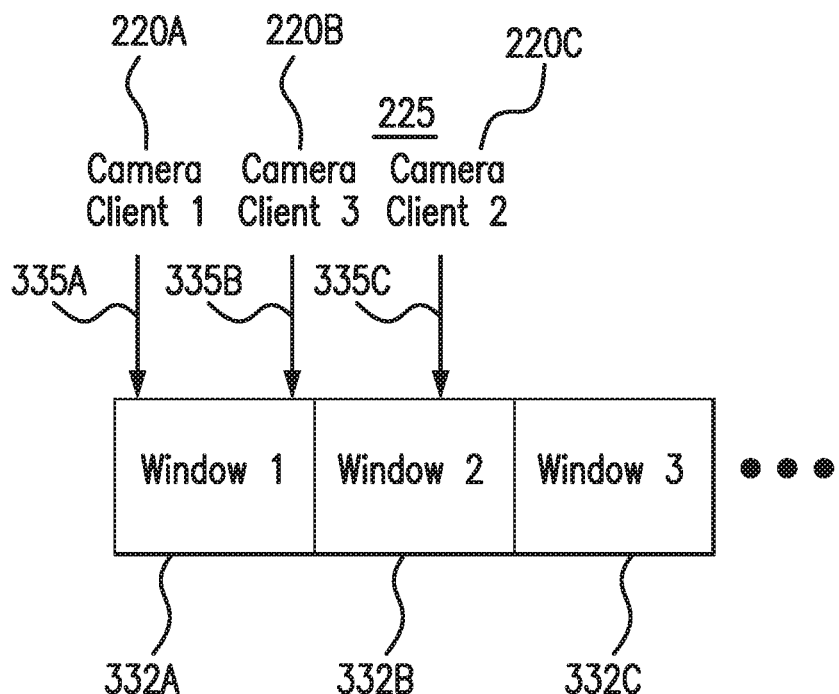
Figure 3L:
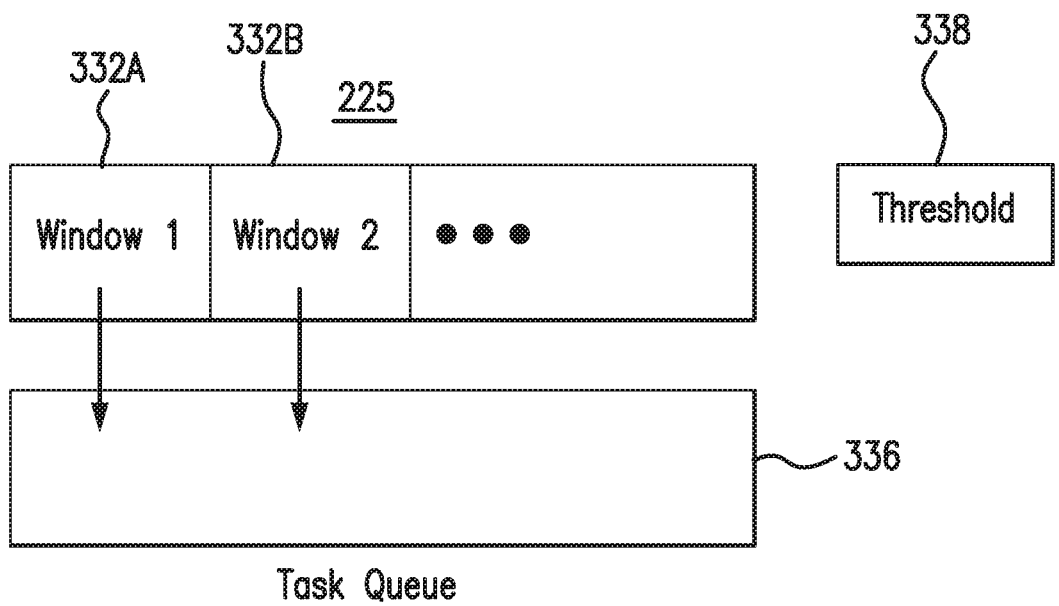
Figure 3M:
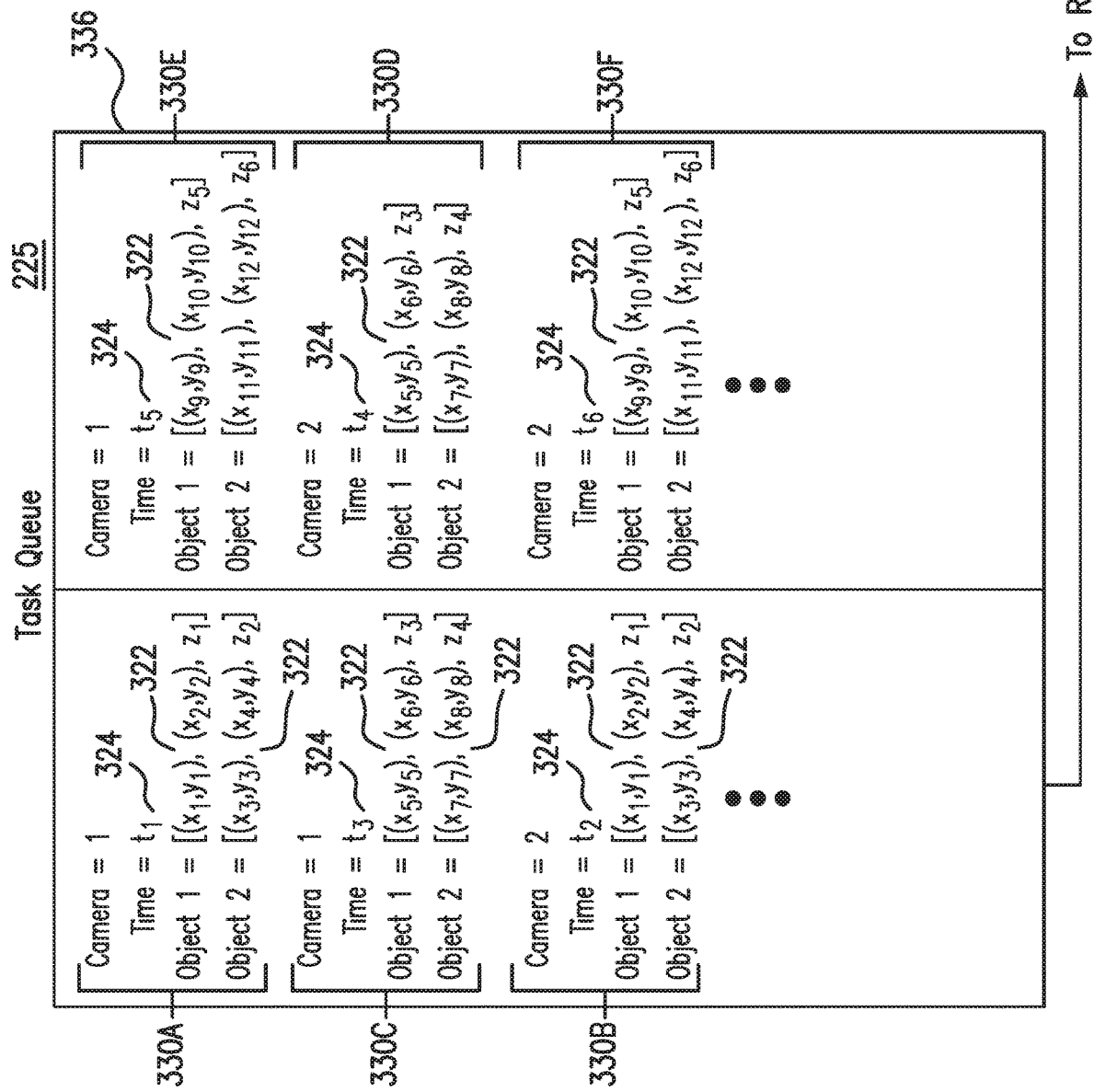
Figure 3N:
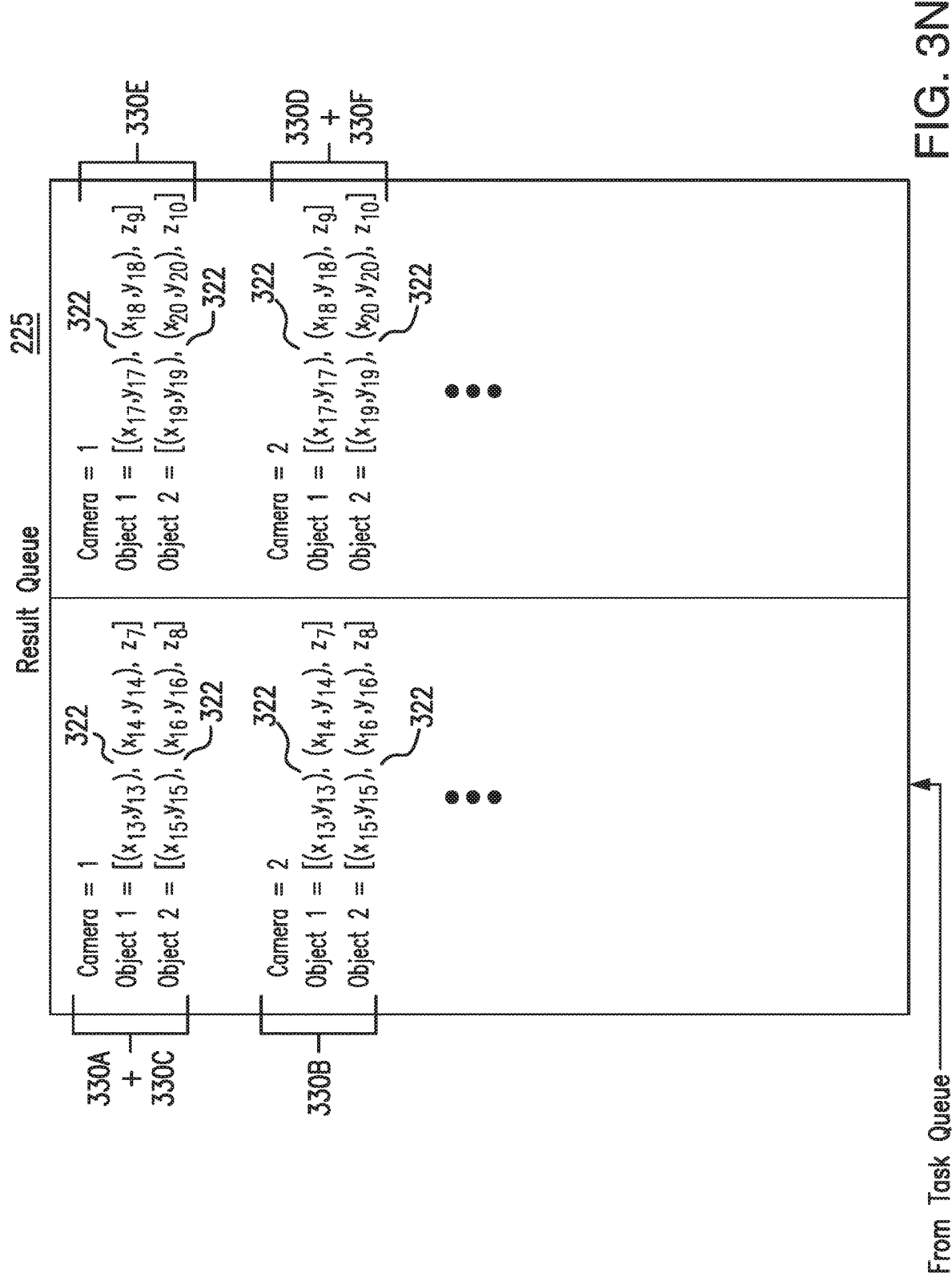
Figure 3O:
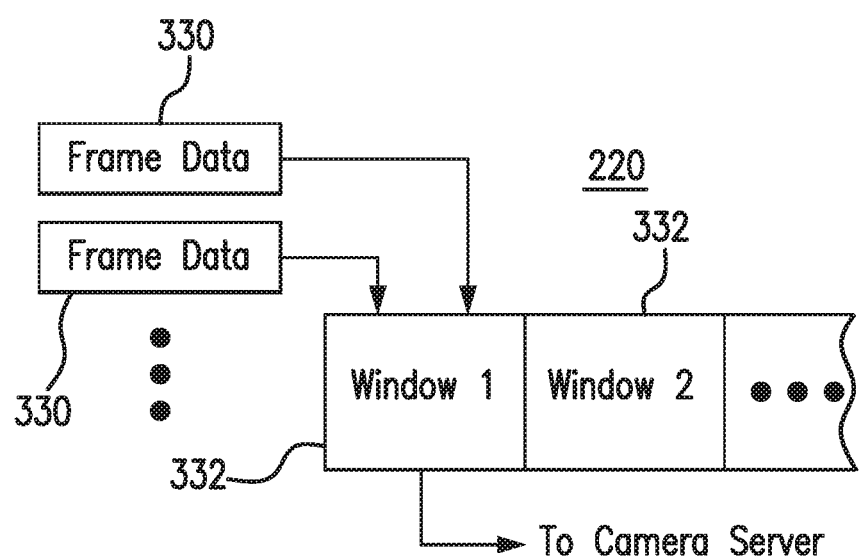
Figure 3P:
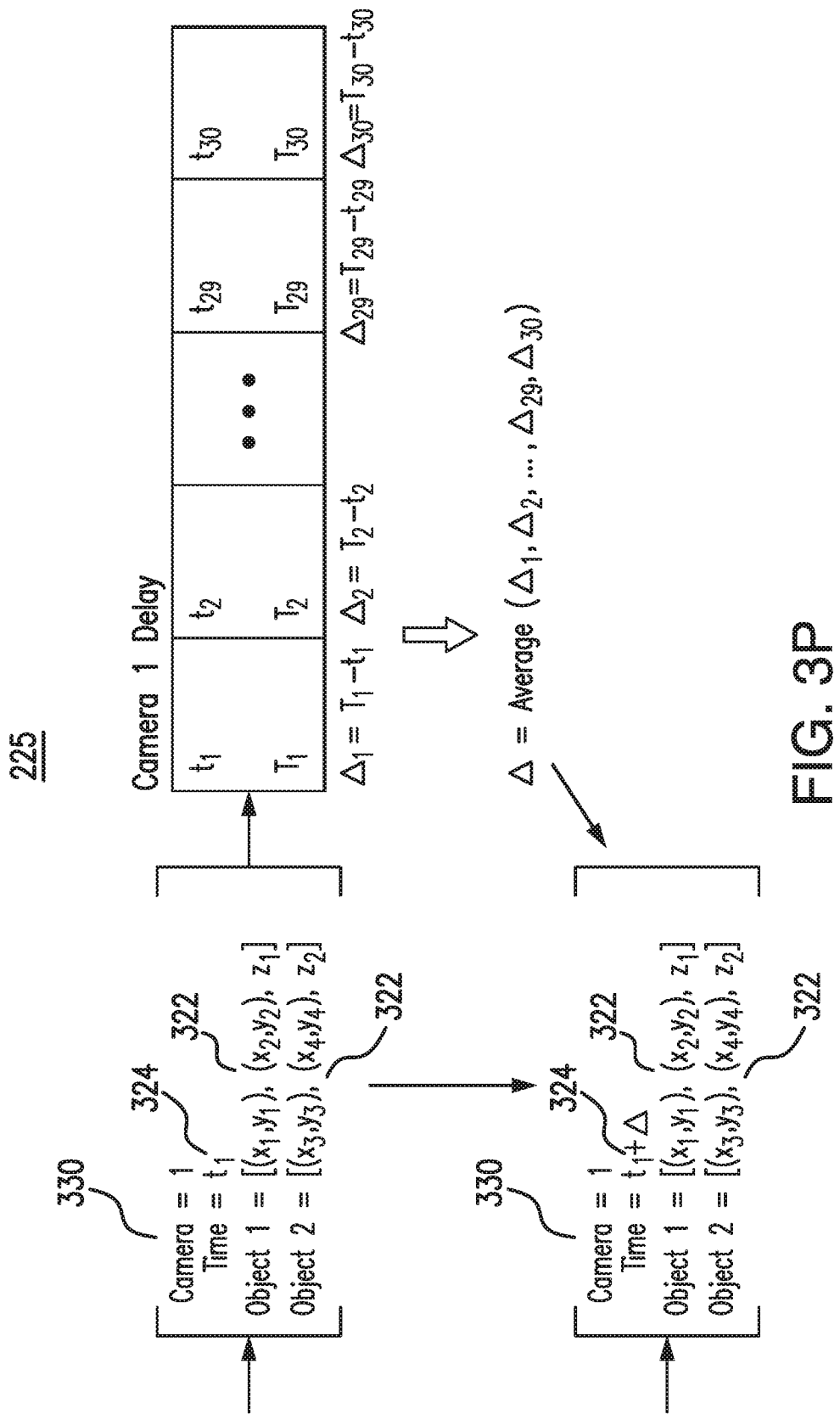
Figure 3Q:
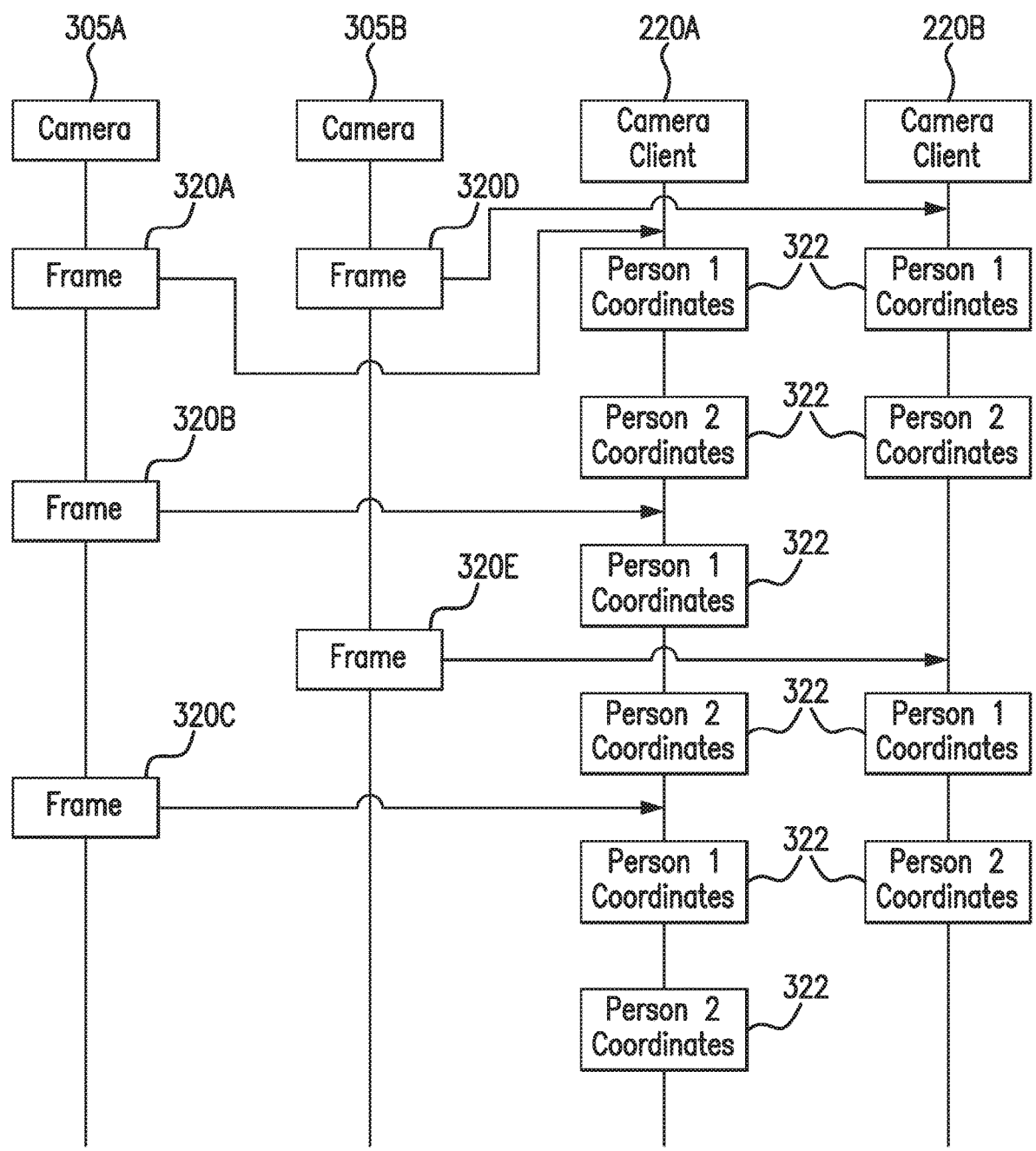
Figure 3R:
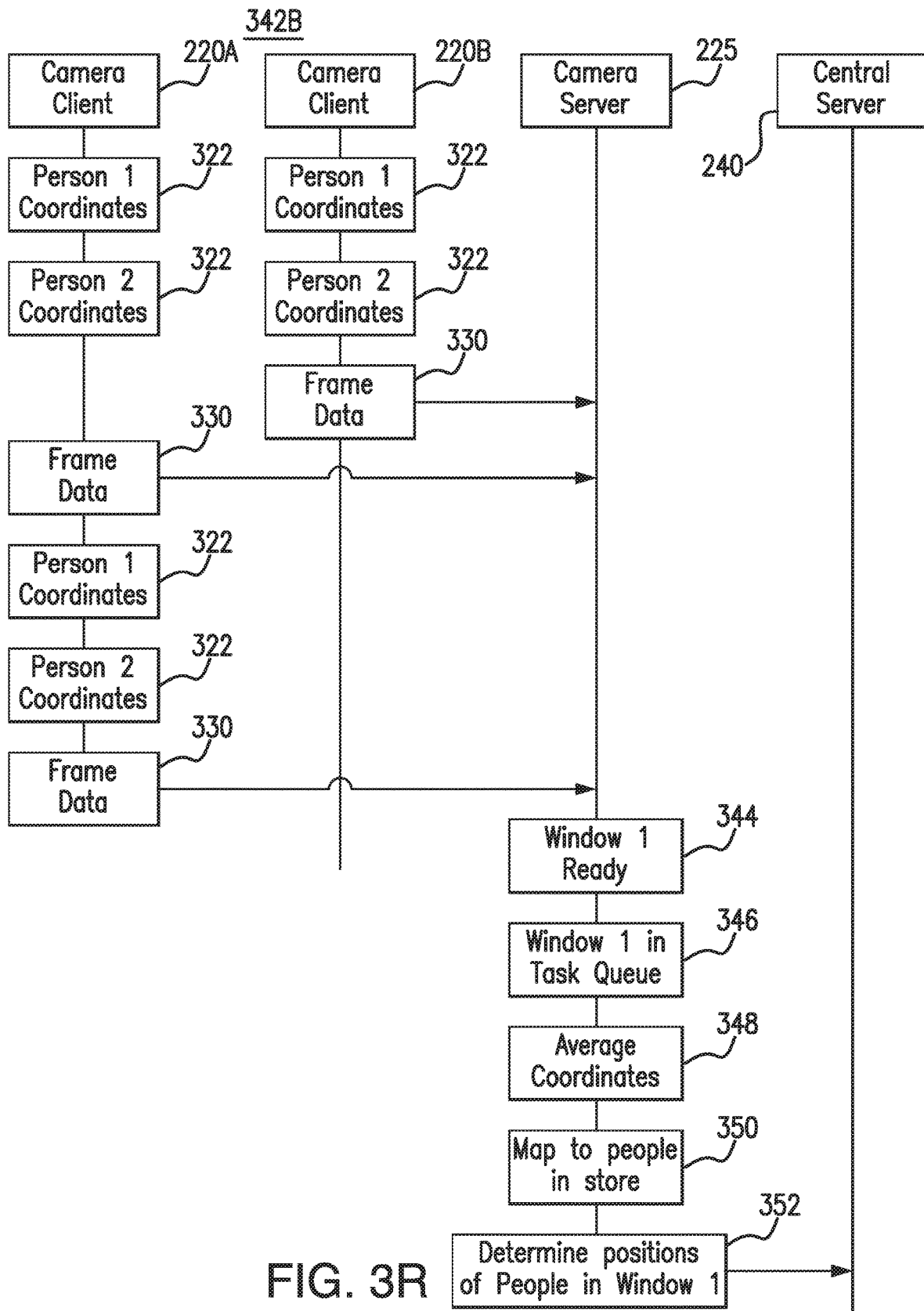

FIGS. 3A-3R show an example camera subsystem 202 and its operation in the tracking system 132. As discussed above, the camera subsystem 202 includes cameras 205, camera clients 220, and a camera server 225. Generally, the cameras 205 capture video of a space and send the videos to the camera clients 220 for processing. These videos are a sequence of frames or images of the space. The camera clients 220 detect the presence of people (e.g., shoppers 105) in the frames and determine coordinates in the frames (may also be referred to as "frame coordinates") for those people. The camera server 225 analyzes the frame coordinates from each camera client 220 to determine physical positions of the people in the space.

1. Camera Array

FIG. 3A illustrates an example camera array 300. As shown in FIG. 3A, camera array 300 includes multiple cameras 305. Although this disclosure shows camera array 300 including twelve cameras 305, camera array 300 may include any suitable number of cameras 305. Generally, camera array 300 is positioned above a space so that cameras 305 can capture overhead videos of portions of the space. These videos may then be processed by other components of the camera subsystem 202 to determine the physical position of people (e.g., shoppers 105) within the space. In the example of FIG. 3A, camera array 300 includes cameras 305A, 305B, 305C, 305D, 305E, 305F, 305G, 305H, 305I, 305J, 305K, and 305L.

Generally, cameras 305 in camera array 300 are arranged to form a rectangular array. In the example of FIG. 3A, camera array 300 is a 3×4 array of cameras 305 (e.g., three rows and four columns of cameras 305). Camera array 300 may include any suitable number of cameras 305 arranged in an array of any suitable dimensions.

Each camera 305 of camera array 300 is communicatively coupled to a camera client 220. In the example of FIG. 3A, each camera 305 of camera array 300 is communicatively coupled to one of camera client 1 220A, camera client 2 220B, or camera client 3 220C. Each camera 305 communicates captured video to the camera client 220 to which the camera 305 is communicatively coupled. The cameras 305 are communicatively coupled to the camera clients 220 according to particular rules to improve the resiliency of the tracking system 132. Generally, the cameras 305 are communicatively coupled to the camera clients 220 so that even if one camera client 220 goes offline, the coverage of a physical space provided by the cameras 305 communicatively coupled to the remaining camera clients 220 is sufficient to allow the tracking system 132 to continue tracking the position of people within the space.

Cameras 305 are communicatively to camera clients 220 using any suitable medium. For example, cameras 305 may be hardwired to camera clients 220. As another example, cameras 305 may wirelessly couple to camera clients 220 using any suitable wireless protocol (e.g., WiFi). Cameras 305 communicate captured videos through the communication medium to the camera clients 220.

Cameras 305 may be any suitable devices for capturing videos of the space. For example, cameras 305 may be three-dimensional cameras that can capture two-dimensional video of the space (e.g., x-y plane) and also detect the heights of people and/or objects in the video (e.g., z plane). As another example, cameras 305 may be two-dimensional cameras that capture two-dimensional videos of the space. Camera array 300 may include a mixture of different types of cameras 305.

FIG. 3B illustrates the coverage provided by cameras 305 of a camera array 300. As seen in FIG. 3B, a floor space is covered by different fields of view 310. Each field of view 310 is provided by a camera 305 of camera array 300. For example, field of view 310A is provided by camera 305A. Field of view 310B is provided by camera 305B. Field of view 310C is provided by camera 305C, and so forth. Each field of view 310 is generally rectangular in shape and covers a portion of the floor space. Each camera 305 captures video of the portion of the floor space that is covered by that camera's 305 field of view 310. For example, camera 305A captures video of the portion of the floor space covered by field of view 310A. Camera 305B captures video of the portion of the floor space covered by field of view 310B. Camera 305C captures video of the portion of the floor space covered by field of 310C, and so forth.

Each field of view 310 is shaded differently than its neighbors to distinguish the fields of view 310. Fields of view 310A, 310C, 310I, and 310K are shaded using lines that slant downwards to the right. Fields of view 310B, 310D, 310J, and 310L are shaded using lines that slant upwards to the right. Fields of view 310E and 310G are shaded using horizontal lines, and fields of view 310F and 310H are shaded using vertical lines. The shading of each field of view 310 is meant to distinguish that field of view 310 from other, directly adjacent fields of view 310. The shading is not meant to indicate a particular characteristic of the field of view 310. In other words, even though certain fields of view 310 share the same shading, the similar shading does not indicate that these fields of view 310 share certain characteristics (e.g., size, coverage, duration, and/or shape). Fields of view 310 may share one or more of these characteristics irrespective of their individual shading.

As seen in FIG. 3B, each field of view 310 overlaps with other fields of view 310. For example, field of view 310A overlaps fields of view 310B, 310E, and 310F. As another example, field of view 310F overlaps with fields of view 310A, 310B, 310C, 310E, 310G, 310I, 310J, and 310K. Like fields of view 310A and 310F, other fields of view 310 (e.g., fields of view 310B, 310C, 310D, 310E, 310G, 310H, 310I, 310J, 310K, and 310L) also overlap neighboring fields of view 310. The shading in the overlapping regions is a combination of the shadings in the individual fields of view that form the overlapping regions. For example, the overlapping region formed by fields of view 310A and 310B includes slanted lines running in opposite directions. As another example, the overlapping region formed by fields of view 310A, 310B, 310E, and 310F includes slanted lines running in opposite directions, horizontal lines, and vertical lines.

The overlapping fields of view 310 may be a result of the proximity of cameras 305 to each other in camera array 300. Generally, by overlapping fields of view 310, certain portions of the floor space can be captured by multiple cameras 305 of the camera array 300. As a result, even if certain cameras 305 go offline, there may still be sufficient coverage provided by the remaining cameras 305 for the tracking system 132 to operate. Additionally, the overlapping fields of view 310 may improve tracking the positions of people (e.g., shoppers 105) as they move about the space.

FIG. 3C illustrates an example camera grid 315. As seen in FIG. 3C, camera grid 315 includes a number of rows and a number of columns corresponding to the number of rows and columns in camera array 300. Each box of camera grid 315 represents a camera 305 of camera array 300. Camera grid 315 shows how the cameras 305 of camera array 300 are communicatively coupled to camera clients 220. Using the previous example of FIG. 3A, camera grid 315 shows that cameras 305A, 305D, 305G, and 305J are communicatively coupled to camera client 1 220A. Camera grid 315 also shows that cameras 305B, 305E, 305H, and 305K are communicatively coupled to camera client 2 220B. Camera grid 315 further shows that cameras 305C, 305F, 305I, and 305L are communicatively coupled to camera client 3 220C.

Camera grid 315 shows that cameras 305 are communicatively coupled to camera clients 220 according to particular rules. For example, a camera 305 that is communicatively coupled to a particular camera client 220 is not directly adjacent in the same row or the same column of camera grid 315 to another camera 305 that is communicatively coupled to the same camera client 220. As seen in FIG. 3C, for example, camera 305A is directly adjacent in the same row or the same column of camera grid 315 to cameras 305B and 305E. Camera 305A is communicatively coupled to camera client 1 220A while cameras 305B and 305E are communicatively coupled to camera client 2 220B. Camera 305F is directly adjacent in the same row or the same column of camera grid 315 to cameras 305B, 305E, 305G, and 305J. Camera 305F is communicatively to camera client 3 220C, while cameras 305B, 305E, 305G, and 305J are communicatively coupled to camera client 1 220A or camera client 2 220B.

As another example, a camera 305 that is communicatively coupled to a particular camera client 220 is diagonal in camera grid 315 to another camera 305 that is communicatively coupled to the same camera client 220. As seen in FIG. 3C, for example, cameras 305D, 305G, and 305J are diagonal to each other and are communicatively coupled to camera client 1 220A. Cameras 305C, 305F, and 305I are diagonal to each other and are all communicatively coupled to camera client 3 220C.

A consequence of arranging cameras 305 in this manner is that each camera client 220 is communicatively coupled to at least one camera 305 in a portion of camera grid 315. As seen in the example of FIG. 3C, each of camera client 1 220A, camera client 2 220B, and camera client 3 220C is communicatively coupled to at least one camera in any 2×2 portion of camera grid 315. As a result, even if one camera client 220 were to go offline, the other cameras in the 2×2 portion can still provide sufficient coverage of that 2×2 portion to allow the tracking system 132 to operate. Thus, the resiliency of the tracking system 132 is improved.

Although the previous example used a certain number of cameras 305 and a certain number of camera clients 220, the tracking system 132 may use any suitable number of cameras 305 and any suitable number of camera clients 220 to provide a desired level of overlap, scalability, and resiliency. FIG. 3D shows an example camera array 300 that includes additional cameras 305. The example of FIG. 3D also includes additional camera clients 220: camera client 1

220A through camera client N 220D. The cameras 305 in camera array 300 may be communicatively coupled to camera clients 220 according to the same rules or principles described in FIGS. 3A through 3C.

FIG. 3E shows how the cameras 305 may communicatively couple to the camera clients 220. As seen in FIG. 3E, camera grid 315 includes a number of rows and a number of columns. Across a row, the cameras 305 are communicatively coupled to the camera clients 220 in a sequential fashion. After a camera 305 is communicatively coupled to camera client N 220d, the sequence repeats until the end of the row is reached. Similarly, the cameras 305 in a column are sequentially coupled to camera clients 220. After a camera 305 is communicatively coupled to camera client N 220d, the pattern repeats.

As shown in FIGS. 3D and 3E, the tracking system 132 may be scaled to include any number of cameras 305 and any number of camera clients 220. Generally, a camera 305 that is communicatively coupled to a particular camera client 220 is not directly adjacent in the same row or the same column of camera grid 315 to another camera 305 that is communicatively coupled to the same camera client 220. Additionally, cameras 305 along a diagonal of camera grid 315 are communicatively coupled to the same camera client 220. Furthermore, each camera client 220 is communicatively coupled to at least one camera 305 in a portion of camera grid 315. The dimensions of the portion may depend upon the number of camera clients 220 in the tracking system 132. Generally, the dimensions of the portion are one less than the number of camera clients 220 in the tracking system 132. So, in the examples of FIGS. 3D and 3E, the dimensions of the portion are (N−1)×(N−1).

2. Initialization

FIG. 3F shows the initialization of the camera subsystem 202. As seen in FIG. 3F, the camera subsystem 202 includes a camera array 300, camera client 1 220A, camera client 2 220B, camera client 3 220C, and camera server 225. Camera subsystem 202, may include any suitable number of camera arrays 300, camera clients 220, and camera servers 225. Generally, during initialization, the cameras 305 of the camera array 300 start up and begin sending videos 302 to camera clients 220. Additionally, camera clients 220 and camera server 225 synchronize internal clocks 304. After the cameras 305 in camera array 300 have started up and after the internal clocks 304 are synchronized, camera clients 220 may begin processing videos 302 and communicating information to camera server 225 to perform the tracking operations of the camera subsystem 202.

During initialization, the cameras 305 of camera array 300 may power on and perform a startup sequence. For example, the components of the cameras 305 may boot up and/or warm-up. The cameras 305 may then begin capturing video footage and communicating videos 302 to their respective camera clients 220. The cameras 305 of camera array 300 may take different amounts of time to initialize. For example, certain cameras 305 may take a shorter or longer amount of time to initialize than other cameras 305 of camera array 300. Because the cameras 305 of camera array 300 do not wait for the other cameras 305 of camera array 300 to complete initialization before sending videos 302 to camera clients 220, the cameras 305 of camera array 300 may each begin sending videos 302 to camera clients 220 at different times. As a result, videos 302, and in particular, the frames of videos 302, may be desynchronized from the frames of other videos 302. In other words, the frames of these videos 302 are not being captured and sent by their respective cameras 305 simultaneously or at the same time. Consequentially, the frames of these videos 302 do not arrive at the camera clients 220 simultaneously or at the same time.

During initialization, camera clients 220 and camera server 225 power on and/or perform a bootup sequence. After booting up, camera clients 220 and camera server 225 synchronize their internal clocks 304. In the example of FIG. 3F, camera client 1 220A has an internal clock 1 304A. Camera client 2 220B has an internal clock 2 304B. Camera client 3 220C has an internal clock 3 304C. Camera server 225 has an internal clock 4 304D. Camera clients 220 and camera server 225 may synchronize their internal clocks 304 in any suitable manner. For example, camera clients 220 and camera server 225 may synchronize their internal clocks 304 using a synchronization protocol, such as the Network Time Protocol (NTP) or the Precision Time Protocol (PTP). Although a synchronization protocol may be used to synchronize the internal clocks 304 of camera clients 220 and camera server 225, this does not mean that these internal clocks 304 show exactly the same time or are perfectly synchronized with each other. As a result, there may still be a level of desynchronization amongst camera clients 220 and camera server 225.

Camera clients 220 may track the cameras 305 of camera array 300 that have completed initialization by tracking which cameras 305 have communicated videos 302 to camera clients 220. When camera clients 220 determine that each camera 305 of camera array 300 have begun sending videos 302 to camera clients 220, camera clients 220 may determine that camera array 300 has finished initialization. In response to that determination, camera clients 220 may begin processing the frames of the videos 302 and communicating information from those frames to camera server 225. Camera server 225 may then analyze the information from camera clients 220 to determine the physical position of people and/or objects within a space.

3. Camera Clients

FIGS. 3G-3I show the operation of camera clients 220 in the camera subsystem 202. Generally, camera clients 320 process videos 302 from cameras 305. Camera clients 320 may identify people or objects within the frames 320 of these videos 302 and determine coordinates 322 for these people or objects. Camera clients 320 may also generate timestamps 324 (e.g., by using internal clocks 304) that indicate when the camera clients 320 received particular frames 320. Camera clients 320 communicate these timestamps 324 and coordinates 322 to camera server 225 for further processing.

FIGS. 3G-3I show the operation of camera clients 210 as an event in a store 100 unfolds. During this event, for example, a first shopper 105 (e.g., a man) removes an item 130 from a shelf in the store 100 and a second shopper 105 (e.g., a woman) moves towards the shelf. Camera clients 320 analyze frames 320 of videos 302 to determine coordinates 322 for the man and the woman in the frames 320.

As seen in FIG. 3G, a man is standing near a shelf and a woman is standing further away from the shelf. Two cameras 305A and 305B are positioned above the space and capture video 302 of the man and the woman and the shelf These cameras 305A and 305B send their videos 302 to two different camera clients 220A and 220B. Camera 305A sends video 305 to camera client 220A. Camera 305B sends video 305 to camera client 220B.

Camera client 220A receives video 305 from camera 305A, and specifically a frame 320A of that video 305. Camera client 220A processes the frame 320A. As seen in frame 320A, the man is standing near the shelf and the woman is standing further away from the shelf. Camera client 220A processes frame 320A to determine bounding areas 325A and 325B around the man and the woman. In the example of FIG. 3G, bounding areas 325A and 325B are rectangular areas that surround the man and the woman, respectively. Bounding areas 325A and 325B approximate the positions of the man and the woman in the frame. This disclosure contemplates camera clients 220 determining bounding areas 325 that are of any suitable shape and of any suitable size. For example, bounding areas 325 may be circular or may be irregularly shaped (e.g, so as to follow the contours of the shopper 105 in the frames 320).

Camera client 220A determines coordinates 322 that define the bounding areas 325A and 325B within frames 320A and 320B (also referred to as "frame coordinates"). In the example of FIG. 3G, camera client 228 determines coordinates 322 $(x_1, y_1)$ and $(x_2, y_2)$ for bounding area 325A and coordinates 322 $(x_3, y_3)$ and $(x_4, y_4)$ for bounding area 325B. These coordinates 322 do not represent absolute coordinates in the physical space, but rather coordinates within the frame 320A. Camera clients 220 may determine any suitable number of coordinates 322 for bounding areas 325.

Camera client 220A then generates frame data 330A that contains information about frame 320A. As seen in FIG. 3G, frame data 330A includes an identifier for camera 305A (e.g., "camera=1"). Camera client 220A may also generate a timestamp 324 (e.g., using internal clock 304) that indicates when frame 320A was received by camera client 220A. In the example of FIG. 3G, that timestamp 324 is $t_1$. Frame data 320A also includes information about the people or objects within frame 320A. In the example of FIG. 3G, frame data 330A includes information for an object 1 and an object 2. Object 1 corresponds to the man and object 2 corresponds to the woman. Frame data 330A indicates the coordinates 322 for the man $(x_1, y_1)$ and $(x_2, y_2)$ along with a height of the man $z_1$. As discussed previously, cameras 305 may be three-dimensional cameras that can detect the height of objects and/or people. Cameras 305 may have provided the heights of the man and the woman to the camera clients 320. In the example of FIG. 3G, camera 305A may have detected the heights of the man and the woman to be $z_1$ and $z_2$, respectively. Frame data 330A also includes information for the woman including the coordinates 322 $(x_3, y_3)$ and $(x_4, y_4)$ and the height $z_2$. Camera client 220A may communicate frame data 330A to camera server 225 when frame data 330A is ready.

In a corresponding manner, camera client 220B may process video 302 from camera 305B. As seen in FIG. 3G, camera client 220B receives a frame 320B from camera 305B. Because camera 305B is at a different position than camera 305A, frame 320B will show a slightly different perspective of the event in the store 100 than frame 320A. Camera client 220B determines bounding areas 325C and 325D around the man and the woman, respectively. Camera client 220B determines frame coordinates 322 $(x_1, y_1)$ and $(x_2, y_2)$ for bounding area 325C, and frame coordinates 322 $(x_3, y_3)$ and $(x_4, y_4)$ for bounding area 325D. Camera client 220B also determines and generates a timestamp 324 $t_2$ (e.g., using internal clock 304) that indicates when camera client 220B received frame 320B. Camera client 220B then generates frame data 330B for frame 320B. Frame data 330B indicates that frame 320B was generated by camera 305B and was received by camera client 220B at $t_2$. Frame data 330B also indicates that a man and a woman were detected in frame 320B. The man corresponds to coordinates 322 $(x_1, y_1)$ and $(x_2, y_2)$ and has a height $z_1$. The woman corresponds to coordinates 322 $(x_3, y_3)$ and $(x_4, y_4)$ and has a height $z_2$. Camera client 220B communicates frame data 320B to camera server 225 when frame data 320B is ready.

The coordinates 322 generated by camera clients 220A and 220B for frame data 330A and 330B may be the coordinates within a particular frame 320 and not the coordinates within the physical space. Additionally, although the same subscripts have been used for the coordinates 322 in frame data 330A and 330B, this does not mean that these coordinates 322 are the same. Rather, because cameras 305A and 305B are in different positions, it is likely that the coordinates 322 in frame 330A are different from the coordinates 322 in frame data 330B. Camera clients 220A and 220B are determining the coordinates 322 of the bounding areas 325 within the frames 320 and not within the physical space. Camera clients 220A and 220B determine these local coordinates 322 independently of each other. The subscripts indicate a sequence of coordinates 322 generated by the individual camera clients 220. For example $(x_1, y_1)$ indicates the first coordinate 322 generated by camera client 220A and the first coordinate 322 generated by camera client 220B, which may be different values.

In FIG. 3H, the event in the store 100 has progressed. The man is still standing by the shelf and the woman has moved closer to the shelf. Camera clients 220A and 220B receive additional frames 320C and 320D from cameras 305A and 305B. Camera client 220A again determines bounding areas 325C and 325D for the man and the woman, respectively, and coordinates 322 for these bounding areas 325. Camera client 220A determines coordinates 322 $(x_5, y_5)$ and $(x_6, y_6)$ for bounding area 325C and coordinates 322 $(x_7, y_7)$ and $(x_8, y_8)$ for bounding area 325D. Camera client 220A also generates a timestamp 324 that indicates that frame 320C was received at time $t_3$. Camera client 220A generates frame data 330C, indicating that frame 320C was generated by camera 305A and received by camera client 220A at $t_3$. Frame data 330C also indicates that the man corresponds to coordinates 322 $(x_5, y_5)$ and $(x_6, y_6)$ and has a height at $z_3$ within frame 320C and that the woman corresponds to coordinates 322 $(x_7, y_7)$ and $(x_8, y_8)$ and has a height at $z_4$ within frame 320C.

Similarly, camera client 220B receives frame 320D from camera 305B. Camera client 220B determines bounding areas 325E and 325F for the man and the woman, respectively. Camera client 220B then determines coordinates 322 $(x_5, y_5)$ and $(x_6, y_6)$ for bounding area 325E and coordinates 322 $(x_7, y_7)$ and $(x_8, y_8)$ for bounding area 325F. Camera client 220B generates a timestamp 324 that indicates that frame 320D was received at time $t_4$. Camera client 220B generates frame data 330D that indicates frame 320D was generated by camera 305B and received by camera client 220B at $t_4$. Frame data 330D indicates that the man corresponds to coordinates 322 $(x_5, y_5)$ and $(x_6, y_6)$ and has a height of $z_3$ in frame 320D. Frame data 330D also indicates that the woman corresponds to coordinates 322 $(x_7, y_7)$ and $(x_8, y_8)$ and has a height of $z_4$ within frame 320D. Camera clients 220A and 220B communicate frame data 330C and 330D to camera sever 225 when frame data 330C and 330D are ready.

In FIG. 3I, the event in the store 100 has further progressed and the man has removed an item 130 from the shelf. Camera client 220A receives a frame 320E from camera 305A. Camera client 220A determines bounding areas 325G and 325H around the man and the woman, respectively. Camera client 220A determines coordinates 322 ($x_9$, $y_9$) and ($x_{10}$, $y_{10}$) for bounding area 325G and coordinates 322 ($x_{11}$, $y_{11}$) and ($x_{12}$, $y_{12}$) for bounding area 325H. Camera client 220A generates a timestamp 324 indicating when frame 320E was received by camera client 220A (e.g., by using internal clock 304). Camera client 220A generates frame data 330E that indicates that frame 320E was produced by camera 305A and received by camera client 220A at $t_5$. Frame data 330E indicates that the man corresponds to coordinates 322 ($x_9$, $y_9$) and ($x_{10}$, $y_{10}$) and has a height at $z_5$ within frame 320E. Frame data 330E also indicates that the woman corresponds to coordinates 322 ($x_{11}$, $y_{11}$) and ($x_{12}$, $y_{12}$) and has a height at $z_6$ in frame 320E.

Camera client 220B receives frame 320F from camera 305B. Camera client 220B determines bounding areas 325I and 325J around the man and the woman, respectively. Camera client 220BA determines coordinates 322 ($x_9$, $y_9$) and ($x_{10}$, $y_{10}$) for bounding area 325I and coordinates 322 ($x_{11}$, $y_{11}$) and ($x_{12}$, $y_{12}$) for bounding area 325J. Camera client 220B generates a timestamp 324 indicating when frame 320F was received by camera client 220B (e.g., by using internal clock 304). Camera client 220B then generates frame data 330F indicating that frame 320F was produced by camera 305B and received by camera client 220B at $t_6$. Frame data 330F indicates that the man corresponds to coordinates 322 ($x_9$, $y_9$) and ($x_{10}$, $y_{10}$) and has a height at $z_5$ in frame 320F. Frame data 330F also indicates that the woman corresponds to coordinates 322 ($x_{11}$, $y_{11}$) and ($x_{12}$, $y_{12}$) and has a height at $z_6$ in frame 320F. Camera clients 220A and 220B communicate frame data 330E and 330F to camera server 225 when ready.

4. Camera Server

FIGS. 3J-3P show the operation of camera server 225 in the camera subsystem 202. Generally, camera server 225 receives frame data 330 (e.g., 330A-330F) from the camera clients 220 in camera subsystem 202. Camera server 225 synchronizes and/or assigns the frame data 330 to particular time windows 332 based on timestamps 324 in the frame data 330. Camera server 225 then processes the information assigned to particular time windows to determine the physical positions of people and/or objects within the space during those time windows 332.

In FIG. 3J, camera server 225 receives frame data 330 from the camera clients 220 in camera subsystem 202. Camera server 225 assigns frame data 330 to time windows 332 depending on the timestamp 324 within frame data 330. Using the previous example, camera server 225 may determine that timestamps 324 $t_1$, $t_2$, and $t_3$ fall within a first time window 322A (e.g., between times T0 and T1) and that timestamps 324 $t_4$, $t_5$, and $t_6$ fall within a subsequent time window 332B (e.g., between times T1 and T2). As a result, camera server 225 assigns the frame data 330 for frames 320A, 320B, and 320C to time window 1 332A and the frame data 330 for frames 320D, 320E, and 320F to time window 2 332B.

By assigning frame data 330 to time windows 332, camera server 225 may account for desynchronization that occurs amongst the cameras 305, camera clients 220, and the camera server 225 in the camera subsystem 202. The duration of the time windows 332 can be set to be larger than the desynchronization that is expected to occur to mitigate the effects of desynchronization. For example, if the cameras 305 and camera clients 220 are expected to desynchronize by a few milliseconds, then the time window 332 can be set to last 100 milliseconds to counteract the desynchronization. In this manner, camera server 225 can mitigate the effects of desynchronization as the camera subsystem 202 is scaled to handle larger spaces by including more cameras 305 and camera clients 220. In the example of FIG. 3J, camera server 225 sets the duration of time window 1 332A to be between T0 and T1 and the duration of time window 2 332B to be between T1 and T2. Camera server 225 can set the duration of the time windows 332 to be any suitable amount to mitigate the effects of desynchronization. In certain embodiments, T0 may be the time when the cameras 305 in the camera subsystem 202 have finished initializing.

FIG. 3K shows an embodiment where camera server 225 uses cursors 335 to assign frame data 330 to time windows 332. Each cursor 335 may correspond to a particular camera client 220 in the camera subsystem 202. In the example of FIG. 3K, cursor 335A corresponds to camera client 1 220A, cursor 335B corresponds to camera client 3 220C, and cursor 335C corresponds to camera client 2 220B. Each cursor 335 points to a particular time window 332. When frame data 330 is received from a camera client 220, that frame data 330 is generally assigned to the time window 332 to which the cursor 335 for that camera client 220 points. For example, if frame data 330 is received from camera client 1 220A, then that frame data 330 is generally assigned to time window 1 332A, because cursor 335A is pointing to time window 1 332A.

Camera server 225 may determine whether to advance cursor 335A when frame data 330 is received from the camera client 220 corresponding to that cursor 335. If that frame data 330 has a timestamp 324 that belongs in a subsequent time window 332, then camera server 225 may advance the cursor 335 to that time window 332, thereby indicating that camera server 225 is not expecting to receive any more frame data 330 from that camera client 220 that belongs in a prior time window 332. In this manner, camera server 225 can quickly and efficiently assign frame data 330 to time windows 332 without checking every time window 332 when frame data 330 is received. For example, if camera client 2 220B is faster at sending information than camera client 1 220A and camera client 3 220C, then cursor 335C may advance far ahead of cursors 335A and 335B. When camera server 225 receives frame data 330 from camera client 2 220B, camera server 225 need not check every time window 332 beginning from time window 1 332A to determine to which time window 332 that frame data 330 should be assigned. Rather, camera server 225 can start at the time window 332 to which cursor 335C points. In other words, camera server 225 need not first check whether a timestamp 324 in the frame data 330 from camera client 2 220B indicates a time that falls within time window 1 332A and then whether that time falls within time window 2 332B. Instead, camera server 225 can first check whether that time falls within time window 3 332C and ignore checking whether that time falls within time window 1 332A and time window 2 332B. As a result, the frame data 330 is quickly and efficiently assigned to the correct time window 332.

FIG. 3L illustrates camera server 225 moving out for processing frame data 330 that has been assigned to particular time windows 332. Generally, camera server 225 may determine that the frame data 330 assigned to a particular time window 332 is ready for processing. In response to that determination, camera server 225 may move the frame data 330 from a particular time window 332 to a task queue 336. Information in the task queue 336 is then processed to determine the physical location of people or objects within a space during particular time windows 332.

Camera server 225 determines that frame data 330 assigned to a particular time window 332 is ready for processing in any suitable manner. For example, camera server 225 may determine that a particular time window 332 is ready for processing when that time window 332 has frame data 330 for frames 320 from a sufficient number of cameras 305. Camera server 225 may use a threshold 338 to make this determination. When a particular time window 332 has been assigned frame data 330 for frames 320 from a number of cameras 305 that exceeds threshold 338, camera server 225 may determine that that time window 332 is ready for processing and move the information for that time window 332 to the task queue 336. For example, assume threshold 338 indicates that frame data 330 for frames 320 from ten cameras 305 of an array 300 of twelve cameras 305 need to be received before a time window 332 is ready for processing. If time window 332 contains frame data 330 for frames 320 from only eight cameras 305, then camera server 225 determines that time window 332 is not ready for processing, and as a result, time window 332 waits to be assigned frame data 330 for frames 320 from additional cameras 305. When time window 332 has received frame data 330 for frames 320 from ten or more cameras 305, camera server 225 determines that time window 332 is ready for processing and moves frame data 330 in time window 332 to task queue 336.

Camera server 225 may also determine that a particular time window 332 is ready for processing when a subsequent time window 332 has received frame data 330 for frames 320 from a number of cameras 305 exceeding threshold 338. Using the previous example, even if time window 1 332A has been assigned frame data 330 for frames 320 from eight cameras, camera server 225 may nevertheless determine that time window 1 332A is ready for processing when time window 2 332B has been assigned frame data 330 for frames 320 from ten or more cameras 305 (e.g., from every camera 305 in camera array 300). In this scenario, camera server 225 may assume that no additional frame data 330 will be assigned to time window 1 332A because frame data 330 for frames 320 from a sufficient number of cameras 305 has been assigned to a subsequent time window 2 332B. In response, camera server 225 moves frame data 330 in time window 1 332A to task queue 336.

Camera server 225 may also determine that a particular time window 332 is ready for processing when that time window 332 has been awaiting processing for a certain period of time. For example, if an error or bug occurs in the system and frames 320 from a number of cameras 305 are not sent or are lost, then a time window 332 may not receive frame data 330 for frames 320 from enough cameras 305. As a result, processing for that time window 332 may stall or be delayed. Camera server 225 may use a timeout or age-out beyond which a time window 332 does not wait for processing. Thus, when the time window 332 has not been processed for a certain period of time exceeding the timeout or the age-out, camera server 225 may nevertheless send the frame data 330 in that time window 332 to the task queue 336. Using the previous example, assume the timeout is 200 milliseconds. If time window 1 332A has been stuck with frame data 330 from frames 320 from eight cameras 305 for over 200 milliseconds, camera server 225 may determine that time window 1 332A has waited long enough for additional frame data 330 and that time window 1 332A is ready for processing. In response, camera server 225 moves frame data 330 in time window 1 332A to task queue 336.

In certain embodiments, when a time window 332 times out or ages out, camera server 225 may adjust threshold 338 so that future time windows 332 are less likely to time out or age out. For example, camera server 225 may lower threshold 338 when a time window 332 times out or ages out. Likewise, camera server 225 may increase threshold 338 when a subsequent time window 332 does not time out or age out. Camera server 225 may adjust threshold 338 based on the number of cameras 305 that have sent information for a particular time window 332. For example, if a particular time window 332 times out or ages out when it has frame data 330 for frames 320 from eight cameras 305, and threshold 338 is ten cameras 305, camera server 225 may reduce threshold 338 to a value closer to eight cameras. As a result, that time window 332 may then have frame data 330 for frames 320 from a sufficient number of cameras 305 and be moved to task queue 336. When a subsequent time window 332 does not time out because it has received frame data 330 for frames 320 from nine cameras 305, camera server 225 may adjust threshold 338 towards nine cameras 305. In this manner, camera server 225 may dynamically adjust the threshold 338 to prevent bugs, errors, and/or latency from causing delays in the camera subsystem 202.

In certain embodiments, camera server 225 processes time windows 332 sequentially. In other words, camera server 225 does not process a subsequent time window 332 until a prior time window 332 is ready for processing. In the example of FIG. 3L, camera server 225 may not place time window 2 332B into the task queue 336 until time window 1 332A has been placed into the task queue 336. In this manner, the progression of events in a store 100 is evaluated sequentially (e.g., as the events unfold), which allows for proper tracking of the position of people in the store 100. If time windows 332 were not evaluated sequentially, then it may seem to the tracking system 132 that the event in the store 100 progressed in a different and incorrect order.

FIG. 3M illustrates a task queue 336 of camera server 225. As shown in FIG. 3M, the task queue 336 includes frame data 330 from two time windows 332. At the beginning of the task queue 336 is frame data 330 for frames 320A, 320B, and 320C. Following in the task queue 336 is frame data 330 for frames 320D, 320E, and 320F. Camera server 225 may process the entries in the task queue 336 in order. Thus, camera server 225 may first process the first entry of the task queue 336 and process the frame data 330 for frames 320A, 320B, and 320C. Camera server 225 processes an entry of a task queue 336 and then moves that entry to a result queue.

To process an entry of task queue 336, camera server 225 may combine or cluster the coordinates 322 of the same objects detected by the same cameras 320 to calculate combined coordinates 332 for that object. As a result of this processing, each time window 332 should include only one set of coordinates 322 per object per camera 305. After this processing, the combined coordinates 322 are placed into a result queue. FIG. 3N illustrates a result queue 340 of camera server 225. As seen in FIG. 3N, result queue 340 includes the combined coordinates 332 for two time windows 332.

As an example, camera server 225 first processes the first entry in the task queue 336, which includes frame data 330 for frames 320A, 320B, and 320C. Frames 320A and 320C are from the same camera 320A. As a result, camera server 225 may use the frame data 330A and 330C for frames 320A and 320C to calculate a combined coordinate 322 for the people or objects detected by camera 320A. As seen in FIG. 3N, camera server 225 has determined combined coordinates 322 $(x_{13}, y_{13})$, and $(x_{14}, y_{14})$ and a combined height $z_7$ for object 1 detected by camera 1 305A and combined coordinates 322 ($x_{15}$, $y_{15}$) and ($x_{16}$, $y_{16}$) and a combined height $z_8$ for object 2 detected by camera 1 305A. These combined coordinates 322 and combined heights are the combined coordinates 322 and combined heights for the man and the woman in the video frames 302 received by camera 305A during the first time window 332A. Likewise, camera server 225 may determine combined coordinates 322 and combined heights for the objects detected by camera 2 305B during the first time window 332A. For example, camera server 225 may use frame data 330B for frame 320B (and frame data 330 for any other frames 320 received by camera 2 305B during the first time window 332A) to determine combined coordinates 322 ($x_{13}$, $y_{13}$), and ($x_{14}$, $y_{14}$) and a combined height $z_7$ for object 1 detected by camera 2 305B and combined coordinates 322 ($x_{15}$, $y_{15}$) and ($x_{16}$, $y_{16}$) and a combined height $z_8$ for object 2 detected by camera 2 305B. Camera server 225 may determine combined coordinates 322 for each object detected by cameras 305 in the first time window 332A in this manner.

Camera server 225 then determines combined coordinates 322 for objects detected by the cameras 305 during the second time window 332B in a similar fashion. For example, camera server 225 may use frame data 330E for frame 320E (and frame data 330 for any other frames 320 received by camera 1 305A during the second time window 332B) to determine combined coordinates 322 ($x_{17}$, $y_{17}$), and ($x_{18}$, $y_{18}$) and a combined height $z_9$ for object 1 detected by camera 1 305A and combined coordinates 322 ($x_{19}$, $y_{19}$) and ($x_{20}$, $y_{20}$) and a combined height $z_{10}$ for object 2 detected by camera 1 305A. Camera server 225 may also use frame data 330D and 330F for frames 320D and 320F to determine combined coordinates 322 ($x_{17}$, $y_{17}$), and ($x_{18}$, $y_{18}$) and a combined height $z_9$ for object 1 detected by camera 2 305B and combined coordinates 322 ($x_{19}$, $y_{19}$) and ($x_{20}$, $y_{20}$) and a combined height $z_{10}$ for object 2 detected by camera 2 305B.

Camera server 225 calculates combined coordinates 322 and combined heights in any suitable manner. For example, camera server 225 may calculate combined coordinates 322 and combined heights by taking the average of the coordinates 322 and the heights of particular objects detected by the same camera 305 in a particular time window 332. Using the example in FIG. 3M, camera server 225 may calculate combined coordinates 322 ($x_{13}$, $y_{13}$) for camera 1 305A by taking the average of coordinates 322 ($x_1$, $y_1$) and ($x_5$, $y_5$) from frame data 330A and 330C. Similarly, camera server 225 may determine the combined coordinate 322 ($x_{14}$, $y_{14}$) for camera 1 305A by taking the average of coordinates 322 ($x_2$, $y_2$) and ($x_6$, $y_6$) from frame data 330A and 330C. Camera server 225 may determine combined height $z_7$ for camera 1 305A by taking the average of heights $z_1$ and $z_3$ from frame data 330A and 330C. Similarly, camera server 225 may determine combined coordinates 322 ($x_{17}$, $y_{17}$) for camera 2 305B by taking the average of coordinates 322 ($x_5$, $y_5$) and ($x_9$, $y_9$) from frame data 330D and 330F. Likewise, camera server 225 may determine combined coordinates 322 ($x_{18}$, $y_{18}$) for camera 2 305B by taking the average of coordinates 322 ($x_6$, $y_6$) and ($x_{10}$, $y_{10}$) from frame data 330D and 330F. Camera server 225 may determine combined height $z_9$ for camera 2 305B by taking the averages of heights $z_3$ and $z_5$ from frame data 330D and 330F. Camera server 225 takes these averages because these are the coordinates 322 and heights for the same object determined by the same camera 305 during the same time window 332.

Camera server 225 may follow a similar process to determine or to calculate the combined coordinates for object 2 detected by cameras 1 305A and 2 305B. Camera server 225 may calculate combined coordinates 322 ($x_{15}$, $y_{15}$) for camera 1 305A by taking the average of coordinates 322 ($x_3$, $y_3$) and ($x_7$, $y_7$) from frame data 330A and 330C. Similarly, camera server 225 may determine the combined coordinate 322 ($x_{16}$, $y_{16}$) for camera 1 305A by taking the average of coordinates 322 ($x_4$, $y_4$) and ($x_8$, $y_8$) from frame data 330A and 330C. Camera server 225 may determine combined height $z_8$ for camera 1 305A by taking the average of heights $z_2$ and $z_4$ from frame data 330A and 330C. Similarly, camera server 225 may determine combined coordinates 322 ($x_{19}$, $y_{19}$) for camera 2 305B by taking the average of coordinates 322 ($x_7$, $y_7$) and ($x_{11}$, $y_{11}$) from frame data 330D and 330F. Likewise, camera server 225 may determine combined coordinates 322 ($x_{20}$, $y_{20}$) for camera 2 305B by taking the average of coordinates 322 ($x_8$, $y_8$) and ($x_{12}$, $y_{12}$) from frame data 330D and 330F. Camera server 225 may determine combined height $z_{10}$ for camera 2 305B by taking the averages of heights $z_4$ and $z_6$ from frame data 330D and 330F.

Camera server 225 uses any other suitable calculation to calculate combined coordinates and combined heights. For example, camera server 225 may take a median of coordinates 322 and heights for objects detected by the same camera 305 during a time window 332. Camera server 225 may also use clustering processes to calculate the combined coordinates 322 and combined heights. For example, camera server 225 may use K-means clustering, Density-based spatial clustering of applications with noise (DBSCAN), k-medoids, gaussian mixture models, and hierarchical clustering to calculate combined coordinates 322 and combined heights.

After camera server 225 has calculated the combined coordinates 322 and combined heights, camera server 225 has determined the coordinates 322 for each object detected by each camera 305 during a time window 332. However, camera server 225 may perform additional processing to determine whether the object detected by different cameras 305 are the same object. Camera server 225 may use linking and homography to determine which objects detected by which cameras 305 are actually the same person or object in a space. Camera server 225 may then take the combined coordinates 322 for those objects from the different cameras 305 and employ homography to determine a physical location for that person or object in the physical space during a time window 332. Embodiments of this process are described in U.S. patent application Ser. No. 16/663,710, "Topview Object Tracking Using a Sensor Array", the contents of which are incorporated by reference herein in its entirety. In this manner, camera server 225 determines the physical locations of people and/or objects within the space during particular time windows 332.

In particular embodiments, camera clients 220 may also use the same time windows 332 as camera server 225 to communicate frame data 330 in batches to camera server 225. As seen in FIG. 3O, camera client 220 assigns frame date 330 to time windows 332 based on the timestamps 324 within that frame data 330. Camera client 220 may determine that a particular time window 332 is ready to be communicated to camera server 225 in a similar way as camera server 225 determines a time window 332 is ready for processing. When camera client 220 determines that a particular time window 332 is ready (e.g., when each camera 305 communicatively coupled to camera client 220 has communicated a frame in that time window 332), camera client 220 communicates the frame data 330 assigned to that time window 332 as a batch to the camera server 225. In this manner, camera server 225 may assign frame data 330 to time windows 332 even more quickly and more efficiently because camera server 225 receives the frame data 330 for a time window 332 as a batch from camera client 220.

In certain embodiments, even if camera server 225 and camera clients 220 are not synchronized, camera server 225 can account for desynchronization that occurs (e.g., by desynchronized internal clocks 302, by latency differences between camera clients 220 to camera server 225, by processing speed differences between camera clients 220, etc.) by adjusting the timestamps 324 in frame data 330. FIG. 3P shows camera server 225 adjusting timestamps 324. As discussed previously, frame data 330 includes a timestamp 324 generated by camera client 220 that indicates when camera client 220 received a frame 320. In the example of FIG. 3P, frame data 330 indicates that camera client 220 received frame 320 at time $t_1$. If the camera clients 220 and camera server 225 are not synchronized, then the timestamp 324 $t_1$ is relatively meaningless to camera server 225 because the camera server 225 cannot be assured that timestamps 324 from different camera clients 220 are accurate relative to each other. Thus, it is difficult, if not impossible, to precisely analyze frame data 330 from different and/or multiple camera clients 220.

Camera server 225 can adjust timestamps 324 for particular cameras 305 to account for desynchronization. Generally, camera server 225 determines a delay for each camera 305 by tracking the delay for prior frames 320 from that camera 305. Camera server 225 then adjusts timestamps 324 for frame data 330 for frames 320 from that camera 305 by the determined delay. In the example of FIG. 3P, camera server 225 determines a delay for camera 1 305A by determining, for each frame 320 ($x$) from camera 1, the difference in time (labeled $\Delta_x$) between the timestamp 324 indicated in frame data 330 for that frame 320 (labeled $t_x$) and the time camera server 225 received the frame data 330 (labeled $T_x$). Camera server 225 calculates an average delay (labeled $\Delta$) by averaging the differences in time ($\Delta_x$) for a prior number of frames 320. In the example of FIG. 3P, camera server 225 averages the differences in time for the previous thirty frames 320 to determine the average delay. Camera server then adds the average delay ($\Delta$) to the timestamp 324 for the frame data 330 to adjust the timestamp 324 to account for desynchronization. In this manner, camera server 225 and tracking system 132 can function properly even if camera clients 220 and camera server 225 are not synchronized (e.g., according to a clock synchronization protocol).

5. Example Method

FIGS. 3Q and 3R are flowcharts illustrating an example method 342 of operating the camera subsystem 202. In particular embodiments, various components of the camera subsystem 202 perform the steps of method 342. Generally, by performing method 342, the camera subsystem 202 determines the physical position of people or objects within a space.

As seen in FIG. 3Q, method 342A begins with cameras 305A and 305B generating and communicating frames 320A and 320D to camera clients 220A and 220B, respectively. Camera clients 220A and 220B then determine coordinates 322 for two people detected in frames 320A and 320B. These coordinates may define bounding areas 325 around these people.

Camera 305A then generates frame 320B and communicates frame 320B to camera client 220A. Camera client 220A generates coordinates 322 for two people shown in frame 320B. During that process, camera 305B generates frame 320E and communicates frame 320E to camera client 220B. Camera client 220B then determines coordinates 322 for two people detected in frame 320E. Camera 305A then generates frame 320C and communicates frame 320C to camera client 220A. Camera client 220A determines coordinates 322 for two people detected in frame 320C. Importantly, FIG. 3Q shows that frames from cameras 305A and 305B may not be generated and communicated simultaneously or synchronously. Additionally, coordinates for people detected in frames 320 may not be generated simultaneously or synchronously in camera clients 220A and 220B.

FIG. 3R shows method 342B which continues from method 342A of FIG. 3Q. As seen in FIG. 3R, camera client 220A generates frame data 330 from the coordinates 322 for the two people detected in frame 320A. Likewise, camera client 220B generates frame data 330 using the coordinates 322 for the two people detected in frame 320D. Camera clients 220A and 220B communicate the frame data 330 to camera server 225. Camera client 220A generates additional frame data 330 using the coordinates 322 for the two people detected in frame 320B. Camera client 220A then communicates that frame data 330 to camera server 225. Camera server 225 may assign the frame data 330 to a time window 332. Camera server 225 may determine that that time window 332 is ready for processing in step 344 and, in response, place the frame data 330 in that time window 332 into a task queue 336 in step 346. Camera server 225 may then combine or cluster the coordinates 322 in that time window 322 to determine combined coordinates 322 in step 348. For example, camera server 225 may average the coordinates 322 in that time window to determine combined coordinates 322 for the people detected by the different cameras 305 during that time window 332. Camera server 225 may then map the people detected by the different cameras 305 to people in the space in step 350. Camera server 225 may then determine the positions of the people during that time window 332 in step 352. Camera server 225 communicates these determined positions to central server 240.

Modifications, additions, or omissions may be made to method 342 depicted in FIGS. 3Q and 3R. Method 342 may include more, fewer, or other steps. For example, steps may be performed in parallel or in any suitable order. While discussed as particular components of camera subsystem 202 performing the steps, any suitable component of camera subsystem 202 may perform one or more steps of the method.

6. Other Features

Figure 3S:
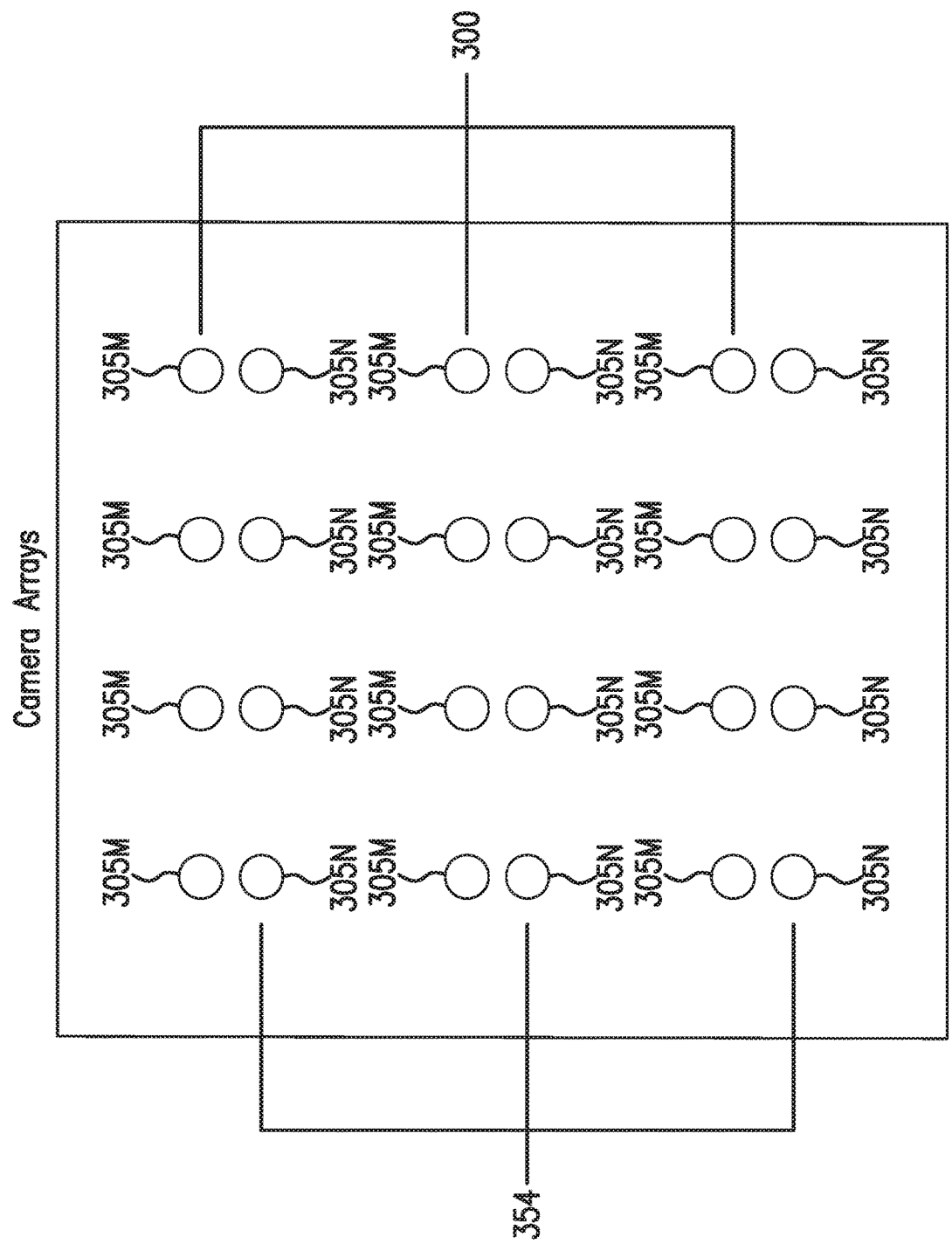

In particular embodiments, the camera subsystem 202 may include a second camera array that operates in tandem with the first camera array 300 of the camera subsystem 202. FIG. 3S shows an embodiment that includes two camera arrays 300 and 354. Camera array 300 includes cameras 305M. Camera array 354 includes cameras 305N. Cameras 305N operate in the same way as cameras 305M and can be used to determine positions of objects and/or people in a space using the same techniques described using FIGS. 3A-3R.

Each camera 305N is positioned slightly offset from a camera 305M of camera array 300. In this manner, cameras 305M capture video that is similar to the video captured by cameras 305N. In certain embodiments, cameras 305M may use different versions of software or different versions of software may be used to process video from cameras 305M relative to cameras 305N. In this manner, newer software can be run for cameras 305N to test the effectiveness of that software. The testing of that software does not interrupt the operation of the camera subsystem 202 because cameras 305M may still be using the previous software, which also acts as a baseline for comparing against the operation of the new software running on cameras 305N. For example, the accuracy of the position tracking provided by the new software can be determined and compared against the accuracy provided by the old software. If the new software is less accurate than the old software, then the old software should continue to be used.

Figure 3T:
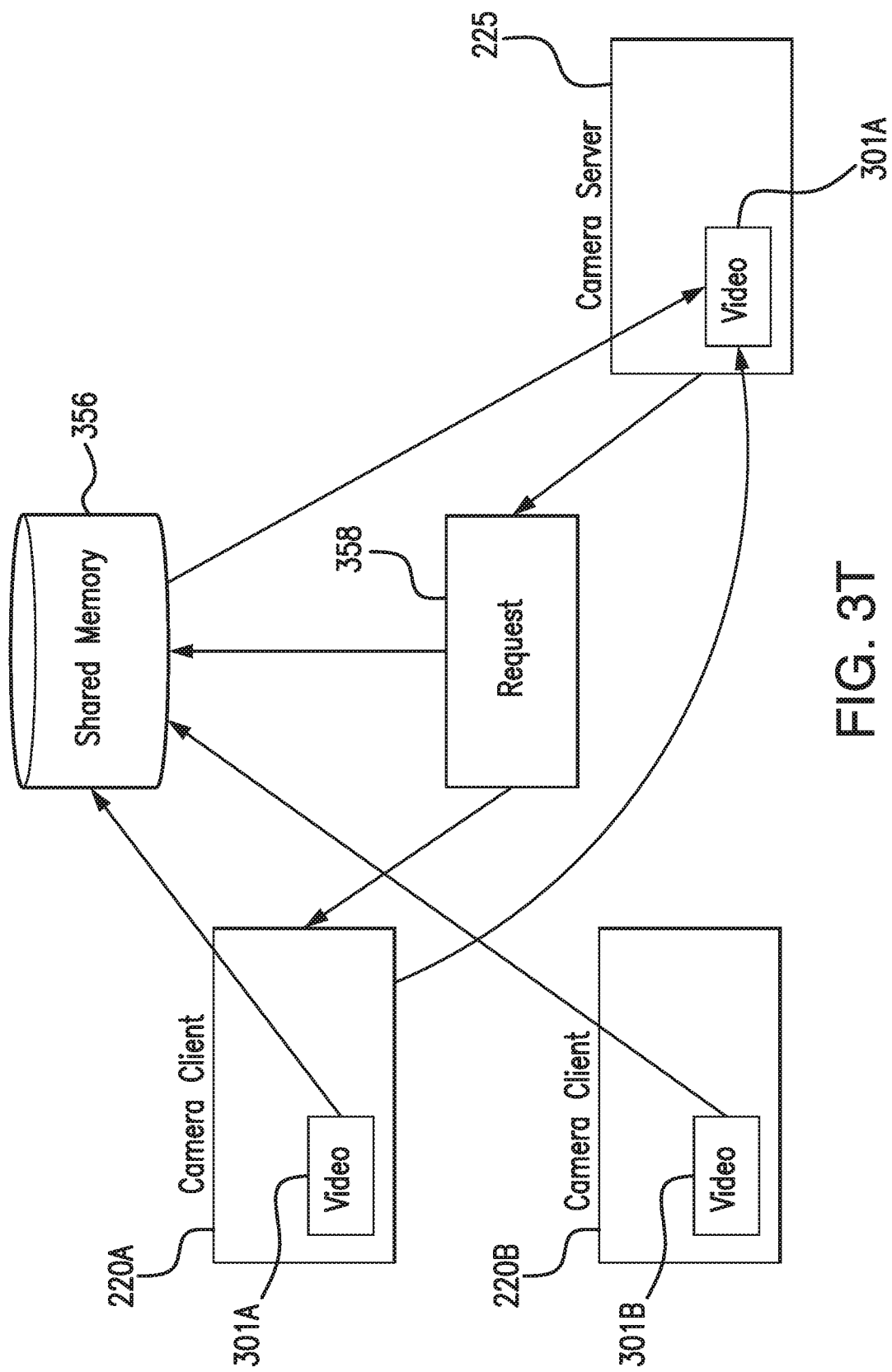

In certain embodiments, camera server 225 can retrieve video footage from camera clients 220 or a shared memory if the camera server 225 is unable to determine the positions of people based on the frame data 330 from the camera clients 220. FIG. 3T shows a camera server 225 retrieving videos 302 from camera clients 220 and/or shared memory 356. Generally, camera clients 220 store video received from cameras locally or in a shared memory 356. That video 302 is then made available to camera server 225 if camera server 225 cannot determine the positions of people based on frame data 330. Camera server 225 may analyze video 302 to determine the positions of people in the space. Camera server 225 may perform better and more accurate analysis of the raw video footage than camera clients 220, and thus, camera server 225 may generate more accurate frame data 330 than camera clients 220. In some embodiments, camera server 225 may have frame data 330 from one camera client 220 that conflicts or does not align with frame data 330 from another camera client 220. Camera server 225 can retrieve the raw video footage to determine which frame data 330 should be accepted and used.

In the example of FIG. 3T, camera client 220A stores video 302A locally or in shared memory 356. Camera client 220B stores video 302B locally or in shared memory 356. When camera server 225 is unable to determine the positions of people based on frame data 330, camera server 225 sends a request 358 to camera client 220A and/or shared memory 356. In response, camera client 220A and/or shared memory 356 send video 302A to camera server 225. Camera server 225 may then analyze the video 302A to determine the positions of people in the space.

III. Light Detection and Ranging (LiDAR) Subsystem

Certain embodiments of tracking system 132 include a LiDAR subsystem 204. FIGS. 4A-4D show the LiDAR subsystem 204 and its operation within tracking system 132. Generally, LiDAR subsystem 204 uses LiDAR sensors and a LiDAR server to track the positions of people and/or objects within a physical space. LiDAR subsystem 204 may be used on its own or in conjunction with other subsystems (e.g., camera subsystem 202) to track the positions of people and/or objects in the space.

Figure 4A:
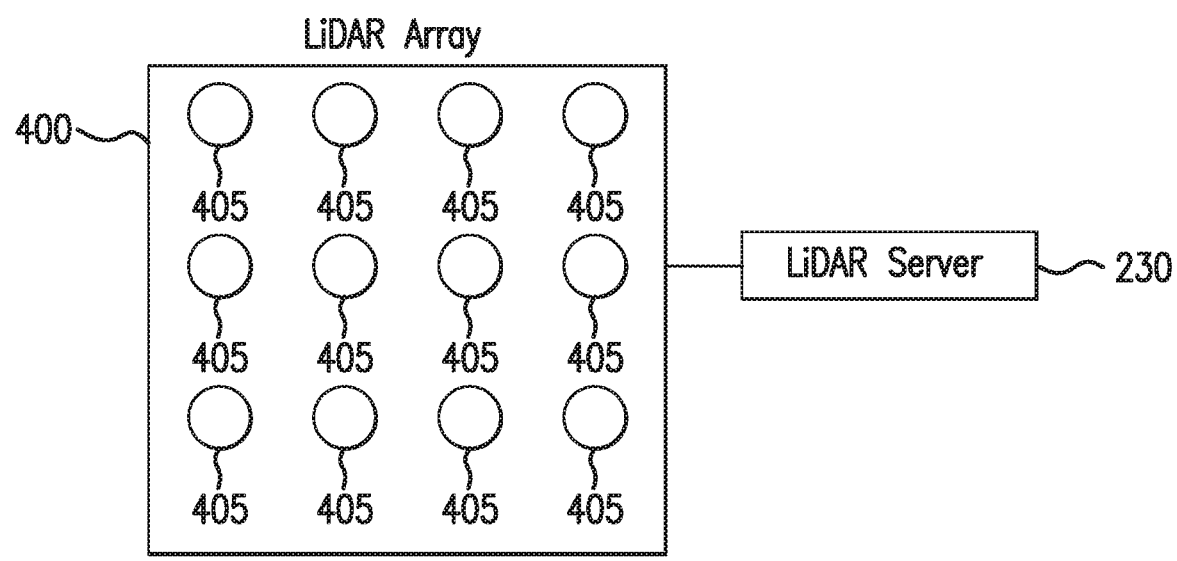
FIGS. 4A-4D illustrate an example light detection and ranging subsystem and its operation in the tracking system.

FIG. 4A shows an example LiDAR subsystem 204. As seen in FIG. 4A, LiDAR subsystem 204 includes a LiDAR array 400 and a LiDAR server 230. Generally, LiDAR sensors 405 in LiDAR array 400 detect the presence of people and/or objects within a space and determine coordinates for these people and/or objects. LiDAR server 230 processes these coordinates to determine the physical positions of the people and/or objects in the space.

LiDAR array 400 is an array of LiDAR sensors 405. LiDAR array 400 may be positioned above a physical space to detect the presence and positions of people and/or objects within the space. In the example of FIG. 4A, LiDAR array 400 is a 3×4 array of LiDAR sensors 405. LiDAR array 400 includes any suitable number of LiDAR sensors 405 arranged in an array of any suitable dimensions.

Each LiDAR sensor 405 detects the presence of people and/or objects within a portion of the physical space. Generally, LiDAR sensors 405 emit light pulses into the space. These light pulses are reflected back towards the LiDAR sensors 405 when the light pulses contact people and/or objects in the space. The LiDAR sensor 405 tracks characteristics of the reflected light pulses, such as the return times of the light pulses and the wavelength of the return light pulses, to detect the presence of people and/or objects within the physical space. LiDAR sensors 405 may also determine coordinates for the detected people and/or objects. LiDAR sensors 405 communicate the coordinates for the detected people and/or objects to LiDAR server 230.

LiDAR sensors 405 may be communicatively coupled to LiDAR server 230 in any suitable manner. For example, LiDAR sensors 405 may be hardwired to LiDAR server 230. As another example, LiDAR sensors 405 may wirelessly couple to LiDAR server 230 using any suitable wireless standard (e.g., WiFi). LiDAR sensors 405 communicate coordinates for detected people and/or objects through the communication medium to LiDAR server 230.

Figure 4B:
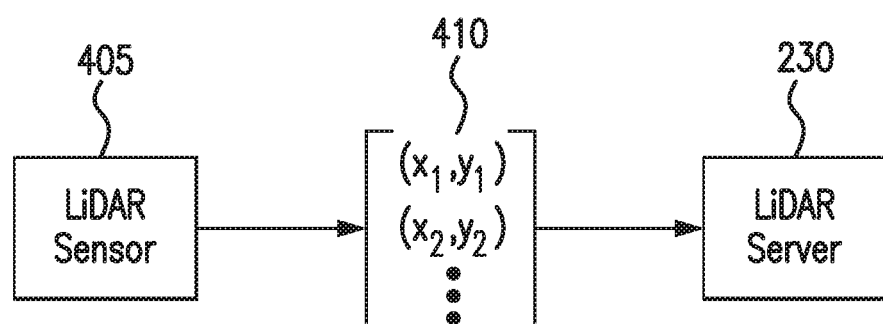

FIG. 4B shows a LiDAR sensor 405 communicating coordinates 410 to LiDAR server 230. Generally, LiDAR sensor 405 analyzes characteristics of reflected light pulses to determine the coordinates 410 of people and/or objects within the space. LiDAR sensor 405 communicates these coordinates 410 to LiDAR server 230 for further processing. In the example of FIG. 4B, LiDAR sensor 405 detects coordinates 410 for at least two people and/or objects in the space. The coordinates 410 for these people and/or objects are $(x_1, y_1)$ and $(x_2, y_2)$. LiDAR sensor 405 communicates these coordinates 410 to LiDAR server 230 for further processing.

Figure 4C:
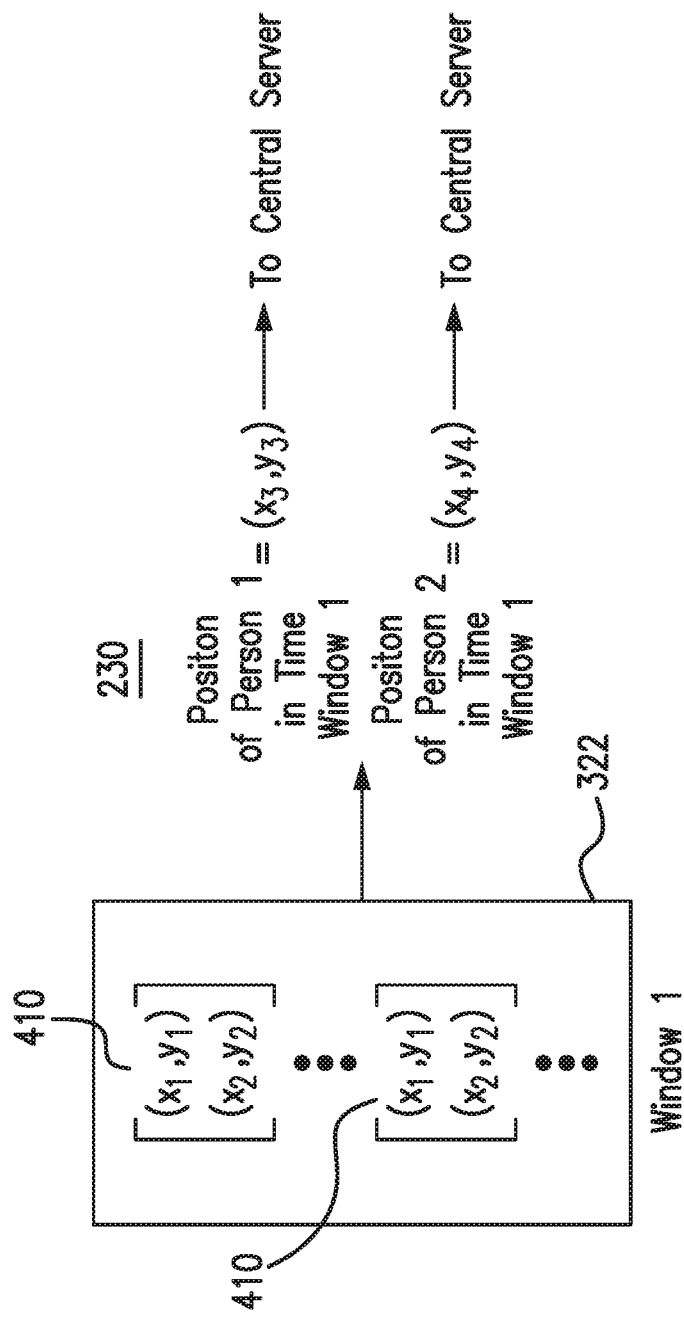

FIG. 4C illustrates the general operation of LiDAR server 230. As seen in FIG. 4C, LiDAR server 230 processes coordinates 410 received from the LiDAR sensors 405. LiDAR server 230 assigns coordinates 410 to time windows 332 in a similar manner as camera server 225 assigns frame data 330 to time windows 332. For example, LiDAR server 230 may assign coordinates 410 to particular time windows 332 based on the time that LiDAR server 230 received the coordinates 410 from LiDAR sensor 405.

LiDAR server 230 may process the coordinates 410 assigned to a time window 332 to determine the physical position of people and/or objects within the space. In the example of FIG. 4C, LiDAR server 230 receives coordinates 410 for two people from two different LiDAR sensors 405. One LiDAR sensor 405 provides coordinates 410 $(x_1, y_1)$ and $(x_2, y_2)$ for the two people, respectively. Another LiDAR sensor 405 provides coordinates 410 $(x_1, y_1)$ and $(x_2, y_2)$ for the same two people, respectively. As with camera client 220 and camera server 225, the subscripts on these coordinates 410 are not meant to indicate that these coordinates 410 have the same value, but, rather, that these are the first and second coordinates 410 provided by a particular LiDAR sensor 405.

LiDAR server 230 uses these coordinates 410 to determine the physical position of people within the space. As with the camera server 225, LiDAR server 230 may determine that the coordinates 410 provided by two different LiDAR sensors 405 correspond to the same person within the physical space. In response, LiDAR server 230 may take these coordinates 410 and use homography to determine a position of the person within the physical space in a particular time window 332. In the example of FIG. 4C, LiDAR server 230 uses coordinates 410 to determine the position of a first person during the time window 332 to be ($x_3$, $y_3$). LiDAR server 230 also uses coordinates 410 to determine the physical position of a second person during the time window 332 to be ($x_4$, $y_4$). LiDAR server 230 communicates these physical positions to central server 240 for further processing.

Figure 4D:
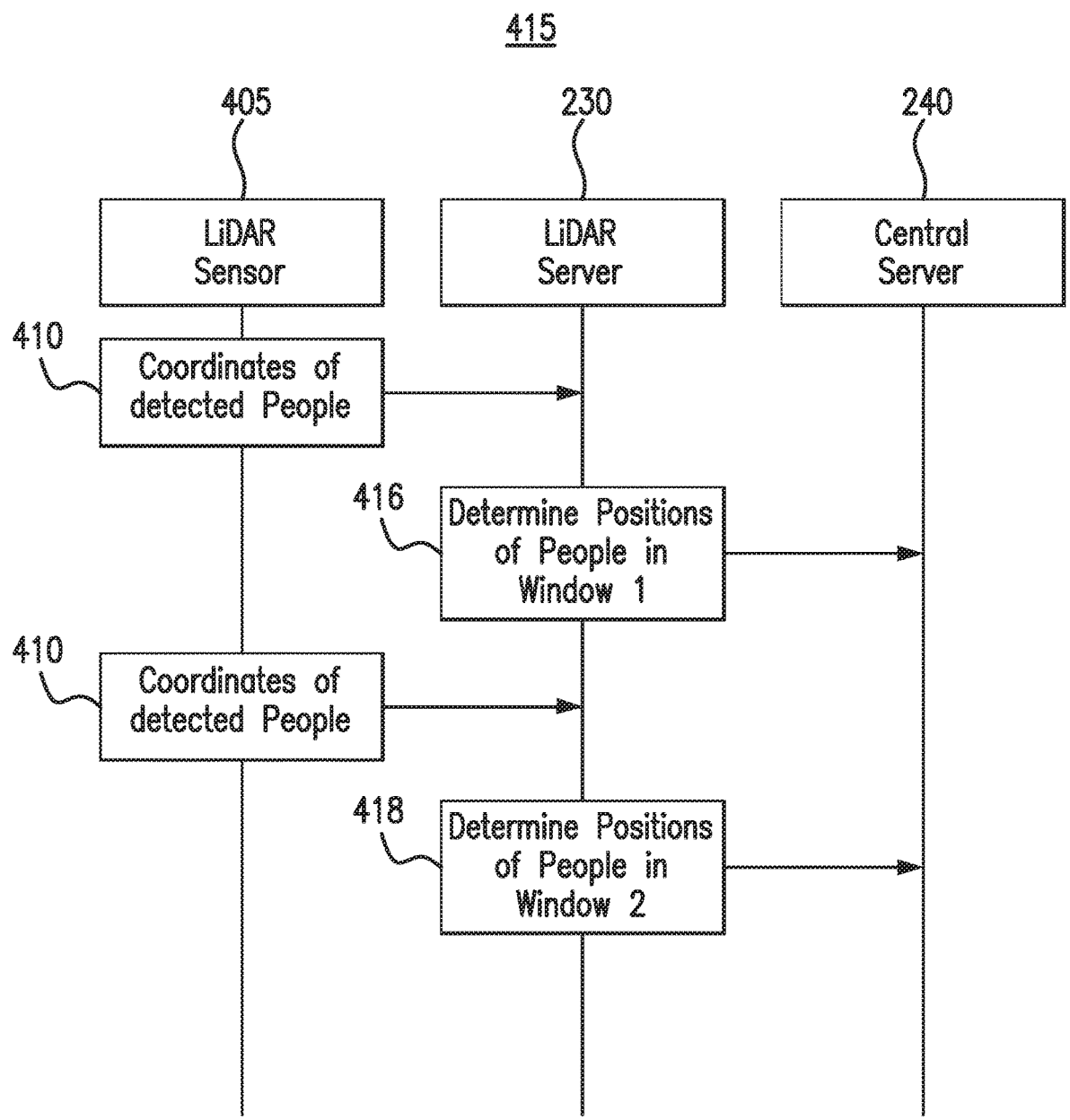

FIG. 4D shows a method 415 for the operation of the LiDAR subsystem 204 in the tracking system 132. Generally, LiDAR subsystem 204 performs method 415 to determine the positions of people and/or objects within a physical space.

LiDAR sensor 405 determines coordinates 410 of detected people and communicates these coordinates 410 to LiDAR server 230. LiDAR sensor 405 may determine these coordinates 410 by emitting a light pulse and analyzing characteristics of the light pulse when that light pulse is reflected back to LiDAR sensor 405. For example, LiDAR sensor 405 may analyze the return time of the reflected light pulse and/or the wavelength of the reflected light pulse to determine whether a person is present in the physical space and the coordinates 410 of that person.

LiDAR server 230 analyzes the coordinates 410 from LiDAR sensor 405 to determine the positions of people within the physical space during a first time window 332 in step 416. LiDAR server 230 then communicates these positions to central server 240. LiDAR sensor 405 may subsequently determine the coordinates 410 of detected people and communicate these coordinates 410 to LiDAR server 230. LiDAR server 230 may again determine the positions of these people in a subsequent time window 332 and communicate these positions to central server 240 in step 418.

As with the camera subsystems 202, central server 240 may use these positions to determine which person removed an item 130 from the space during the particular time window 332. The operation of central server 240 will be described in more detail using FIG. 6A through FIG. 6C.

Modifications, additions, or omissions may be made to method 415 depicted in FIG. 4D. Method 415 may include more, fewer, or other steps. For example, steps may be performed in parallel or in any suitable order. While discussed as components of LiDAR subsystem 204 performing the steps, any suitable component of tracking system 132, such as central server 240 for example, may perform one or more steps of the method.

IV. Weight Subsystem

Tracking system 132 includes a weight subsystem 206 that includes weight sensors 215 and weight server 235. Generally, weight sensors 215 detect the weights of items positioned above or near the weight sensors 215. The weight sensors 215 may be positioned on an unconventional rack 115 that holds items. Weight server 235 tracks the weights detected by weight sensors 215 to determine if and when items 130 are removed from the rack 115. The weight sensors 215, rack 115, and weight server 235 will be described in more detail using FIGS. 5A-5J.

Figure 5A:
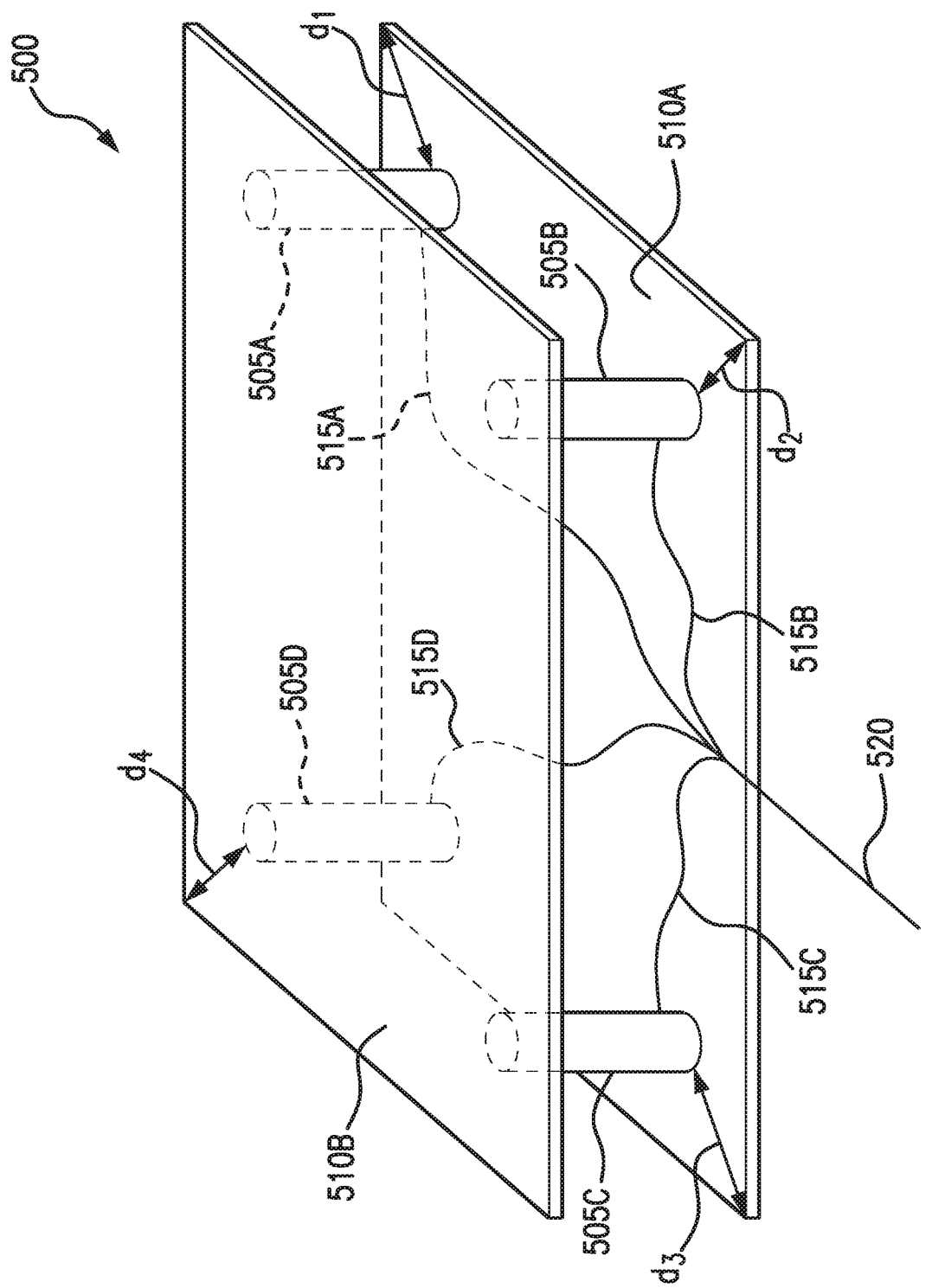
FIGS. 5A-5J illustrate an example weight subsystem and its operation in the tracking system.

FIG. 5A illustrates an example weight sensor 500 of weight subsystem 206. As seen in FIG. 5A, weight sensor 500 includes plates 510A and 510B, load cells 505A, 505B, 505C, and 505D, and wires 515A, 515B, 515C, 515D, and 520. Generally the components of weight sensor 500 are assembled so that weight sensor 500 can detect a weight of items 130 positioned above or near weight sensor 500.

Plates 510 form surfaces that distribute the weight of items 130 across the surfaces. Plates 510 may be made of any suitable material, such as, for example, metal and/or plastic. Items 130 may be positioned above or near plates 510 and the weight of these items 130 may be distributed across plates 510.

Load cells 505 are positioned between plates 510A and 510B. Load cells 505 produce electrical signals based on the weight experienced by the load cells 505. For example, load cells 505 may be transducers that converts an input mechanical force (e.g., weight, tension, compression, pressure, or torque) into an output electrical signal (e.g., current or voltage). As the input force increases, the output electrical signal may increase proportionally. Load cells 505 may be any suitable type of load cell (e.g., hydraulic, pneumatic, and strain gauge). Although load cells 1310 are illustrated as being cylindrical in shape, they may be any suitable size and shape that is appropriate for the particular implementation contemplated.

The signals from load cells 505 may be analyzed to determine an overall weight of items 130 positioned above or near weight sensor 500. Load cells 505 may be positioned such that the weight of items 130 positioned above or near weight sensor 500 is evenly distributed to each load cell 505. In the example of FIG. 5A, load cells 505 are positioned substantially equidistant from corners of plates 510A and 510B. For example, load cell 505A is positioned a distance d1 from a corner of plates 510A and 510B. Load cell 505B is positioned a distance d2 from a corner of plates 510A and 510B. Load cell 505C is positioned a distance d3 from a corner of plates 510A and 510B. Load cell 505D is positioned a distance d4 from a corner of plates 510A and 510B. Distances d1, d2, d3 and d4 may be substantially equal to each other. This disclosure contemplates distances differing by 5 to 10 millimeters and still being considered substantially equal to each other. By positioning load cells 505 substantially equal distances from corners of plates 510A and 510B, the weight of items positioned above or near weight sensor 500 is evenly distributed across the load cells 505. As a result, the total weight of items positioned above or near weight sensor 500 can be determined by summing the weights experienced by the individual load cells 505.

Load cells 505 communicate electric signals that indicate a weight experienced by the load cells 505. For example, the load cells 505 may produce an electric current that varies depending on the weight or force experienced by the load cells 505. Each load cell 505 is coupled to a wire 515 that carries the electric signal. In the example of FIG. 5A, load cell 505A is coupled to wire 515A; load cell 505B is coupled to wire 515B; load cell 505C is coupled to wire 515C; and load cell 505D is coupled to wire 515D. Wires 515 are grouped together to form wire 520 that extends away from weight sensor 500. Wire 520 carries the electric signals produced by load cells 505 to a circuit board that communicates the signals to weight server 235.

Figure 5B:
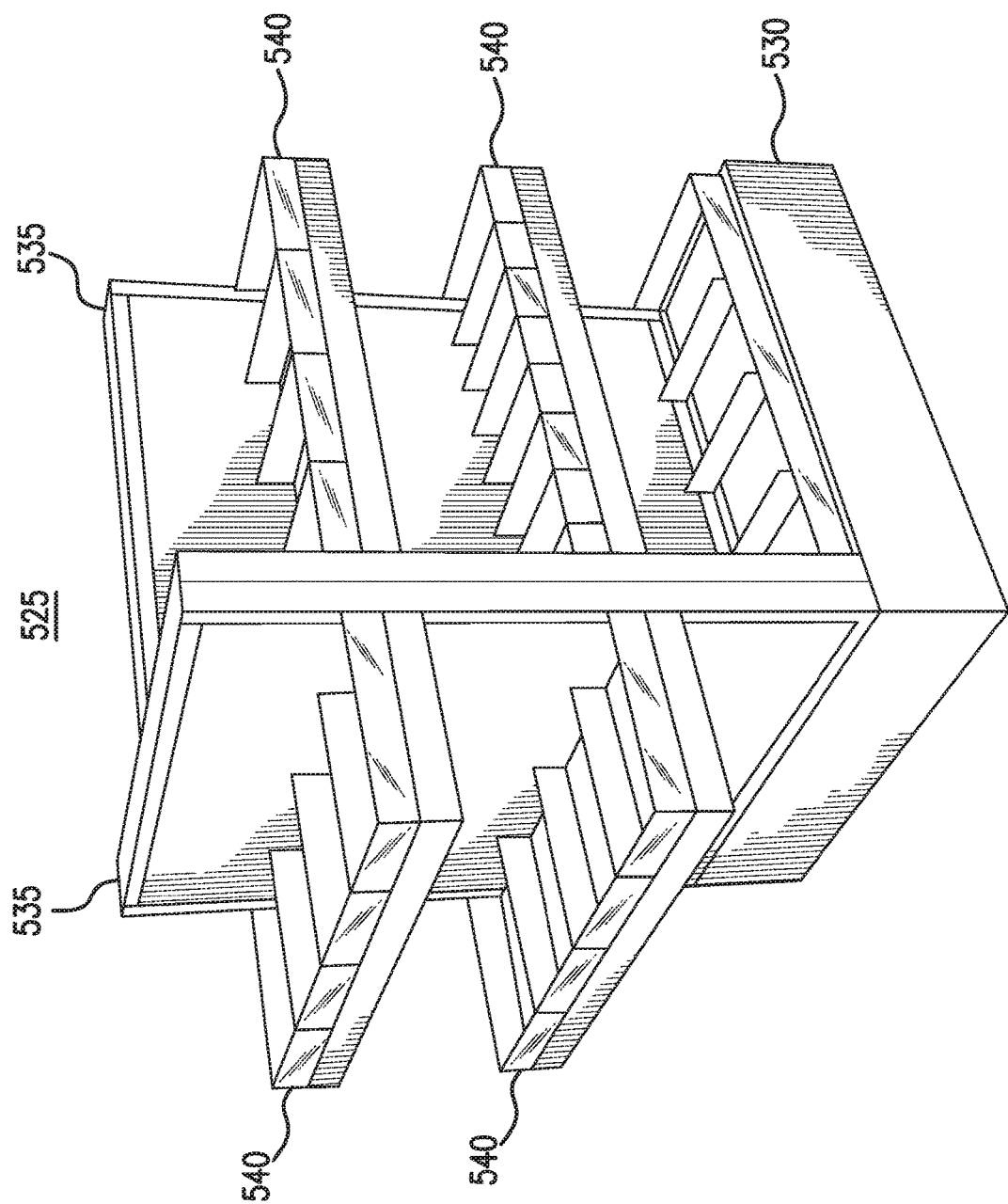

Weight sensor 500 may be disposed in an unconventional rack 115 designed to hold items. FIG. 5B shows an example rack 525. As seen in FIG. 5B, rack 525 includes a base 530, one or more panels 535, and one or more shelves 540. Generally, base 530 is at the bottom of rack 525 and forms a foundation for the other components of rack 525. Panels 535 extend vertically upwards from base 530. Shelves 540 couples to panels 535 and/or base 530. For example, two shelves 540 may couple to a panel 535 and extend away from panel 535. Generally, panels 535 and base 530 allow shelves 540 to hold the weight of items positioned on shelves 540. Weight sensors 500 may be disposed within shelves 540 to detect the weight of items positioned on shelf 540.

Figure 5C:
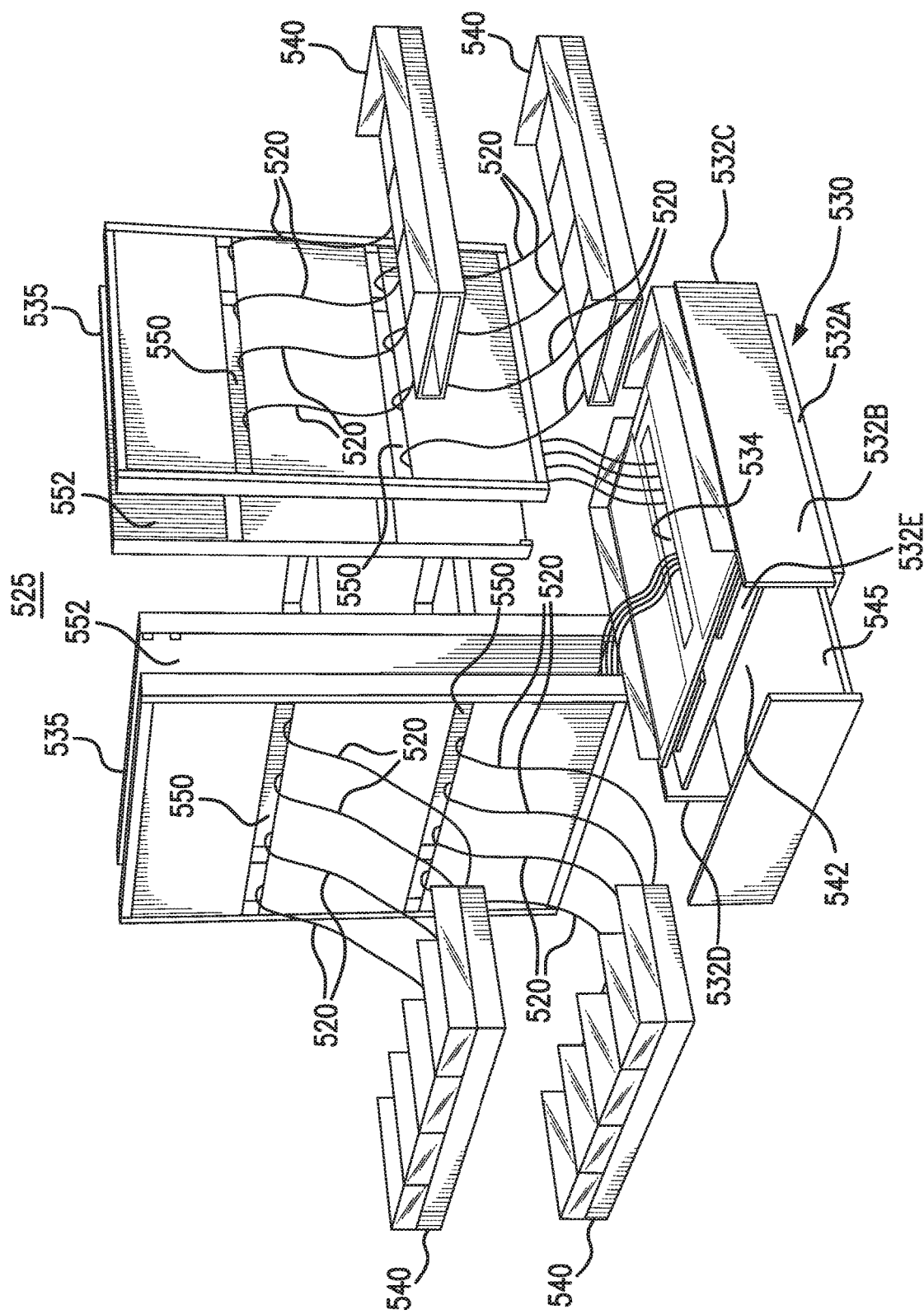

FIG. 5C shows an exploded view of rack 525. As seen in FIG. 5C, base 530 is formed using several surfaces 532. Surface 532A forms a bottom surface of base 530. Surfaces 532B and 532D form the sides of base 530. Surface 532C forms a back surface of base 530. Surface 532E forms a top surface of base 530. This disclosure contemplates base 530 being formed using any suitable materials such as, for example, wood, metal, glass, and/or plastic. Surface 532A may be coupled to surfaces 532B, 532C, and 532D. Surface 532B may be coupled to surfaces 532A, 532E, and 532C. Surface 532C may be coupled to surfaces 532A, 532B, 532D, and 532E. Surface 532D may be coupled to surfaces 532A, 532C, and 532E. Surface 532E may be coupled to surfaces 532B, 532C, and 532D. Surfaces 532B, 532C, and 532D extend upwards from surface 532A. Generally, surfaces 532A, 532B, 532C, 532D, and 532E form a box structure around a space 542. Base 530 includes a drawer 545 that can open to allow access into that space 542. Drawer 545 is positioned within the space 542. When drawer 545 is closed, base 530 may form an enclosure around the space 542. When drawer 545 is open, access to the space 542 may be provided through the open drawer 545. In certain embodiments, a door may be used to provide access to space 542 rather than drawer 545.

Surface 532E defines a cavity 534 that also allows access into the space 542. Generally, cavity 534 allows wires 520 from weight sensors 500 to extend into the space 542.

Panels 535 extend upwards from base 530. Panels 535 may be formed using any suitable materials, such as for example, wood, metal, and/or plastic. As seen in FIG. 5C, panels 535 define one or more cavities 550 that extend along the width of panels 535. Cavities 550 allow wires 520 from weight sensors 500 to extend into a space 552 defined by panels 535. Generally, space 552 is a hollow interior of panel 535. Wires 520 extend through cavity 550 and down space 552 towards cavity 534. In this manner, wires 520 may be run from weight sensors 500 down to space 542 in base 530. Each cavity 550 may correspond to a shelf 540 that couples to panel 535.

Each shelf 540 couples to panel 535 and/or base 530. Weight sensors 500 are disposed in the shelf 540. A shelf 540 may couple to panel 535 such that the wires 520 of the weight sensors 500 disposed in the shelf 540 can run from the weight sensors 500 through a cavity 550 into space 552. These wires 520 then run down space 552 and through cavity 534 into space 542.

Figure 5D:
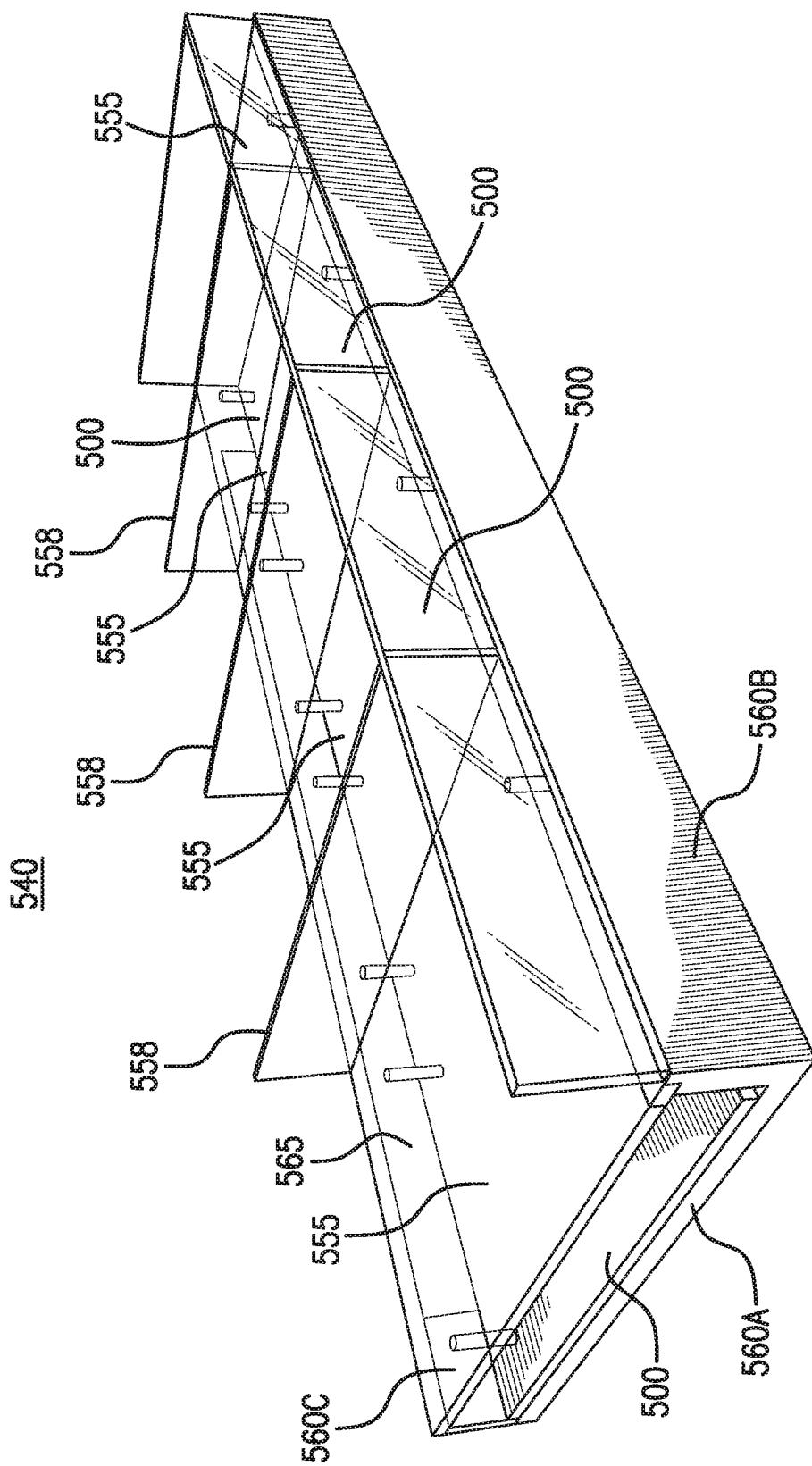
Figure 5E:
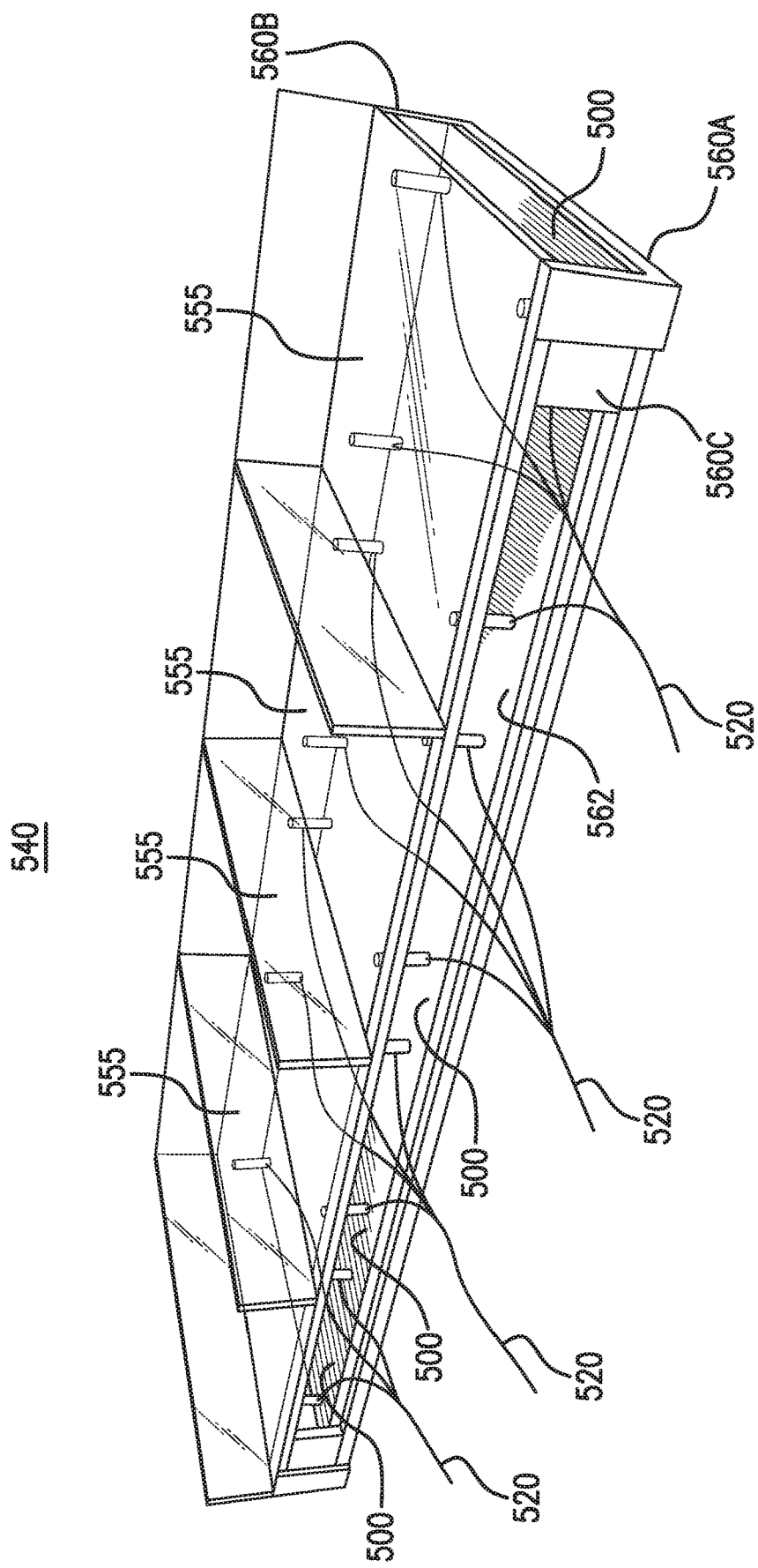

FIGS. 5D and 5E illustrate an example shelf 540. FIG. 5D shows a front view of shelf 540. As seen in FIG. 5D, shelf 540 includes a bottom surface 560A, a front surface 560B, and a back surface 560C. Bottom surface 560A is coupled to front surface 560B and back surface 560C. Front surface 560B and back surface 560C extend upwards from bottom surface 560A. Multiple weight sensors 500 are positioned on bottom surface 560A between front surface 560B and back surface 560C. Each weight sensor 500 is positioned to detect a weight of items 130 positioned within certain regions 555 of shelf 540. Each region 555 may be designated using dividers 558. Items placed within a particular region 555 will be detected and weighed by the weight sensor 500 for that region 555. This disclosure contemplates shelf 540 being made using any suitable material such as, for example, wood, metal, glass, and/or plastic. Wires 515 and 520 have not been illustrated in FIG. 5D so that the structure of shelf 540 can be shown clearly, but their omission from FIG. 5D should not be interpreted as their removal. This disclosure contemplates that wires 515 and 520 are present and connected to weight sensors 500 in the example of FIG. 5D.

FIG. 5E shows a back view of shelf 540. As seen in FIG. 5E, back surface 560C defines a cavity 562. Wires 520 of weight sensors 500 extend from the weight sensors 500 through cavity 562. Generally, back surface 560C of shelf 540 is coupled to panel 535 such that cavity 562 is at least partially aligned with cavity 550 in the panel 535. In this manner, wires 520 can run from weight sensors 500 through cavity 562 and through cavity 550.

In certain embodiments, weight sensor 500 is positioned in shelf 540 such that weight sensor 500 detects the weight of items positioned within a particular region 555 of shelf 540. As seen in the examples of FIGS. 5D and 5E, shelf 540 includes four regions 555 that are positioned above four weight sensors 500. Each weight sensor 500 detects the weight of items positioned within their corresponding regions 555. Due to the positioning of weight sensors 500, a weight sensor 500 may not be affected by the weight of items 130 positioned in regions 555 that do not correspond to that weight sensor 500.

Figure 5F:
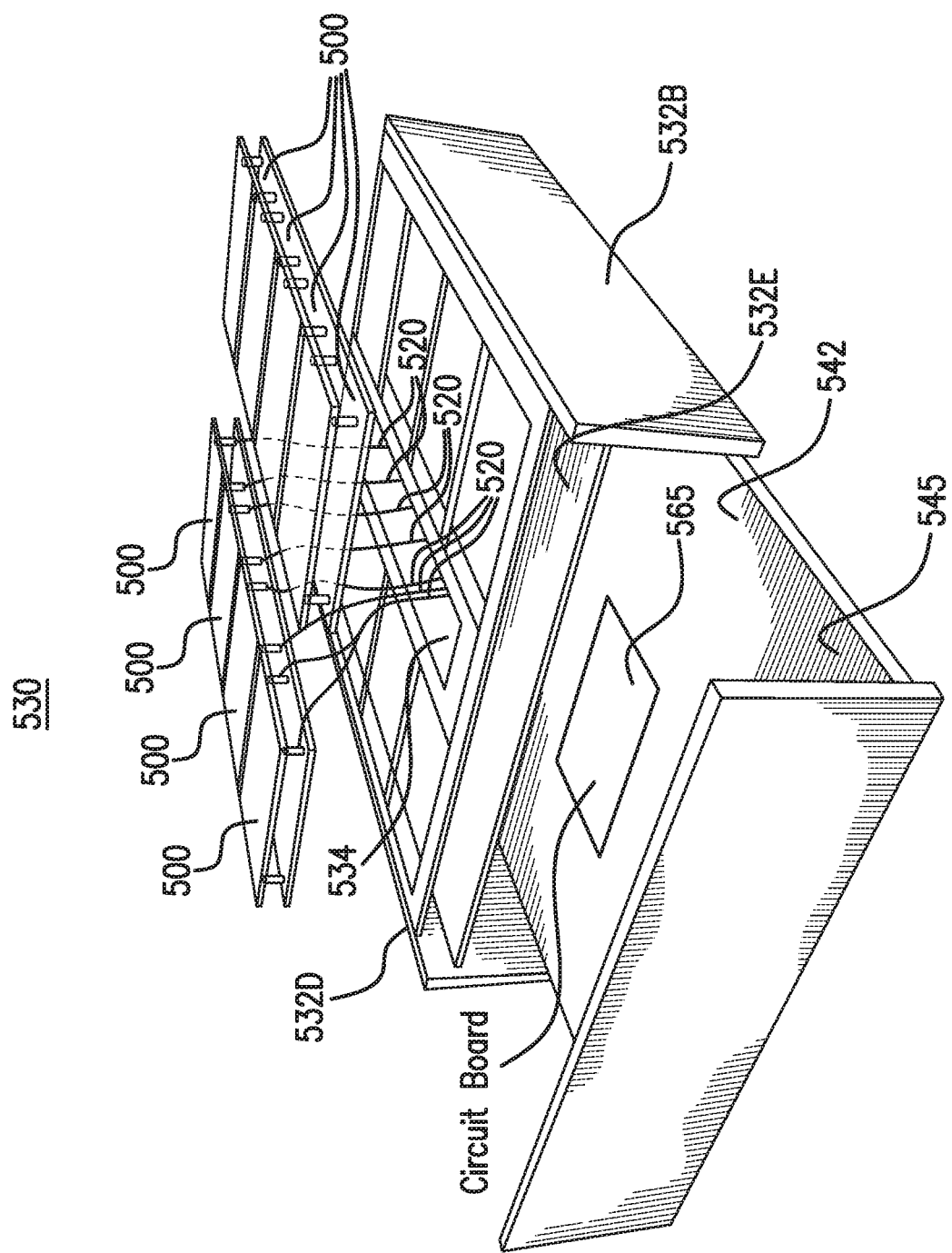

FIG. 5F shows an example base 530. As seen in FIG. 5F, base 530 may also accommodate weight sensors 500. For example, weight sensors 500 may be positioned on a top surface 532E of base 530. Wires 520 for these weight sensors 500 may run from the weight sensors 500 through cavity 534 into space 542. As a result, items may be positioned on base 530 and their weights may be detected by weight sensors 500.

A circuit board 565 is positioned in space 542. Circuit board 565 includes ports to which wires 520 from the weight sensors 500 of rack 525 connect. In other words, circuit board 565 connects to wires 520 from weight sensors 500 positioned on base 530 and on shelves 540. These wires 520 enter space 542 through cavity 534 and connect to circuit board 565. Circuit board 565 receives the electric signals produced by the load cells 505 of the weight sensors 500. Circuit board 565 then communicates signals to weight server 235 indicating the weights detected by the weight sensors 500. Drawer 545 may open to allow access to space 542 and to circuit board 565. For example, drawer 545 may be opened so that circuit board 565 may be serviced and/or repaired.

Figure 5G:
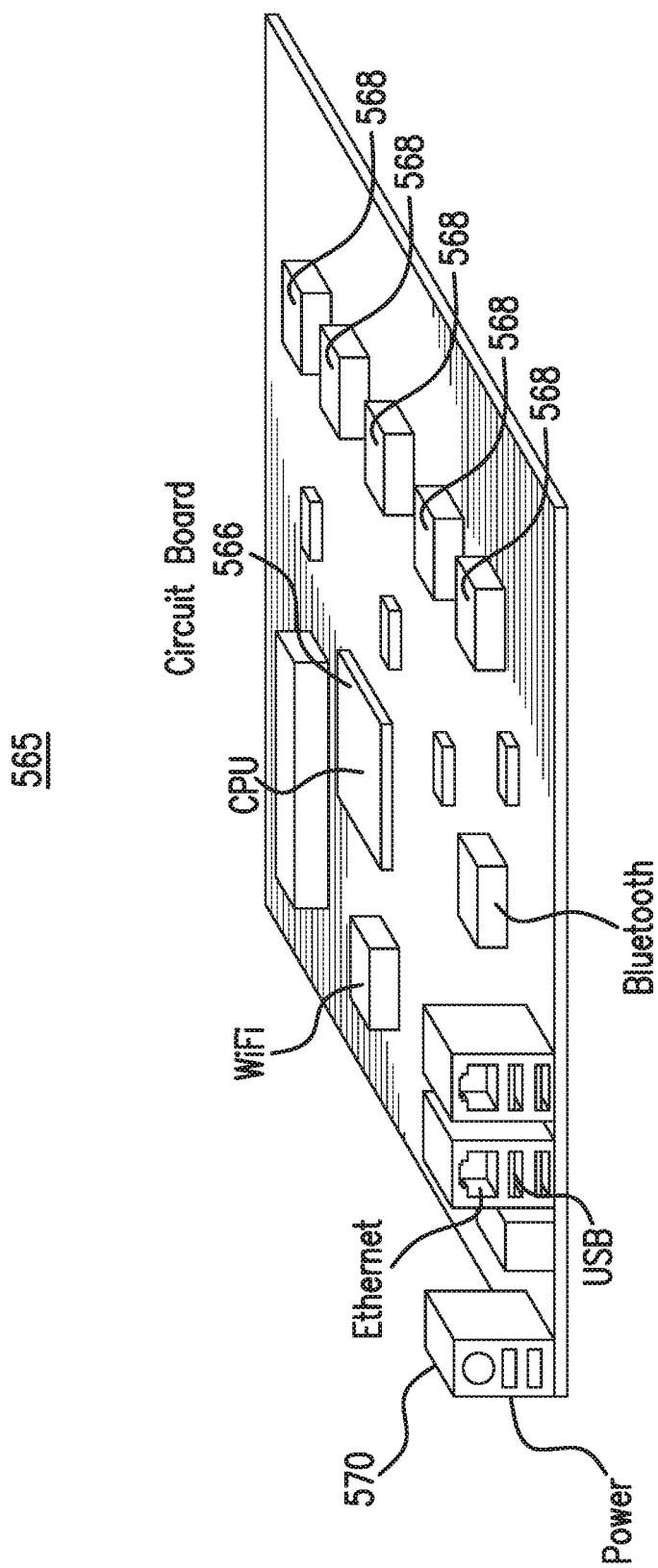

FIG. 5G shows an example circuit board 565. As seen in FIG. 5G, circuit board 565 includes a processor 566 and multiple ports 568. Generally, ports 568 couple to wires 520 from weight sensors 500. This disclosure contemplates circuit board 565 including any suitable number of ports 568 to connect to the wires 520 from the weight sensors 500 of rack 525. Processor 566 receives and processes the signals from ports 568.

Circuit board 565 may communicate signals to weight server 235 through any suitable medium. For example, circuit board 565 may communicate signals to weight server 230 through an ethernet connection, a wireless connection (e.g., WiFi), a universal serial bus connection, and/or a Bluetooth connection. Circuit board 565 can automatically select a connection through which to communicate signals to weight server 235. Circuit board 565 may choose the connection based on priority. For example, if the ethernet connection is active, circuit board 565 may select the ethernet connection for communicating with weight server 235. If the ethernet connection is down and the wireless connection is active, circuit board 565 may choose the wireless connection to communicate with weight server 235.

If the ethernet connection and the wireless connection are down and the universal serial bus connection is active, circuit board 565 may select the universal serial bus connection to communicate with weight server 235. If the ethernet connection, the wireless connection, and the universal serial bus connection are down and the Bluetooth connection is active, circuit board 565 may select the Bluetooth connection to communicate with weight server 235. In this manner, circuit board 565 has improved resiliency because circuit board 565 may continue to communicate with weight server 235 even if certain communication connections go down.

Circuit board 565 may receive electrical power through various connections. For example, circuit board 565 may include a power port 570 that supplies electrical power to circuit board 565. An electrical cable that plugs into an electrical outlet may couple to power port 570 to supply electrical power to circuit board 565. Circuit board 565 may also receive electrical power through the ethernet connection and/or the universal serial bus connection.

Figure 5H:
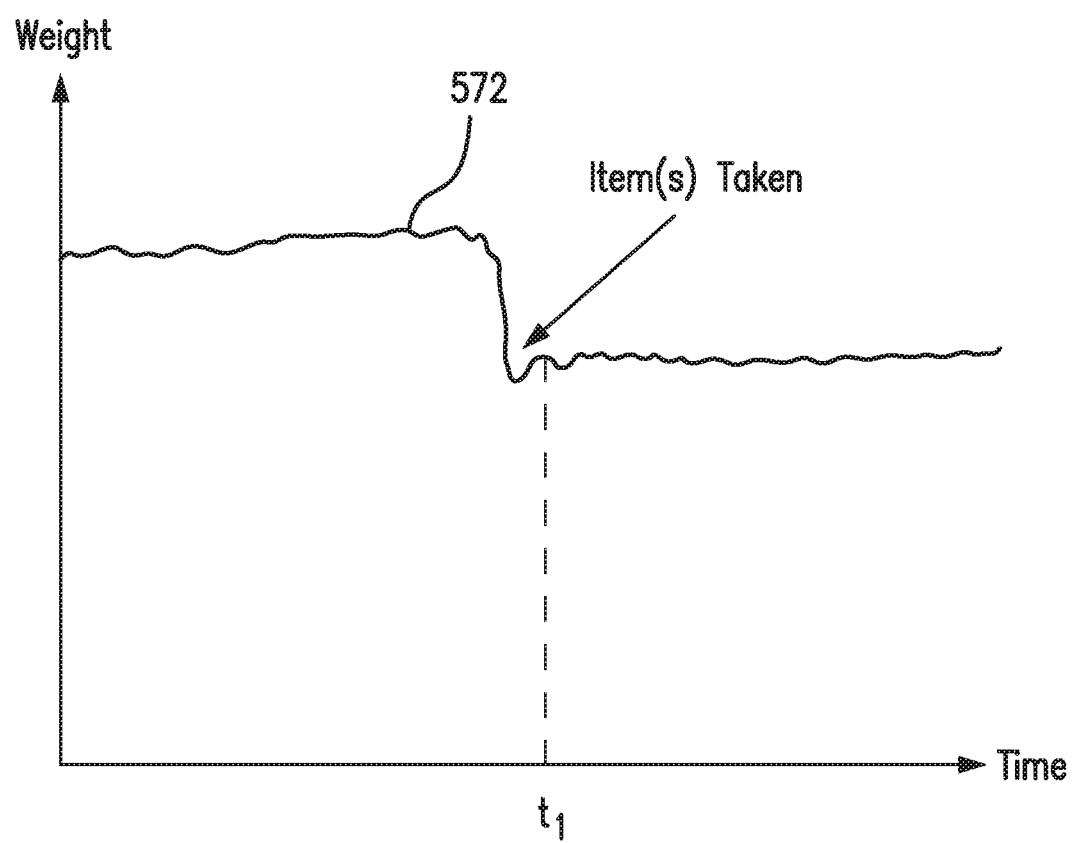

FIG. 5H shows a signal 572 produced by the weight sensor 500. As seen in FIG. 5H the signal 572 begins by indicating a certain weight detected by the weight sensors 500. Around time $t_1$ an item positioned above the weight sensor 500 is taken. As a result, the weight sensor 500 detects a drop in the weight and the signal 572 experiences a corresponding drop. Beyond time $t_1$, the signal 572 continues to hover around the lower weight because the item 130 was removed. This disclosure contemplates that the signal 572 may include noise introduced by the environment such that the signal 572 is not a perfectly straight or smooth signal.

Figure 5I:
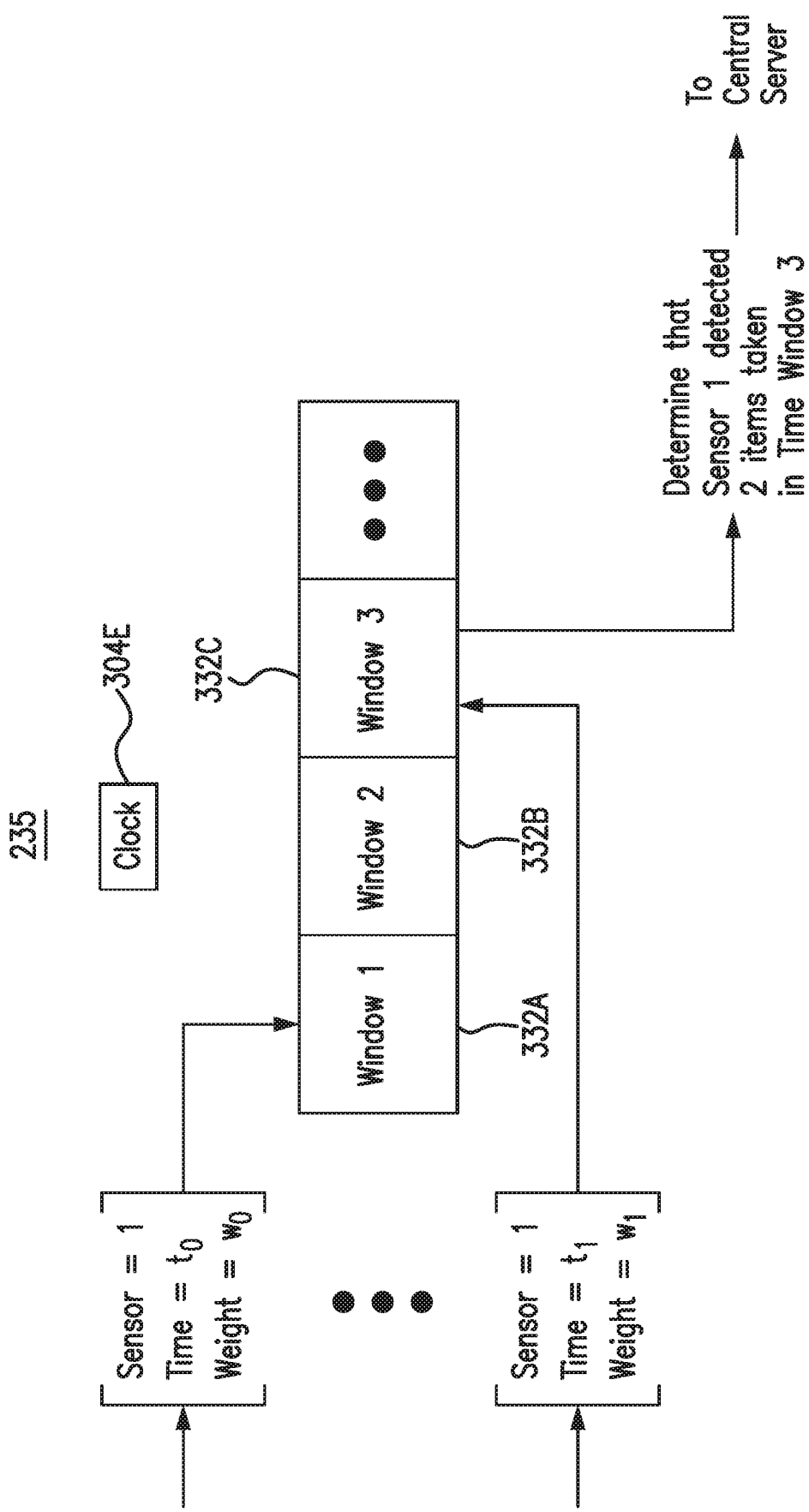

FIG. 5I shows an example operation of weight server 235. As seen in FIG. 5I, weight server 235 receives a signal 572 from a weight sensor 500 at time $t_0$ indicating a weight $w_0$. Similar to camera server 225, weight server 235 may assign this information to a particular time window 332A based on the indicated time of $t_0$. Later, weight server 235 may receive a signal 572 from the weight sensor 500 indicating that at time $t_1$, a new weight $w_1$ is detected. Weight $w_1$ may be less than weight $w_0$, thereby indicating that an item 130 may have been removed. Weight server 235 assigns the information to a subsequent time window 332C based on the time indicated at $t_1$.

Weight server 235 may implement an internal clock 304E that is synchronized with the internal clocks 304 of other components of tracking system 132 (e.g., camera clients 220, camera server 225, and central server 240). Weight server 235 may synchronize the internal clock 304E using a clock synchronization protocol (e.g., Network Time Protocol and/or Precision Time Protocol). Weight server 235 may use clock 304E to determine the times at which signals 572 from weight sensors 500 were received and assign these signals 572 to their appropriate time windows 332.

In certain embodiments, time windows 332 in weight server 235 are aligned with time windows 332 in camera clients 220, camera server 225, and/or central server 240. For example, time window 332A in weight server 235 may have the same start time (T0) and end time (T1) as time window 332A in camera server 225 in the example of FIG. 3J. In this manner, information from different subsystems of tracking system 132 may be grouped according to the same time windows 332, which allows this information to be correlated to each other in time.

Similar to camera server 225, weight server 235 may process the information in the time windows 332 sequentially when the time windows 332 are ready for processing. Weight server 235 may process the information in each time window 332 to determine whether an item 130 was removed during that particular time window 332. In the example of FIG. 5I, when weight server 235 processes the third time window 332C, weight server 235 may determine that sensor 1 500 detected that two items were taken during time window 3 332C; thereby, resulting in the weight drop from $w_0$ to $w_1$. Weight server 235 may make this determination by determining a difference between $w_0$ and $w_1$. Weight server 235 may also know (e.g., through a lookup table) the weight of an item 130 positioned above or near weight sensor 500. Weight server 235 may divide the difference between $w_0$ and $w_1$ to determine the number of items 130 removed. Weight server 235 may communicate this information to central server 240 for further processing. Central server 240 may use this information along with the tracked positions of people within the space to determine which person in the space removed the items 130.

Figure 5J:
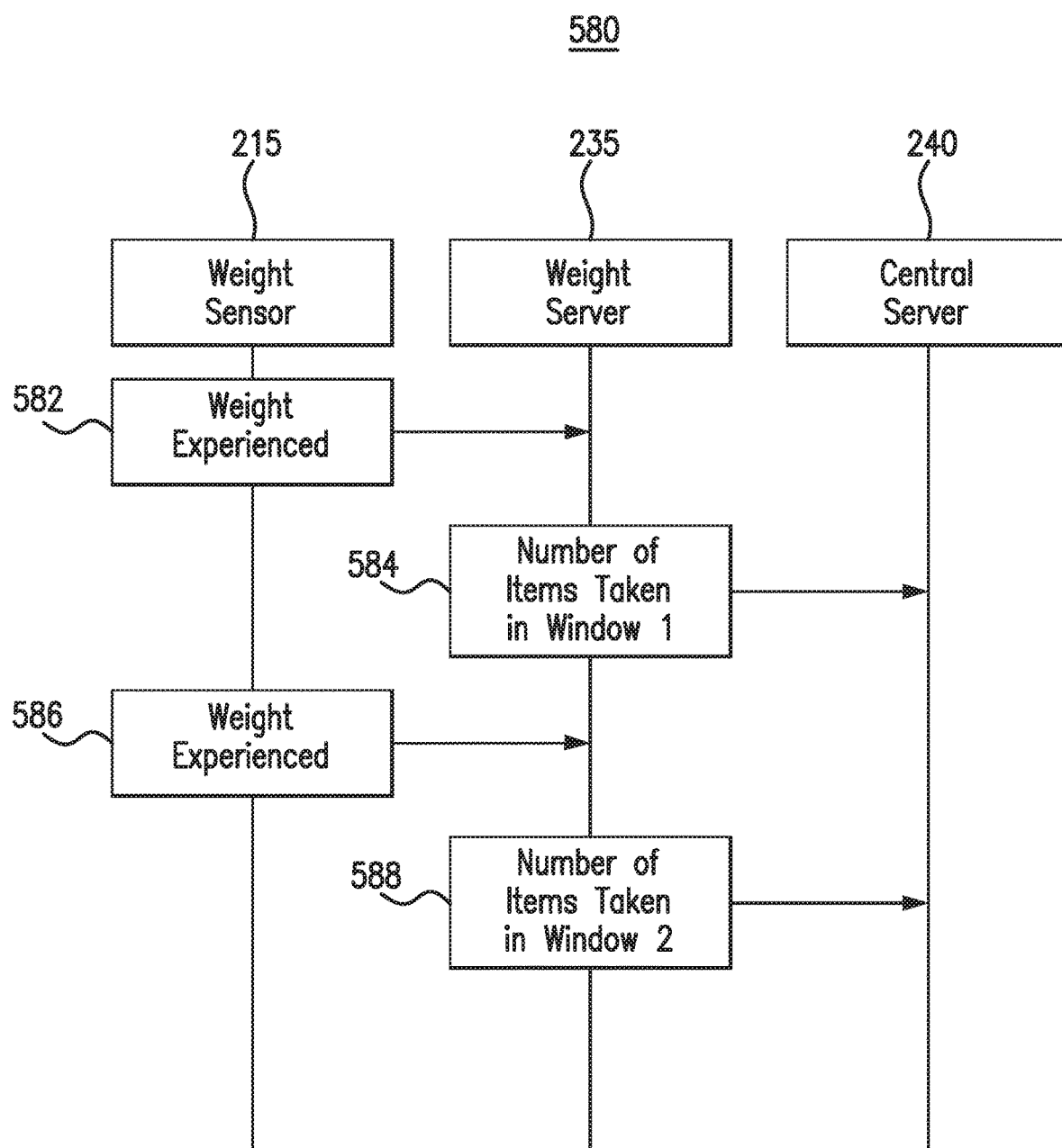

FIG. 5J shows an example method 580 for operating weight subsystem 206. Generally, various components of weight subsystem 206 perform method 580 to determine when certain items 130 were taken.

Weight sensor 215 detects the weight experienced 582 above or around weight sensor 215 and communicates the detected weight 582 through an electric signal 572 to weight server 235. Weight server 235 may analyze the signals 572 from weight sensor 215 to determine a number 584 of items 130 that were taken during a first time window 332. Weight server 235 may communicate the determination to central server 240. Weight sensor 215 may subsequently detect a weight 586 experienced by weight sensor 215 and communicate that weight 586 to weight server 235. Weight server 235 may analyze that weight 586 to determine a number 588 of items 130 that were taken during a second time window 332. Weight server 235 may communicate that determination to central server 240. Central server 240 may track whether items 130 were taken during particular time windows 332. And if so, central server 240 may determine which person in the space took those items 130.

Modifications, additions, or omissions may be made to method 580 depicted in FIG. 5J. Method 580 may include more, fewer, or other steps. For example, steps may be performed in parallel or in any suitable order. While discussed as various components of weight subsystem 206 performing the steps, any suitable component of tracking system 132, such as central server 240 for example, may perform one or more steps of the method.

V. Central Server

Figure 6A:
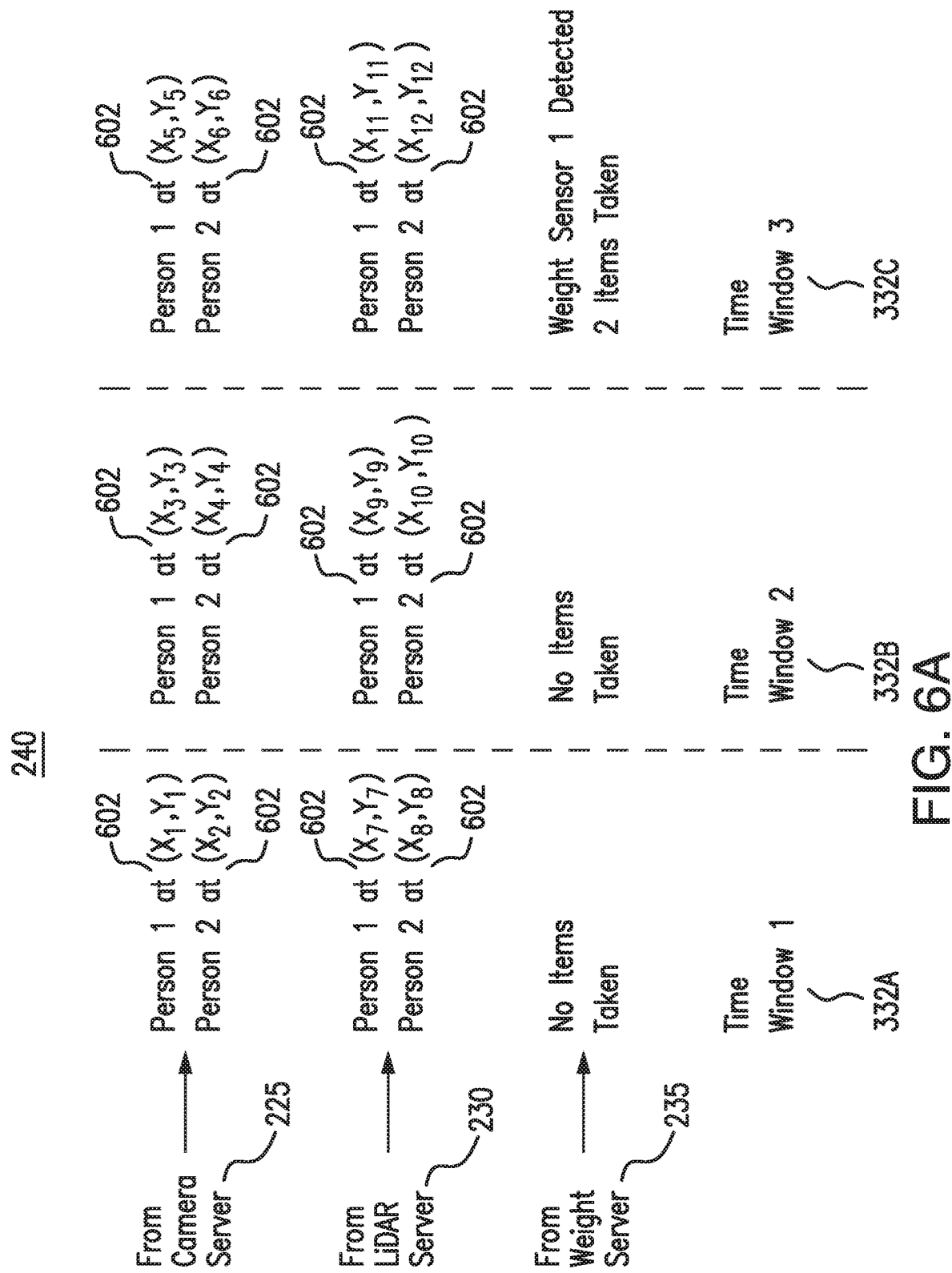
FIGS. 6A-6C illustrate the operation of an example central server for use in conjunction with the tracking system.
Figure 6B:
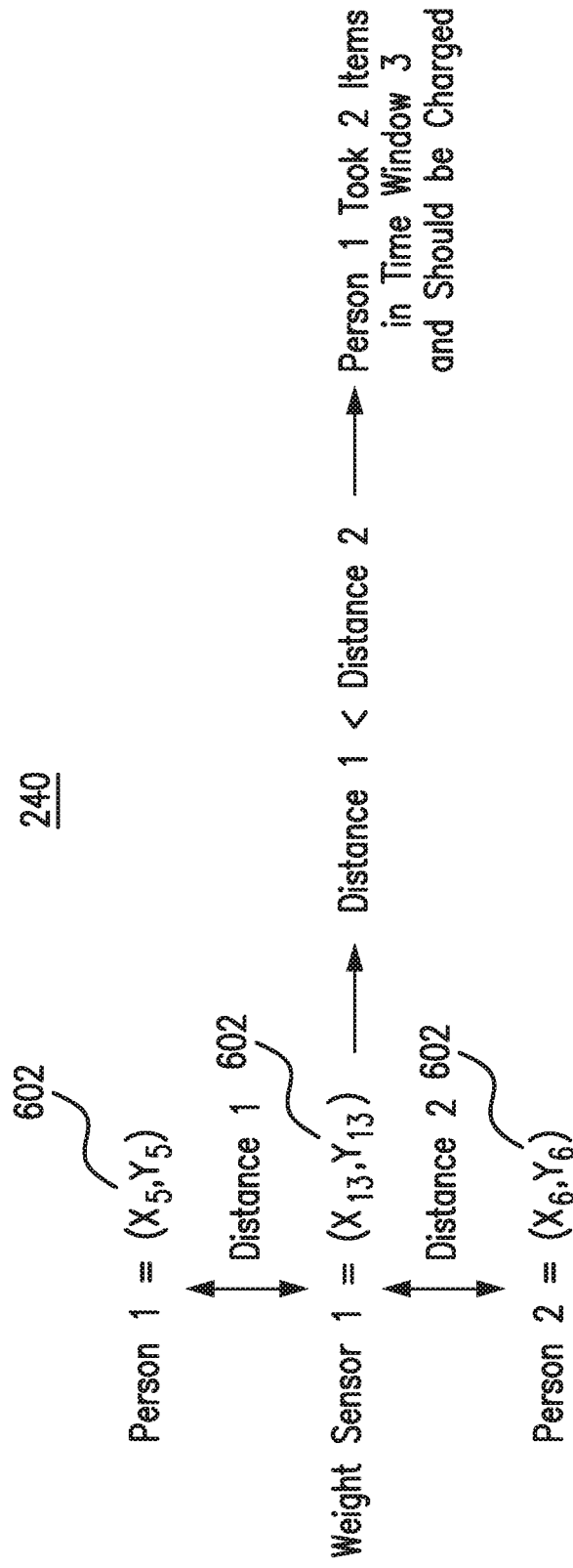
Figure 6C:
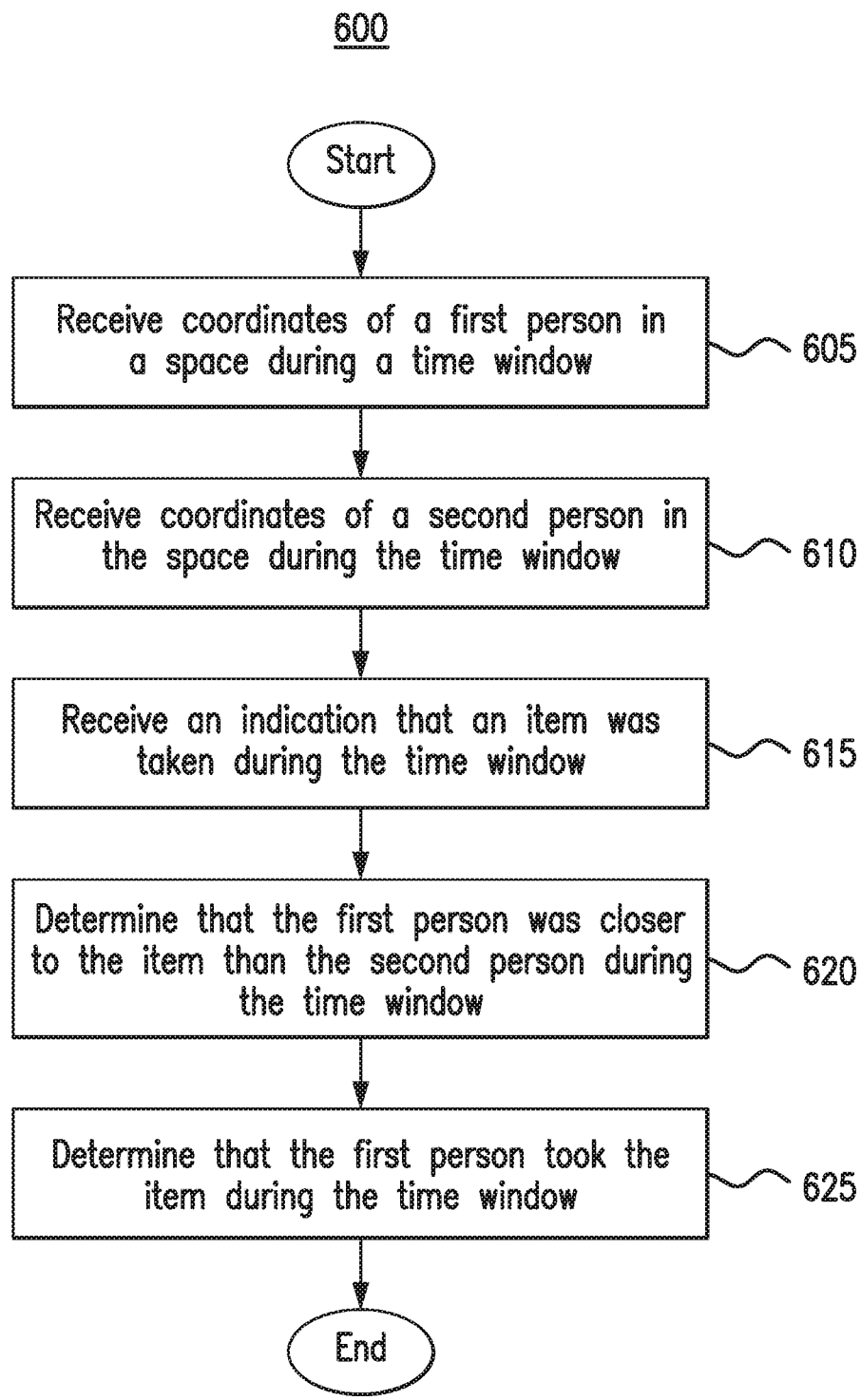

FIGS. 6A-6C show the operation of central server 240. Generally, central server 240 analyzes the information from the various subsystems (e.g., camera subsystem 202, LiDAR subsystem 204, weight subsystem 206, etc.) and determines which person in a space removed which items from the space. As discussed previously, these subsystems group information into time windows 332 that are aligned across the subsystems. By grouping information into aligned time windows 332, central server 240 can find relationships between information from disparate subsystems and glean additional information (e.g., which person removed which item 130). In some embodiments, central server 240 also charges people for items they removed from the space when those people exit store 100.

FIGS. 6A and 6B show an example operation of central server 240. As seen in FIG. 6A, central server 240 receives information from various servers during particular time windows. In the example of FIG. 6A, central server 240 receives the physical position of two people in the space from camera server 225 during a first time window 332A. This disclosure uses capital 'X' and capital 'Y' to denote the physical coordinates 602 of a person or object in the space and to distinguish the physical coordinates 602 of the person or object in the space determined by camera server 225 and LiDAR server 230 from the local coordinates determined by other components (e.g., coordinates 322 determined by camera clients 220 and coordinates 410 determined by LiDAR sensors 405).

According to the camera server 225, the first person is at a physical coordinate 602 ($X_1$, $Y_1$), and the second person is at a physical coordinate 602 ($X_2$, $Y_2$). Additionally, central server 240 receives from LiDAR server 230 the physical location of the two people. According to the LiDAR server 230, the first person is at coordinate 602 ($X_7$, $Y_7$) and the second person is at coordinate 602 ($X_8$, $Y_8$). Furthermore, central server 240 also receives information from weight server 235 during the first time window 332A. According to weight server 235, no items 130 were taken during the first time window 332A.

This disclosure contemplates central server 240 using any suitable process for analyzing the physical position of people from camera server 225 and LiDAR server 230. Although the coordinates 602 provided by camera server 225 and LiDAR server 230 may differ from each other, central server 240 may use any appropriate process for reconciling these differences. For example, central server 240 may use the coordinates 602 provided by camera server 225 if the coordinates 602 provided by LiDAR server 230 do not differ from the coordinates 602 provided by camera server 225 by an amount that exceeds a threshold. In this manner, the coordinates 602 provided by LiDAR sever 230 act as a check on the coordinates 602 provided by camera server 225.

During a second time window 332B, central server 240 receives from camera server 225 the physical coordinates 602 of the two people. According to camera server 225, during the second time window 332B, the first person was at coordinate 602 ($X_3$, $Y_3$) and the second person was at coordinate 602 ($X_4$, $Y_4$). During the second time window 332B, camera server 240 also receives the physical coordinates 602 of the two people from LiDAR server 230. According to the LiDAR server 230, the first person is at coordinate 602 ($X_9$, $Y_9$) and the second person is at coordinate 602 ($X_{10}$, $Y_{10}$) during the second time window 332B. Additionally, central server 240 learns from weight server 235 that no items 130 were taken during the second time window 332B.

During a third time window 332C, camera server 240 receives the physical coordinates 602 of the two people from camera server 225. According to the camera server 225, the first person is at coordinate 602 ($X_5$, $Y_5$) and the second person is at coordinate 602 ($X_6$, $Y_6$). Central server 240 also receives the physical coordinates 602 of the two people from LiDAR server 230 during the third time window 332C. According to the LiDAR server 230, the first person is at coordinate 602 ($X_{11}$, $Y_{11}$) and the second person is at coordinate 602 ($X_{12}$, $Y_{12}$) during the third time window 332C. Additionally, central server 240 learns from weight server 235 that a particular weight sensor 500 detected that two items 130 were taken during the third time window 332C.

In response to learning that a weight sensor 500 detected that two items 130 were taken, central server 240 may undergo additional analysis to determine which person took those two items 130. Central server 240 performs any suitable process for determining which person took items 130. Several of these processes are disclosed in U.S. application Ser. No. 16/663,710, "Topview Object Tracking Using a Sensor Array", the contents of which are incorporated by reference herein.

FIG. 6B shows central server 240 performing an example analysis to determine which person took items 130. As seen in FIG. 6B, central server 240 first determines the physical coordinates 602 of the two people during the third time window 332C. Central server 240 determines that the first person was at coordinate 602 ($X_5$, $Y_5$) during the third time window 332C and the second person was at coordinate 602 ($X_6$, $Y_6$) during the third time window 332C. Central server 240 also determines the physical location of the weight sensor 500 that detected the items that were taken. In example of FIG. 6B, central server 240 determines that the weight sensor 500 is located at coordinate 602 ($X_{13}$, $Y_{13}$).

Central server 240 then determines the distance from each person to the weight sensor 500. Central server 240 determines that the first person is a distance 1 from the weight sensor 500 and that the second person is a distance 2 from the weight sensor 500. Central server 240 then determines which person was closer to the weight sensor 500. In the example of FIG. 4B, central server 240 determines that distance 1 is less than distance 2 and, thus, the first person was closer to the weight sensor 500 than the second person. As a result, central server 240 determines that the first person took the two items 130 during the third time window 332C and that the first person should be charged for these two items 130.

FIG. 6C illustrates an example method 600 for operating central server 240. In particular embodiments, central server 240 performs the steps of method 600 to determine which person in a space took an item 130.

Central server 240 begins by receiving coordinates 602 of a first person in a space during a time window 332 in step 605. In step 610, central server 240 receives the coordinates 602 of a second person in the space during the time window 332. Central server 240 receives an indication that an item 130 was taken during the time window 332 in step 615. In response to reeving that indication, central server 240 analyzes the information to determine which person took that item 130.

In step 620, central server 240 determines that the first person was closer to the item 130 than the second person during the time window 332. Central server 240 may make this determination based on determined distances between the people and a weight sensor 500 that detected that the item 130 was removed. In step 625, central server 240 determines that the first person took the item 130 during the time window 332 in response to determining that the first person was closer to the item 130 than the second person. The first person may then be charged for the item 130 when the first person exits the store 100.

Modifications, additions, or omissions may be made to method 600 depicted in FIG. 6C. Method 600 may include more, fewer, or other steps. For example, steps may be performed in parallel or in any suitable order. While discussed as central server 240 performing the steps, any suitable component of tracking system 132 may perform one or more steps of the method.

VI. Hardware

Figure 7:
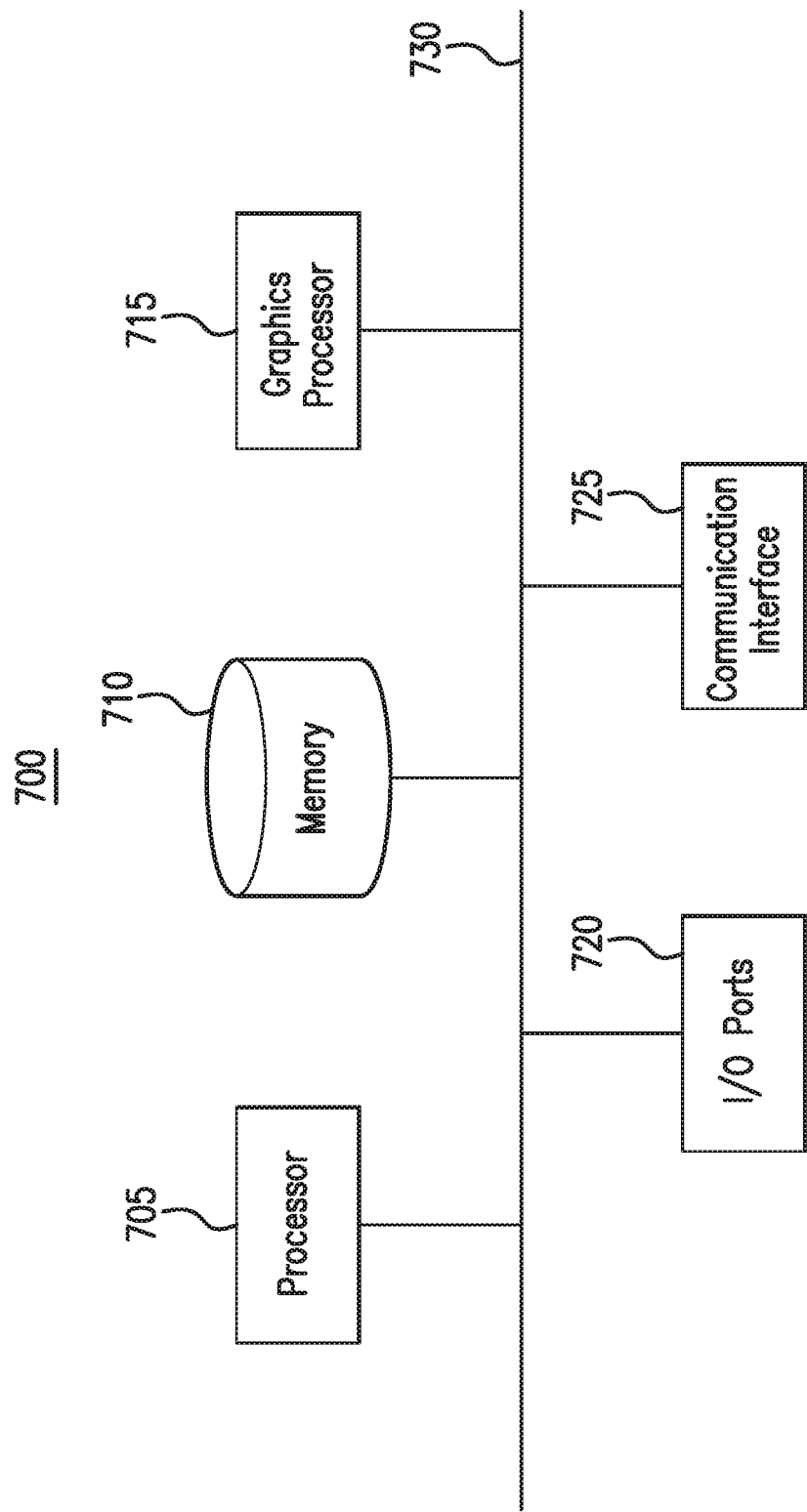
FIG. 7 illustrates an example computer.

FIG. 7 illustrates an example computer 700 used in tracking system 132. Generally, computer 700 can be used to implement components of tracking system 132. For example, computer 700 can be used to implement a camera client 220, a camera server 225, a LiDAR server 230, a weight server 235, and/or a central server 240. As seen in FIG. 7, computer 700 includes various hardware components, such as a processor 705, a memory 710, a graphics processor 715, input/output ports 720, a communication interface 725, and a bus 730. This disclosure contemplates the components of computer 700 being configured to perform any of the functions of camera client 220, camera server 225, LiDAR server 230, weight server 235, and/or central server 240 discussed herein. Circuit board 565 may also include certain components of computer 700.

Processor 705 is any electronic circuitry, including, but not limited to microprocessors, application specific integrated circuits (ASIC), application specific instruction set processor (ASIP), and/or state machines, that communicatively couples to memory 710 and controls the operation of computer 700. Processor 705 may be 8-bit, 16-bit, 32-bit, 64-bit or of any other suitable architecture. Processor 705 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 705 may include other hardware that operates software to control and process information. Processor 705 executes software stored on memory to perform any of the functions described herein. Processor 705 controls the operation and administration of computer 700 by processing information received from memory 710 and/or other computers 700. Processor 705 may be a programmable logic device, a microcontroller, a microprocessor, any suitable processing device, or any suitable combination of the preceding. Processor 705 is not limited to a single processing device and may encompass multiple processing devices.

Memory 710 may store, either permanently or temporarily, data, operational software, or other information for processor 705. Memory 710 may include any one or a combination of volatile or non-volatile local or remote devices suitable for storing information. For example, memory 710 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 710, a disk, a CD, or a flash drive. In particular embodiments, the software may include an application executable by processor 705 to perform one or more of the functions described herein.

Graphics processor 715 may be any electronic circuitry, including, but not limited to microprocessors, application specific integrated circuits (ASIC), application specific instruction set processor (ASIP), and/or state machines, that receives and analyzes video data. For example, graphics processor 715 may process video data to determine the proper signals to send to a display so that the display displays an appropriate image. Graphics processor 715 may also process video data to identify certain characteristics (e.g., people or objects) within the video. Graphics processor 715 may be a component of a video card that is installed in computer 700.

Input/output ports 720 allow peripheral devices to connect to computer 700. Ports 720 may be any suitable ports, such as, parallel ports, serial ports, optical ports, video ports, network ports, etc. Peripheral devices such as keyboards, mouses, joysticks, optical tracking devices, trackpads, touchpads, etc. can connect to computer 700 through ports 720. Input and output signals are communicated between computer 700 and the peripheral devices through ports 720.

Communication interface 725 includes any suitable hardware and/or software to communicate over a network. For example, communication interface 725 may include a mode, network card, ethernet port/controller, wireless radio/controller, cellular radio/controller, and/or universal serial bus port/controller. Computer 700 may use communication interface 725 to communicate with other devices over a communication network.

Bus 730 allows components of computer 700 to communicate with one another. Computer 700 may include a bus controller 730 that manages communication over bus 730.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system comprising:
   an array of cameras positioned above a space, each camera of the array of cameras configured to capture a video of a portion of the space, the space containing a person;
   a first camera client configured to:
      receive a first plurality of frames of a first video from a first camera of the array of cameras, each frame of the first plurality of frames showing the person within the space;
      for a first frame of the first plurality of frames:
         determine a first bounding area around the person shown in the first frame; and
         generate a first timestamp of when the first frame was received by the first camera client;
      for a second frame of the first plurality of frames:
         determine a second bounding area around the person shown in the second frame; and
         generate a second timestamp of when the second frame was received by the first camera client;
   a second camera client separate from the first camera client, the second camera client configured to:
      receive a second plurality of frames of a second video from a second camera of the array of cameras, each frame of the second plurality of frames showing the person within the space;
      for a third frame of the second plurality of frames:
         determine a third bounding area around the person shown in the third frame; and
         generate a third timestamp of when the third frame was received by the second camera client;
      for a fourth frame of the second plurality of frames:
         determine a fourth bounding area around the person shown in the fourth frame; and
         generate a fourth timestamp of when the fourth frame was received by the second camera client;
   a camera server separate from the first and second camera clients, the camera server configured to:
      determine that the first timestamp falls within a first time window;

in response to determining that the first timestamp falls within the first time window, assign coordinates defining the first bounding area to the first time window;
determine that the second timestamp falls within the first time window;
in response to determining that the second timestamp falls within the first time window, assign coordinates defining the second bounding area to the first time window;
determine that the third timestamp falls within the first time window;
in response to determining that the third timestamp falls within the first time window, assign coordinates defining the third bounding area to the first time window;
determine that the fourth timestamp falls within a second time window that follows the first time window;
in response to determining that the fourth timestamp falls within the second time window, assign coordinates defining the fourth bounding area to the second time window;
determine that coordinates assigned to the first time window should be processed;
in response to determining that coordinates assigned to the first time window should be processed:
calculate, based at least on the coordinates defining the first bounding area and the coordinates defining the second bounding area, a combined coordinate for the person during the first time window for the first video from the first camera; and
calculate, based at least on the coordinates defining the third bounding area, a combined coordinate for the person during the first time window for the second video from the second camera; and
determine, based at least on the combined coordinate for the person during the first time window for the first video from the first camera and the combined coordinate for the person during the first time window for the second video from the second camera, a position of the person within the space during the first time window;
a plurality of weight sensors positioned within the space, each weight sensor of the plurality of weight sensors configured to produce a signal indicative of a weight experienced by that weight sensor;
a weight server separate from the first and second camera clients and the camera server, the weight server configured to determine, based at least on a signal produced by a first weight sensor of the plurality of weight sensors, that an item positioned above the first weight sensor was removed; and
a central server separate from the first and second camera clients, the camera server, and the weight server, the central server configured to determine, based at least on the position of the person within the space during the first time window, that the person removed the item, wherein, based at least on the determination that the first person removed the item, the person is charged for the item when the person exits the space.

2. The system of claim 1, further comprising:
an array of light detection and ranging (LiDAR) sensors positioned above the space; and
a LiDAR server separate from the first and second camera clients, the camera server, the weight server, and the central server, the LiDAR server configured to determine a position of the person within the space during the first time window based at least on a coordinate received from a LiDAR sensor of the array of LiDAR sensors.

3. The system of claim 1, wherein the determination that the first person removed the item is based at least on (1) a distance between the position of the person in the space and a position of the first weight sensor in the space and (2) a time of when the signal produced by the first weight sensor was received by the weight server falling within the first time window.

4. The system of claim 1, wherein:
the first camera client is further configured to receive a height of the person shown in the first frame and a height of the person shown in the second frame;
the second camera client is further configured to receive a height of the person shown in the third frame and a height of the person shown in the fourth frame; and
the camera server is further configured to:
calculate, based at least on the height of the person shown in the first frame and the height of the person shown in the second frame, a combined height for the person during the first time window for the first video from the first camera; and
calculate, based at least on the height of the person shown in the third frame, a combined coordinate for the person during the first time window for the second video from the second camera.

5. The system of claim 1, wherein:
the first camera client implements a first clock used to generate the first and second timestamps;
the second camera client implements a second clock used to generate the third and fourth timestamps; and
the camera server implements a third clock, the first, second, and third clocks are synchronized using a clock synchronization protocol.

6. The system of claim 5, wherein the weight server implements a fourth clock that is synchronized with the first, second, and third clocks using the clock synchronization protocol.

7. The system of claim 1, wherein the combined coordinate for the person during the first time window for the first video from the first camera comprises an average of the coordinates defining the first bounding area and the coordinates defining the second bounding area.

8. The system of claim 1, wherein the array of cameras is arranged in a grid such that a camera that is communicatively coupled to the first camera client is not directly adjacent in the same row or the same column of the grid to another camera that is communicatively coupled to the first camera client.

9. The system of claim 1, further comprising:
a rack within the space, the rack comprising a shelf and a base comprising a drawer, the base positioned vertically lower than the shelf, the shelf divided into a first region and a second region, the first weight sensor of the plurality of weight sensors positioned within the first region and configured to produce a first signal based at least on a weight within the first region experienced by the first weight sensor, a second weight sensor of the plurality of weight sensors positioned within the second region and configured to produce a second signal based at least on a weight within the second region experienced by the second weight sensor, each weight sensor of the plurality of weight sensors comprising a plurality of load cells; and a circuit board positioned within the drawer, the circuit board communicatively coupled to the first weight sensor and the second weight sensor, the circuit board configured to:
receive the first and second signals;
communicate, to the weight server, a signal indicating the weight experienced by the first weight sensor; and
communicate, to the weight server, a signal indicating the weight experienced by the second weight sensor.

10. The system of claim 1, wherein the camera server is further configured to request the first frame from the first camera client and the third frame from the second camera client, the determination of the position of the person is further based at least on the first and third frames.

11. A method comprising:
receiving, by a first camera client, a first plurality of frames of a first video from a first camera of an array of cameras, the array of cameras positioned above a space, each camera of the array of cameras configured to capture a video of a portion of the space, the space containing a person, each frame of the first plurality of frames showing the person within the space;
for a first frame of the first plurality of frames:
determining, by the first camera client, a first bounding area around the person shown in the first frame; and
generating, by the first camera client, a first timestamp of when the first frame was received by the first camera client;
for a second frame of the first plurality of frames:
determining, by the first camera client, a second bounding area around the person shown in the second frame; and
generating, by the first camera client, a second timestamp of when the second frame was received by the first camera client;
receiving, by a second camera client separate from the first camera client, a second plurality of frames of a second video from a second camera of the array of cameras, each frame of the second plurality of frames showing the person within the space;
for a third frame of the second plurality of frames:
determining, by the second camera client, a third bounding area around the person shown in the third frame; and
generating, by the second camera client, a third timestamp of when the third frame was received by the second camera client;
for a fourth frame of the second plurality of frames:
determining, by the second camera client, a fourth bounding area around the person shown in the fourth frame; and
generating, by the second camera client, a fourth timestamp of when the fourth frame was received by the second camera client;
determining, by a camera server separate from the first and second camera clients, that the first timestamp falls within a first time window;
in response to determining that the first timestamp falls within the first time window, assigning, by the camera server, coordinates defining the first bounding area to the first time window;
determining, by the camera server, that the second timestamp falls within the first time window;
in response to determining that the second timestamp falls within the first time window, assigning, by the camera server, coordinates defining the second bounding area to the first time window;
determining, by the camera server, that the third timestamp falls within the first time window;
in response to determining that the third timestamp falls within the first time window, assigning, by the camera server, coordinates defining the third bounding area to the first time window;
determining, by the camera server, that the fourth timestamp falls within a second time window that follows the first time window;
in response to determining that the fourth timestamp falls within the second time window, assigning, by the camera server, coordinates defining the fourth bounding area to the second time window;
determining, by the camera server, that coordinates assigned to the first time window should be processed;
in response to determining that coordinates assigned to the first time window should be processed:
calculating, by the camera server, based at least on the coordinates defining the first bounding area and the coordinates defining the second bounding area, a combined coordinate for the person during the first time window for the first video from the first camera; and
calculating, by the camera server, based at least on the coordinates defining the third bounding area, a combined coordinate for the person during the first time window for the second video from the second camera;
determining, by the camera server, based at least on the combined coordinate for the person during the first time window for the first video from the first camera and the combined coordinate for the person during the first time window for the second video from the second camera, a position of the person within the space during the first time window;
producing, by a plurality of weight sensors positioned within the space, signals indicative of weights experienced by the plurality of weight sensors;
determining, by a weight server separate from the first and second camera clients and the camera server, based at least on a signal produced by a first weight sensor of the plurality of weight sensors, that an item positioned above the first weight sensor was removed;
determining, by a central server separate from the first and second camera clients, the camera server, and the weight server, based at least on the position of the person within the space during the first time window, that the person removed the item, wherein, based at least on the determination that the first person removed the item, the person is charged for the item when the person exits the space.

12. The method of claim 11, further comprising determining, by a light detection and ranging (LiDAR) server separate from the first and second camera clients, the camera server, the weight server, and the central server, a position of the person within the space during the first time window based at least on a coordinate received from a LiDAR sensor of an array of LiDAR sensors positioned above the space.

13. The method of claim 11, wherein the determination that the first person removed the item is based at least on (1) a distance between the position of the person in the space and a position of the first weight sensor in the space and (2)

a time of when the signal produced by the first weight sensor was received by the weight server falling within the first time window.

14. The method of claim 11, further comprising:
receiving, by the first camera client, a height of the person shown in the first frame and a height of the person shown in the second frame;
receiving, by the second camera client, a height of the person shown in the third frame and a height of the person shown in the fourth frame;
calculating, by the camera server, based at least on the height of the person shown in the first frame and the height of the person shown in the second frame, a combined height for the person during the first time window for the first video from the first camera; and
calculating, by the camera server, based at least on the height of the person shown in the third frame, a combined coordinate for the person during the first time window for the second video from the second camera.

15. The method of claim 11, further comprising:
implementing, by the first camera client, a first clock used to generate the first and second timestamps;
implementing, by the second camera client, a second clock used to generate the third and fourth timestamps; and
implementing, by the camera server, a third clock, the first, second, and third clocks are synchronized using a clock synchronization protocol.

16. The method of claim 15, further comprising implementing, by the weight server, a fourth clock that is synchronized with the first, second, and third clocks using the clock synchronization protocol.

17. The method of claim 11, wherein the combined coordinate for the person during the first time window for the first video from the first camera comprises an average of the coordinates defining the first bounding area and the coordinates defining the second bounding area.

18. The method of claim 11, wherein the array of cameras is arranged in a grid such that a camera that is communicatively coupled to the first camera client is not directly adjacent in the same row or the same column of the grid to another camera that is communicatively coupled to the first camera client.

19. The method of claim 11, further comprising:
receiving, by a circuit board, a first signal from the first weight sensor of the plurality of weight sensors, the circuit board positioned within a drawer of a rack positioned in the space, the rack comprising a shelf and a base, the base comprising the drawer, the base positioned vertically lower than the shelf, the shelf divided into a first region and a second region, the first weight sensor positioned within the first region, the first signal indicates a weight within the first region experienced by the first weight sensor, each weight sensor of the plurality of weight sensors comprising a plurality of load cells;
receiving, by the circuit board, a second signal from a second weight sensor of the plurality of weight sensors, the second weight sensor positioned within the second region, the second signal indicates a weight within the second region experienced by the second weight sensor;
communicating, by the circuit board, to the weight server, a signal indicating the weight experienced by the first weight sensor; and
communicating, by the circuit board, to the weight server, a signal indicating the weight experienced by the second weight sensor.

20. The method of claim 11, further comprising requesting, by the camera server, the first frame from the first camera client and the third frame from the second camera client, the determination of the position of the person is further based at least on the first and third frames.

\* \* \* \* \*